A. KNISTROM.
CALCULATING MACHINE.
APPLICATION FILED APR. 5, 1913. RENEWED JULY 5, 1917.

1,281,792.

Patented Oct. 15, 1918.
29 SHEETS—SHEET 1.

WITNESSES
William P. Johnson
A. S. Dunham

INVENTOR
August Knistrom
BY
Kerr, Page, Cooper & Hayward
ATTORNEYS

A. KNISTROM.
CALCULATING MACHINE.
APPLICATION FILED APR. 5, 1913. RENEWED JULY 5, 1917.

1,281,792. Patented Oct. 15, 1918.
29 SHEETS—SHEET 5.

WITNESSES
William P. Johnson
L. S. Dunham

INVENTOR
August Knistrom
BY
Kerr, Page, Cooper & Hayward
ATTORNEYS

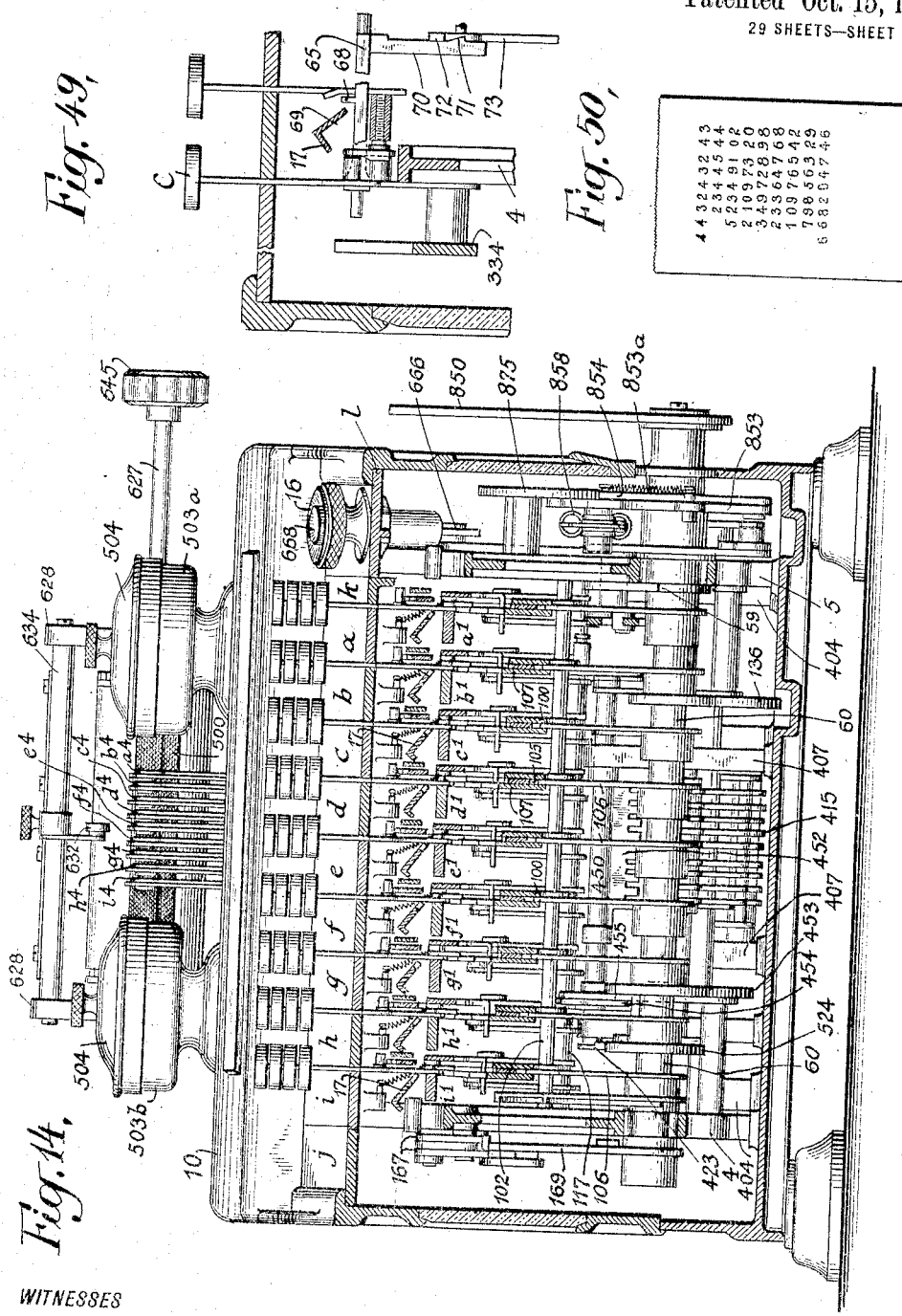

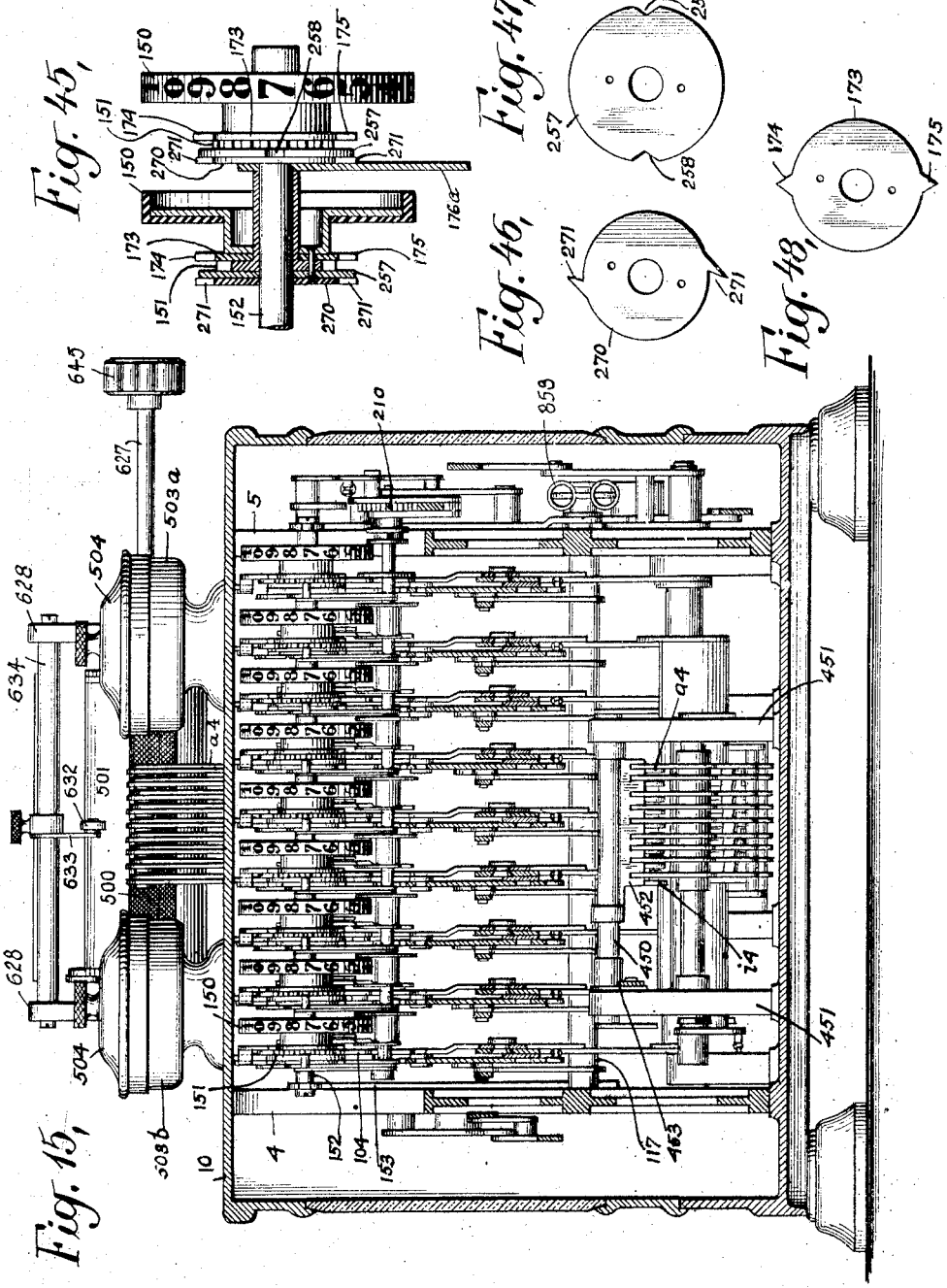

A. KNISTROM.
CALCULATING MACHINE.
APPLICATION FILED APR. 5, 1913. RENEWED JULY 5, 1917.
1,281,792.
Patented Oct. 15, 1918.
29 SHEETS—SHEET 16.
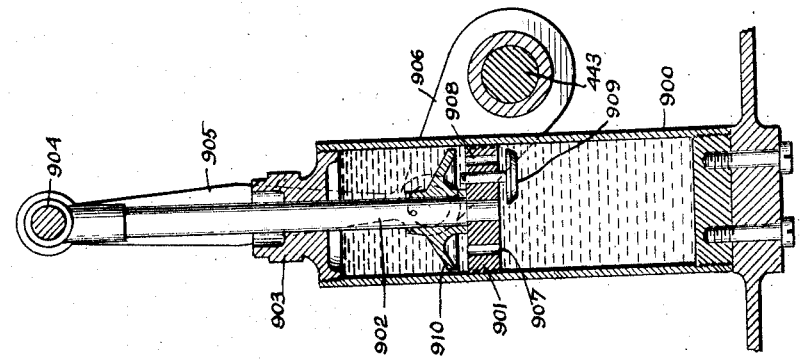
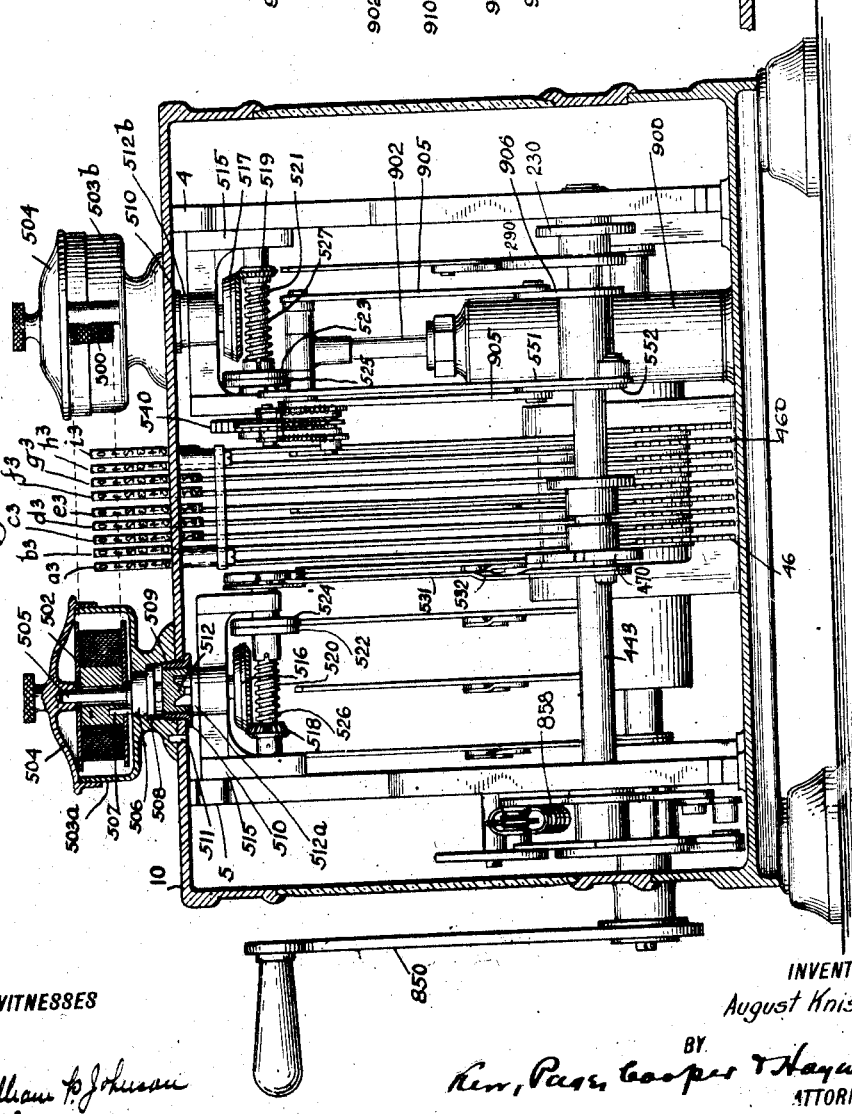
WITNESSES
INVENTOR
August Knistrom
BY
ATTORNEY

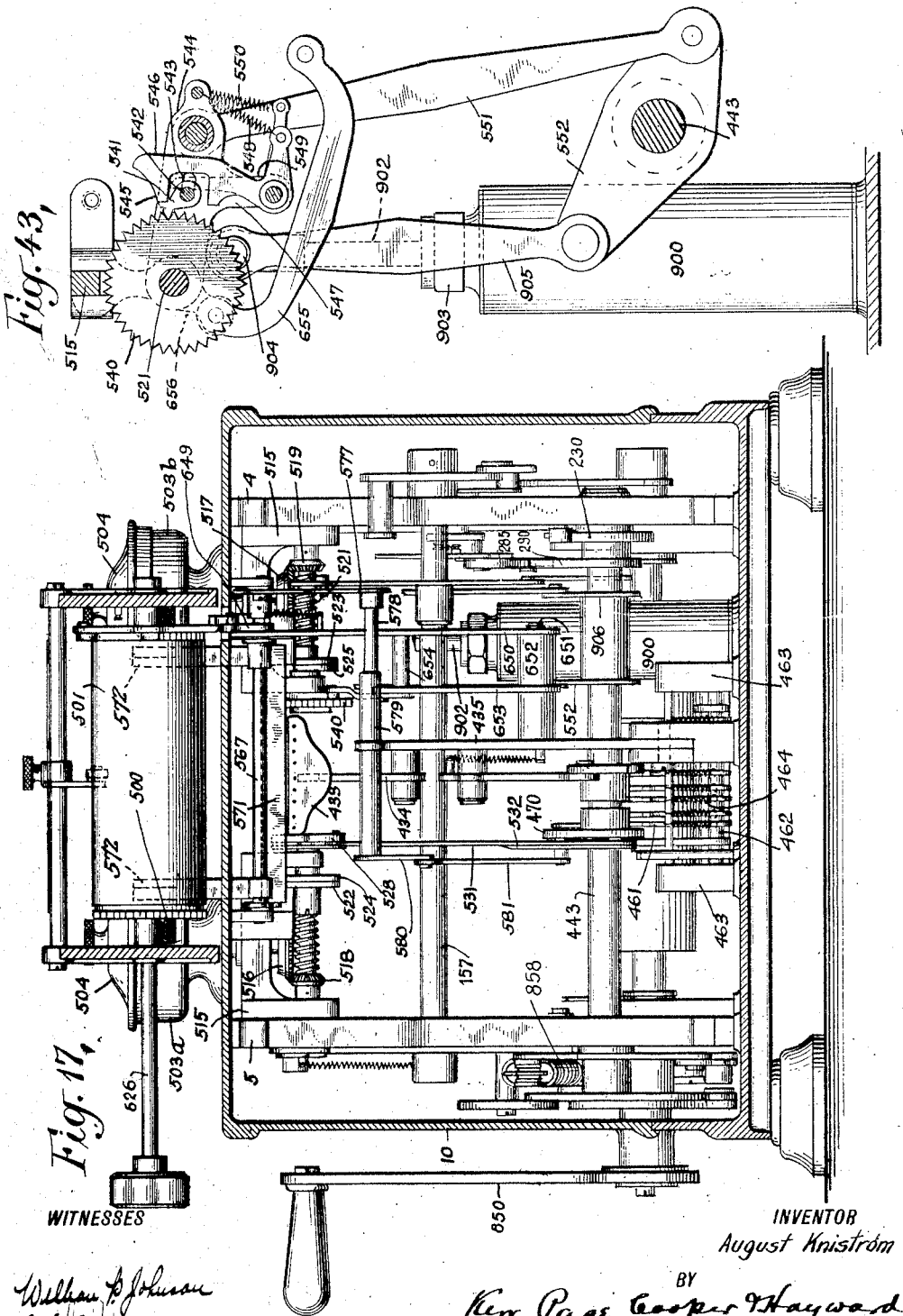

A. KNISTROM.
CALCULATING MACHINE.
APPLICATION FILED APR. 5, 1913. RENEWED JULY 5, 1917.
1,281,792.
Patented Oct. 15, 1918.
29 SHEETS—SHEET 18.
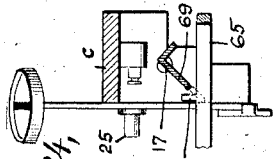
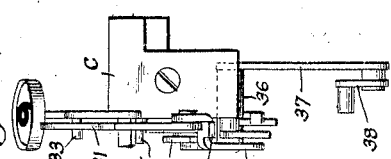
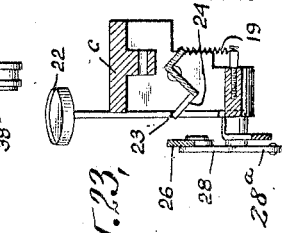
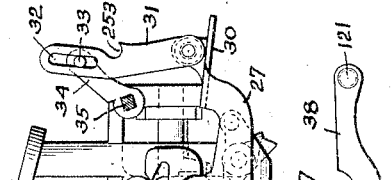
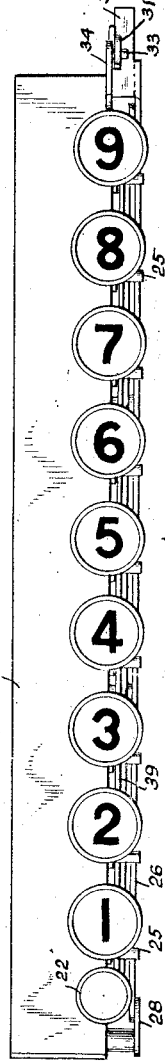
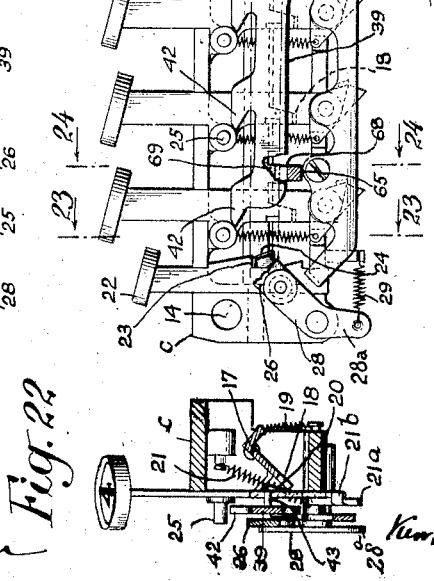
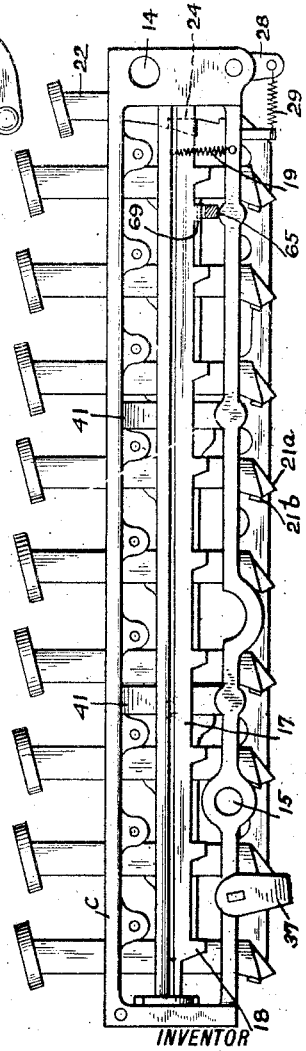
WITNESSES
INVENTOR
August Knistrom
BY
ATTORNEYS

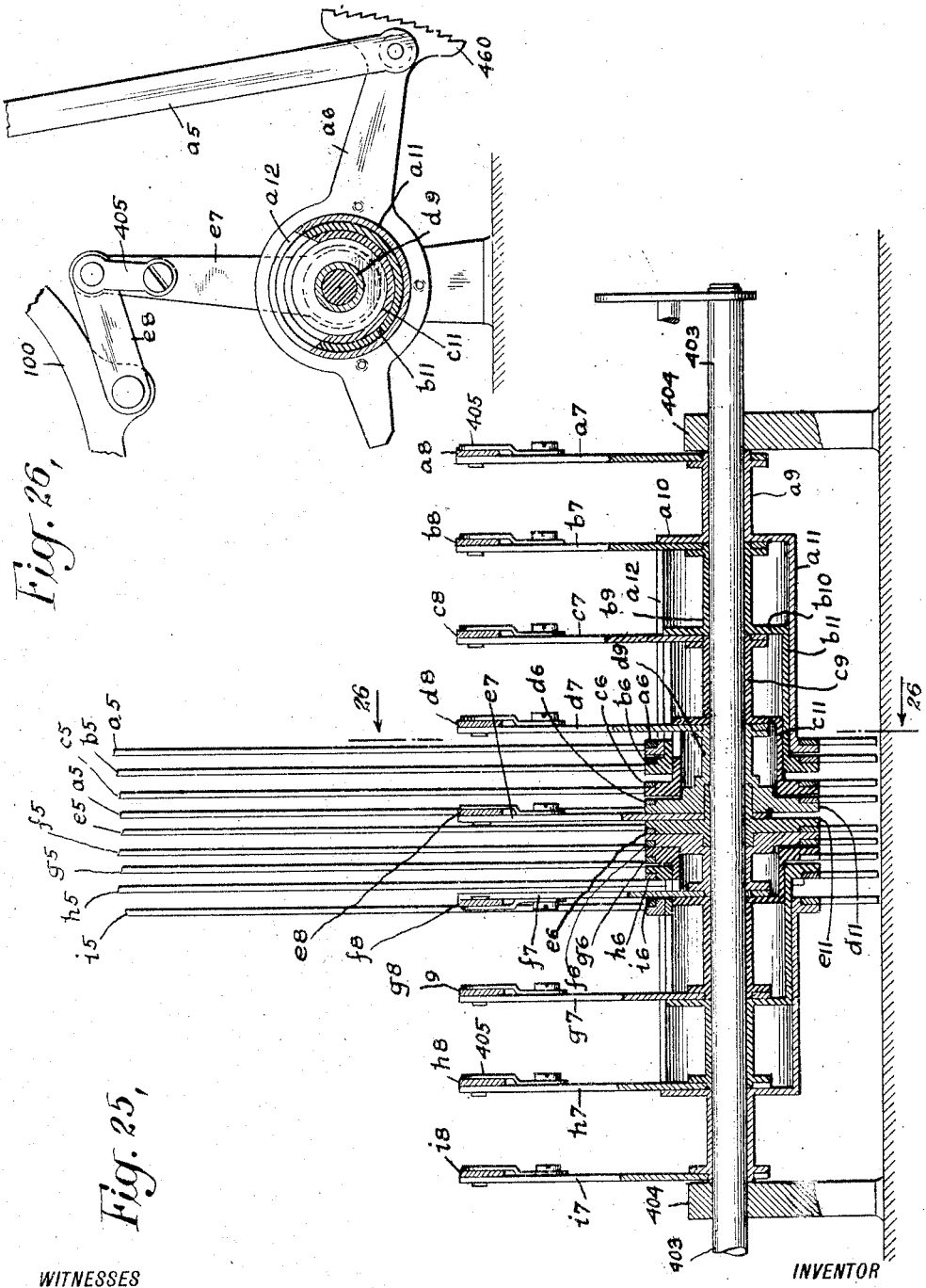

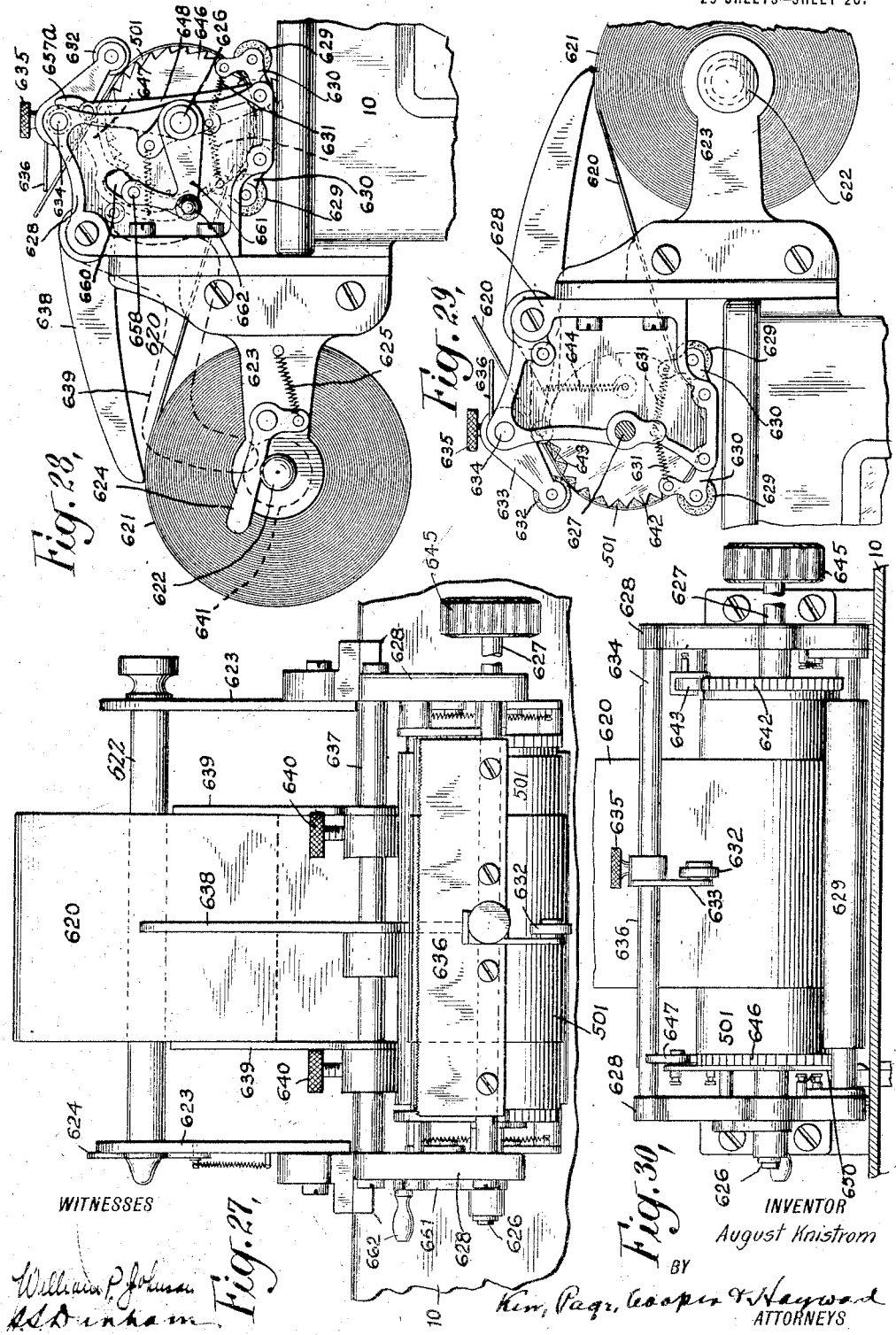

A. KNISTROM.
CALCULATING MACHINE.
APPLICATION FILED APR. 5, 1913. RENEWED JULY 5, 1917.

1,281,792.

Patented Oct. 15, 1918.
29 SHEETS—SHEET 21.

WITNESSES
William P Johnson
S.S. Dunham

INVENTOR
August Knistrom
BY
Kerr, Page, Cooper & Hayward
ATTORNEYS

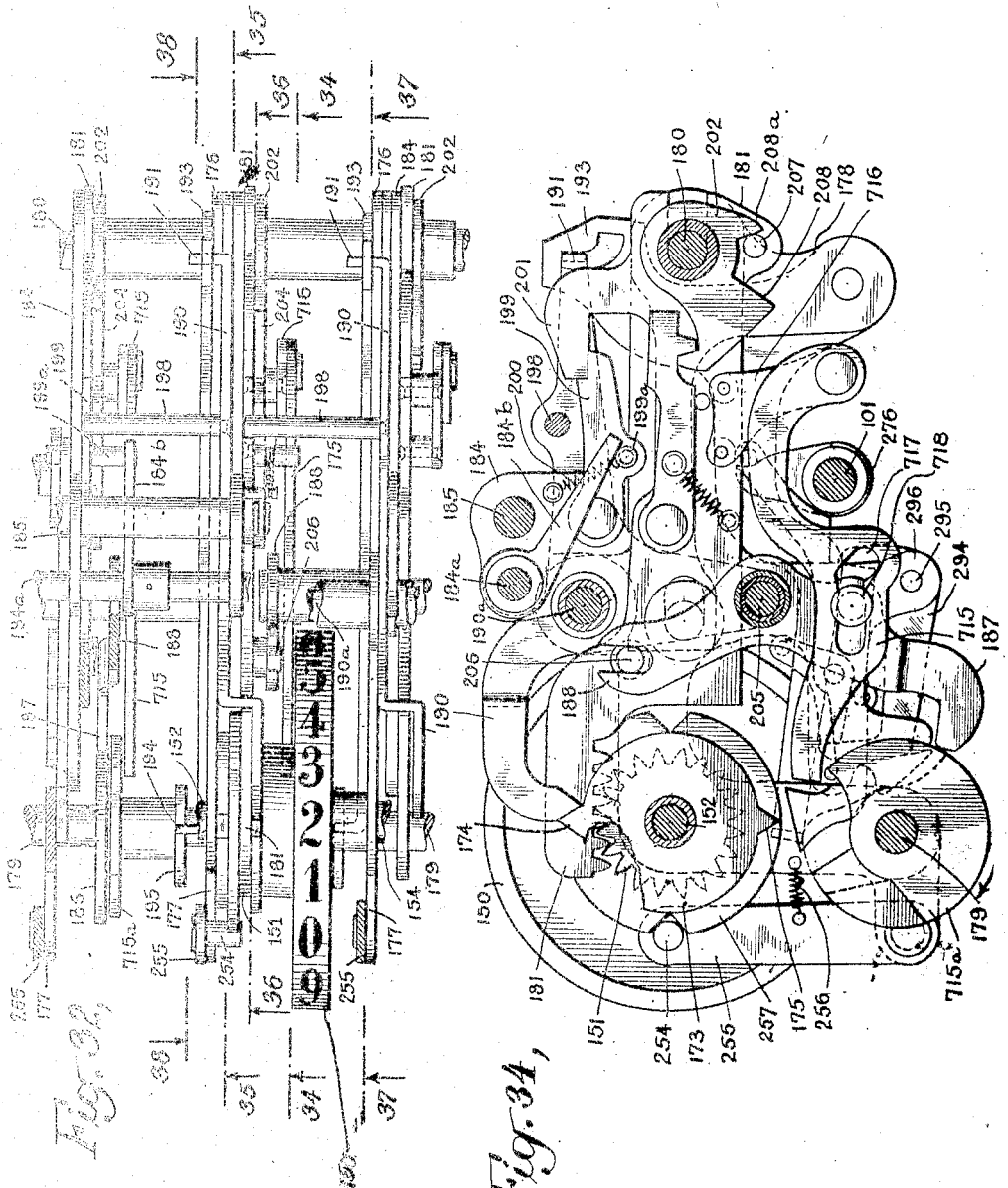

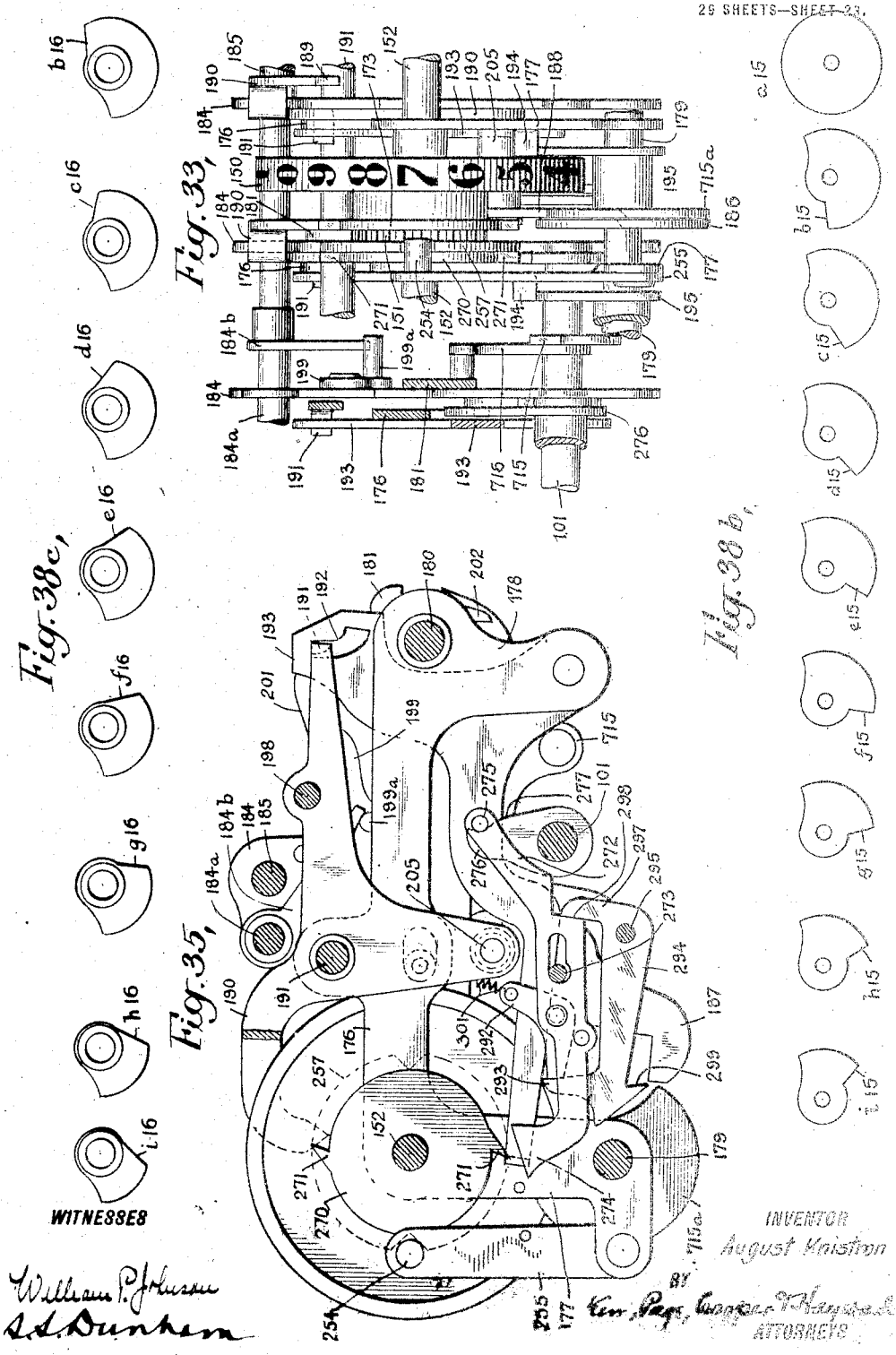

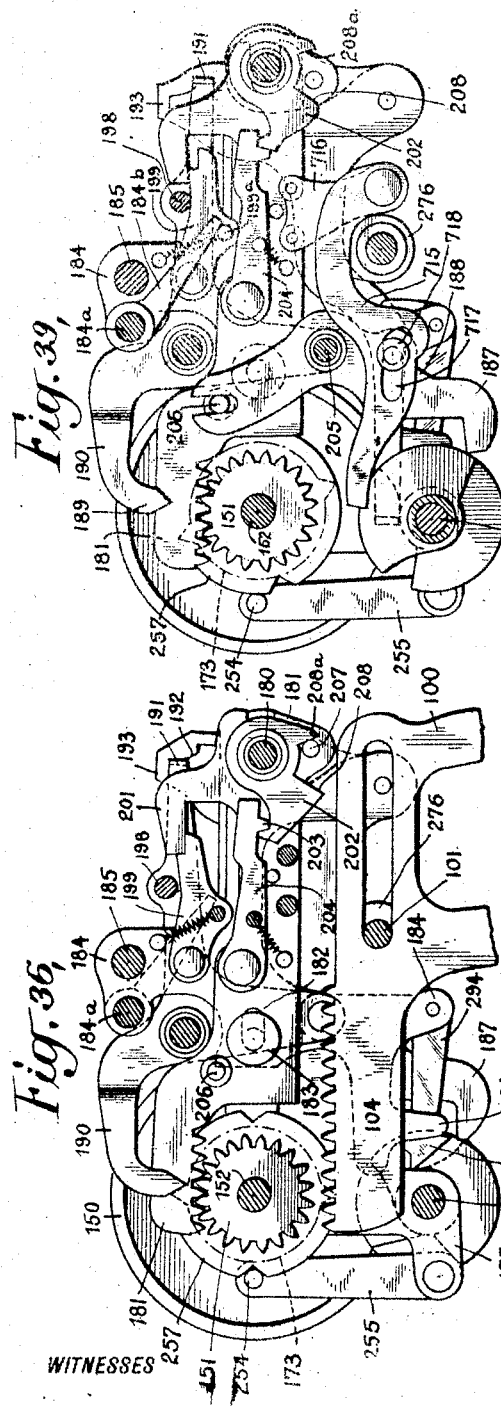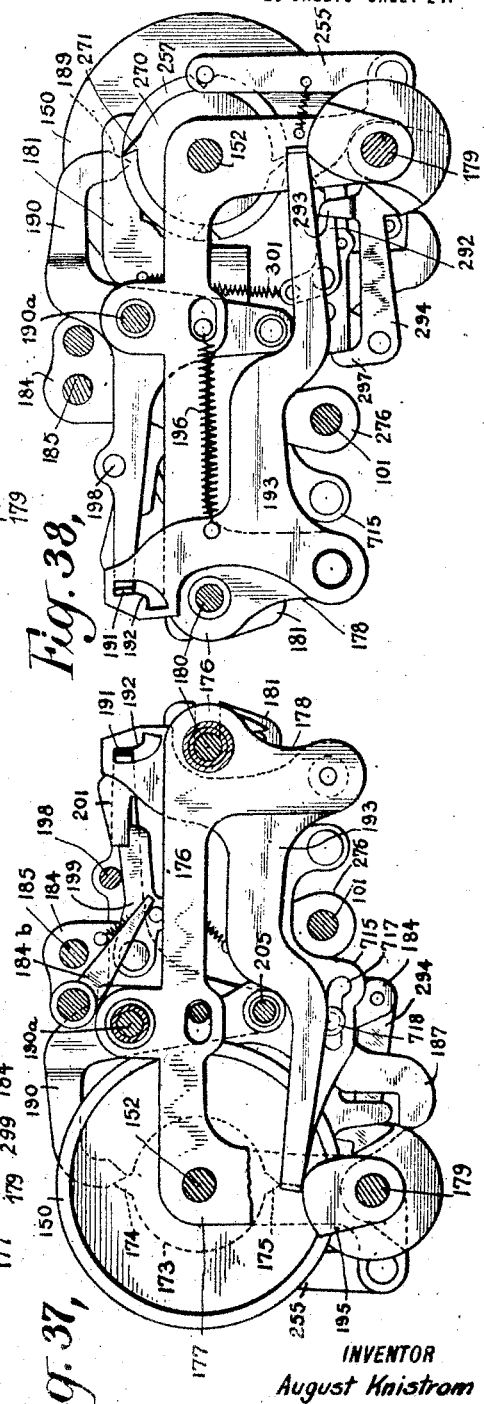
A. KNISTROM.
CALCULATING MACHINE.
APPLICATION FILED APR. 5, 1913. RENEWED JULY 5, 1917.
1,281,792. Patented Oct. 15, 1918.
29 SHEETS—SHEET 24.

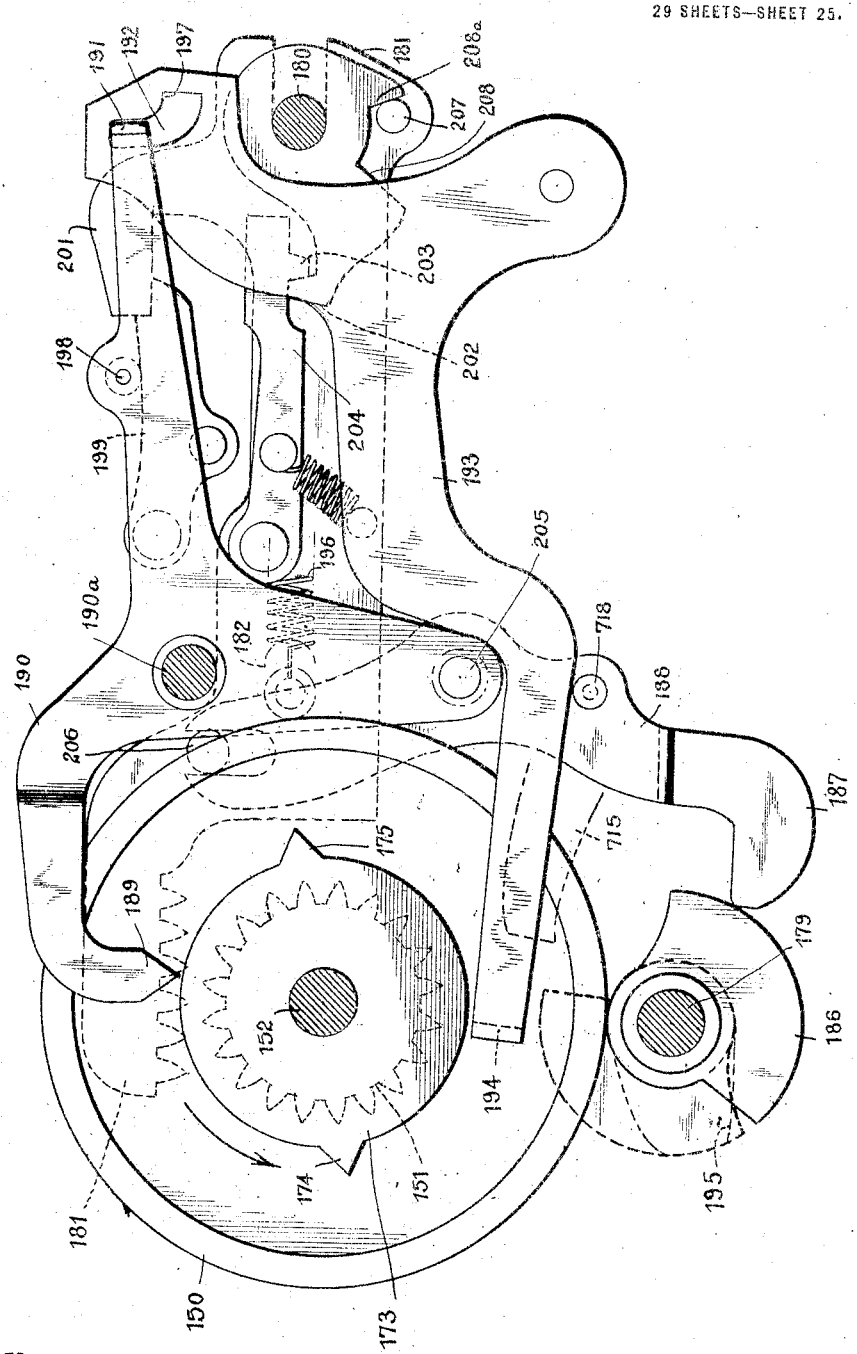

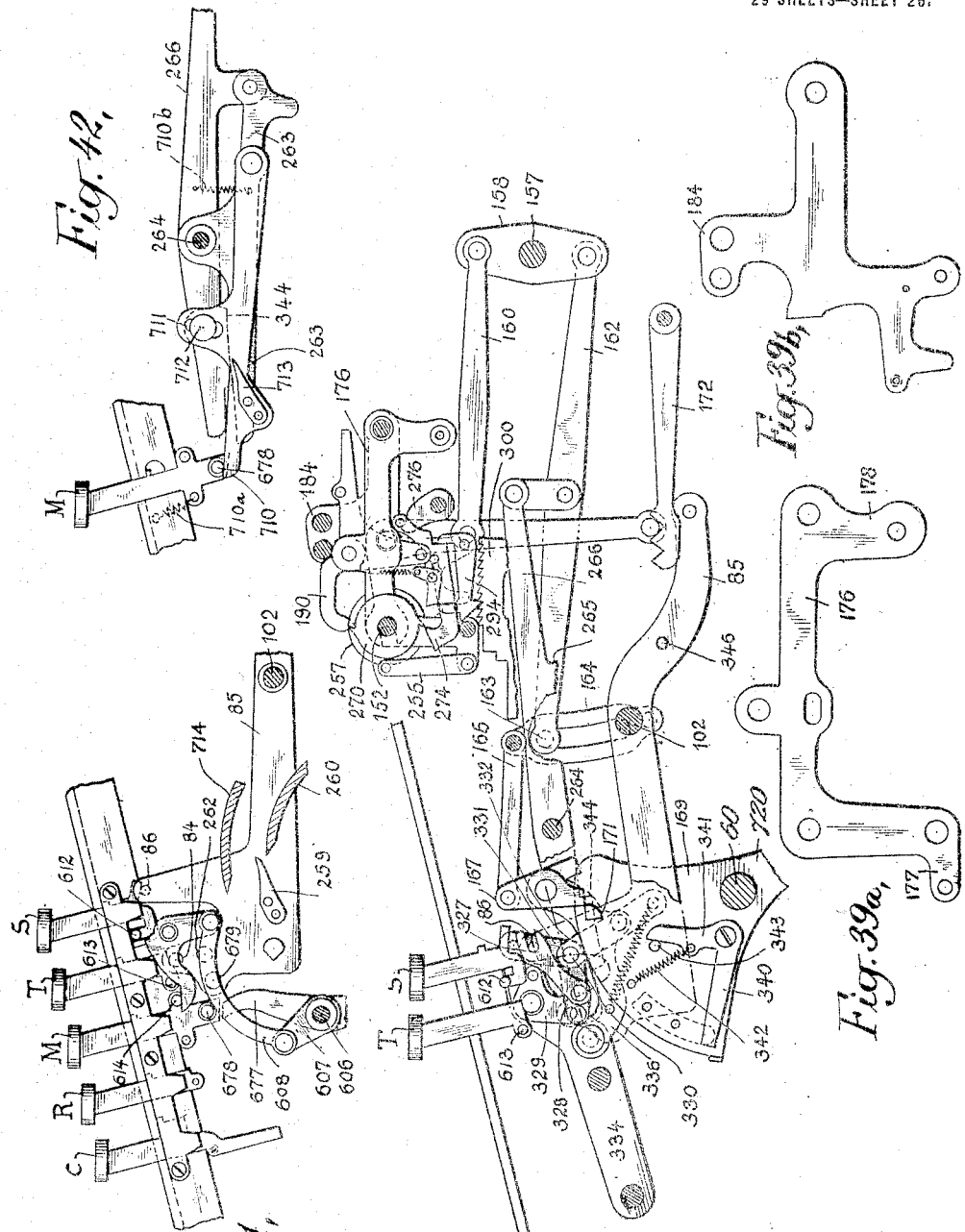

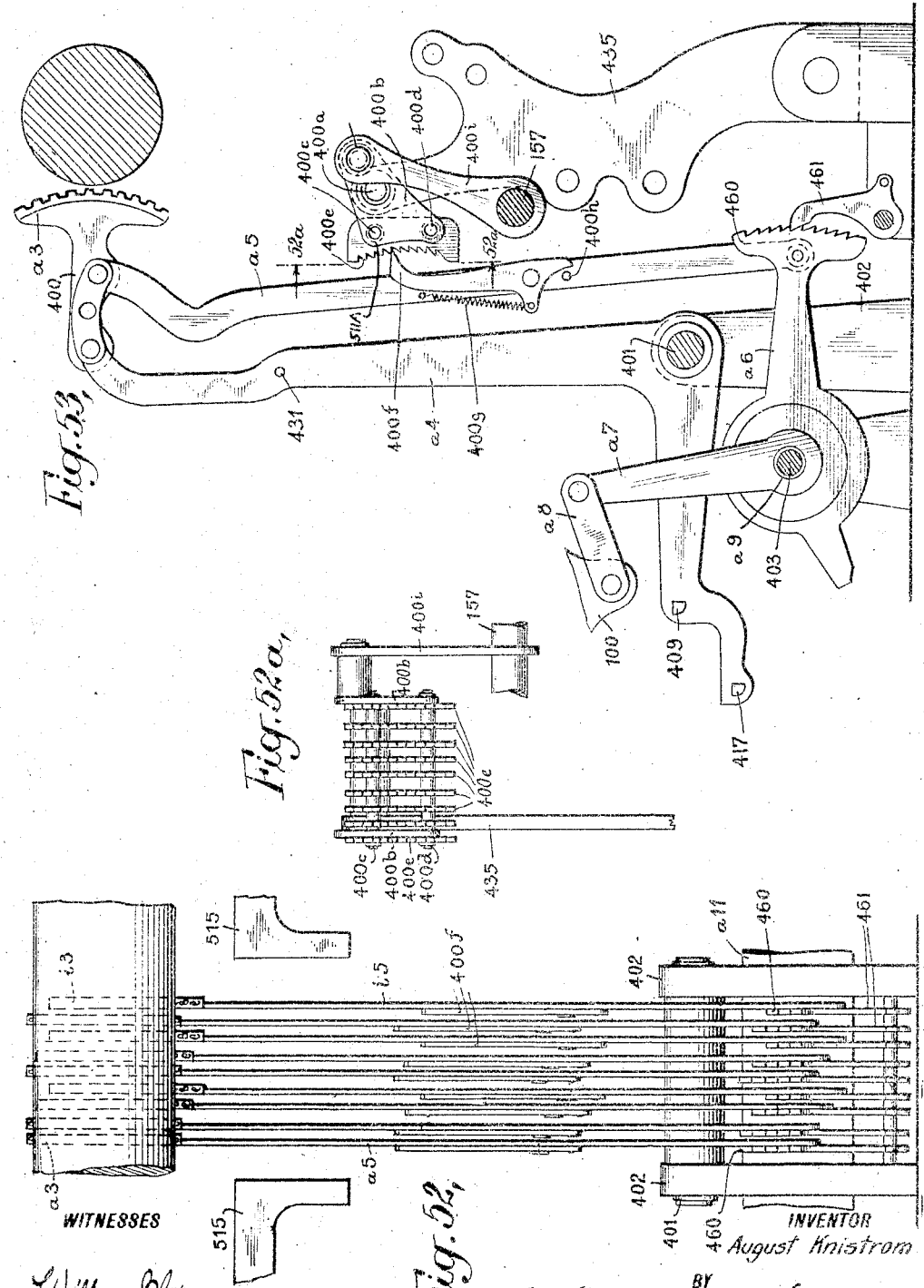

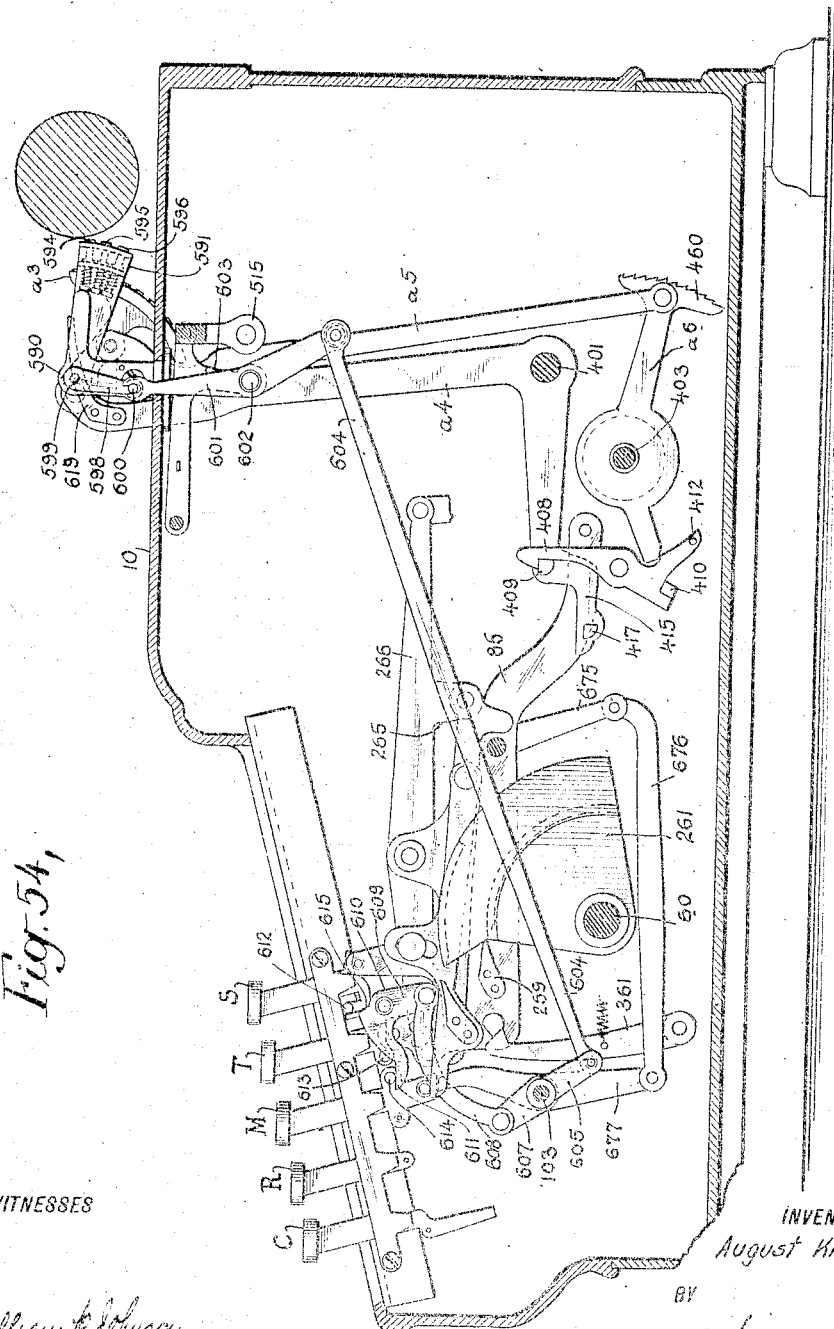

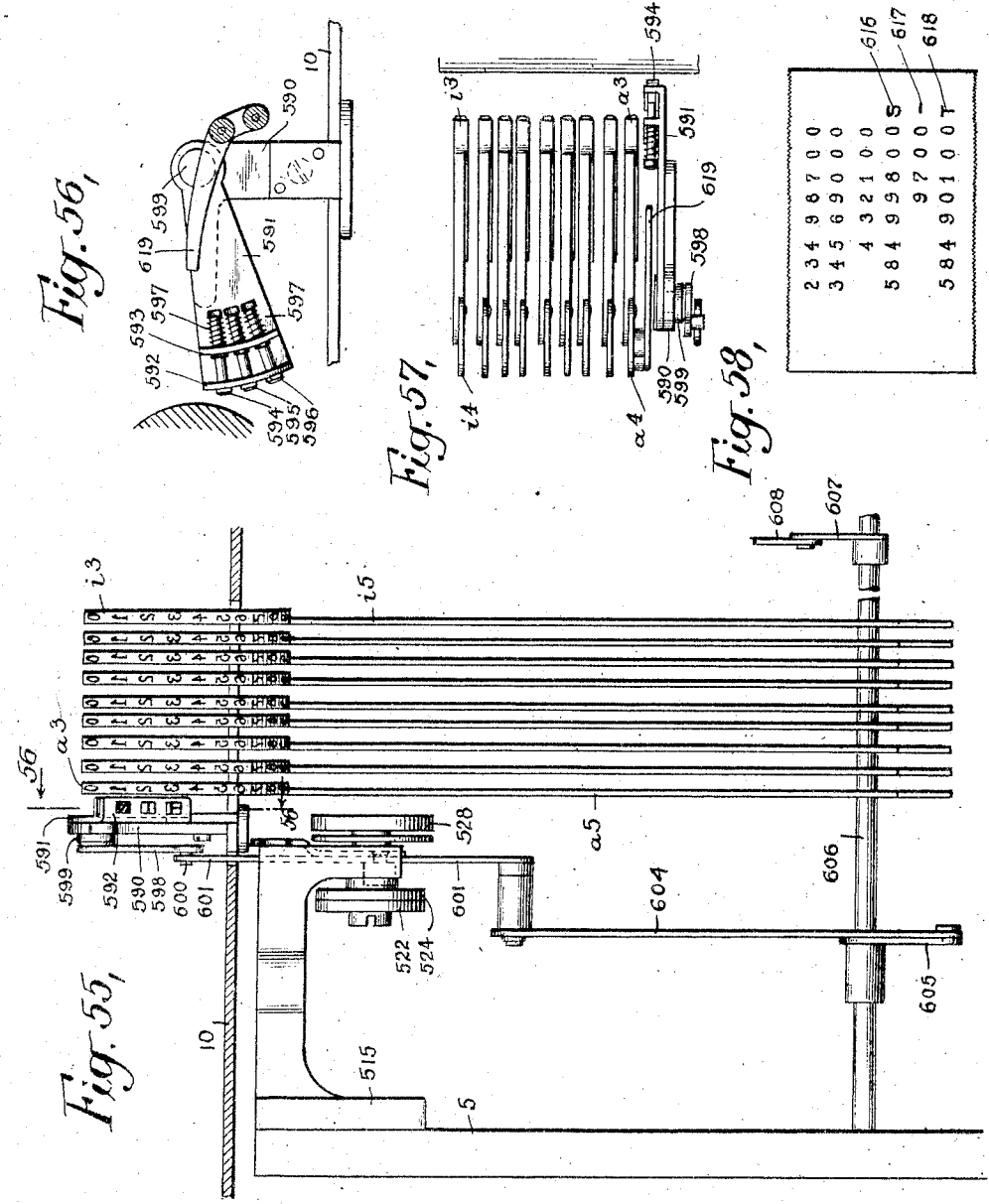

UNITED STATES PATENT OFFICE.

AUGUST KNISTROM, OF BINGHAMTON, NEW YORK, ASSIGNOR TO BUNDY MANUFACTURING COMPANY, OF ENDICOTT, NEW YORK, A CORPORATION OF NEW YORK.

CALCULATING-MACHINE.

1,281,792.   Specification of Letters Patent.   Patented Oct. 15, 1918.

Application filed April 5, 1913, Serial No. 759,261. Renewed July 5, 1917. Serial No. 178,817.

*To all whom it may concern:*

Be it known that I, AUGUST KNISTROM, a subject of the King of Sweden, residing at Binghamton, in the county of Broome and State of New York, have invented certain new and useful Improvements in Calculating-Machines, of which the following is a full, clear, and exact description.

This invention relates to calculating machines, and my chief objects have been to provide, first, a machine by which both addition and subtraction can be performed at the will of the operator; second, a machine in which the movements of the important parts shall be positively actuated instead of by gravity or by springs or like agencies, such parts being positively locked against movement in any direction till the proper time for movement arises and then being permitted to move only in the proper direction, to the end that the machine shall operate with unfailing accuracy; third, to provide a machine in which the number of different parts having offsets or bends in them is reduced to the minimum, all other parts being castings or flat pieces stamped from sheet metal, with the minimum amount of machining. This means low cost of manufacture, for to make bent or off-set parts requires the use of forming or bending dies, which are, as is well known, exceedingly costly. It also means interchangeability of parts, for flat pieces, stamped out of sheet metal, can be made in quantities without variation in thickness or contour; whereas parts bent in forming dies cannot be made exactly alike except at the further expense of costly hand or machine work. To these and other ends the invention consists in the novel features of construction and combination of elements hereinafter described, and set forth in part in the appended claims. Such parts and combinations as are not claimed herein will be claimed in one or more subsequent divisions of this application.

A convenient and effective embodiment of the invention is illustrated in the accompanying drawings, in which—

Figure 6:
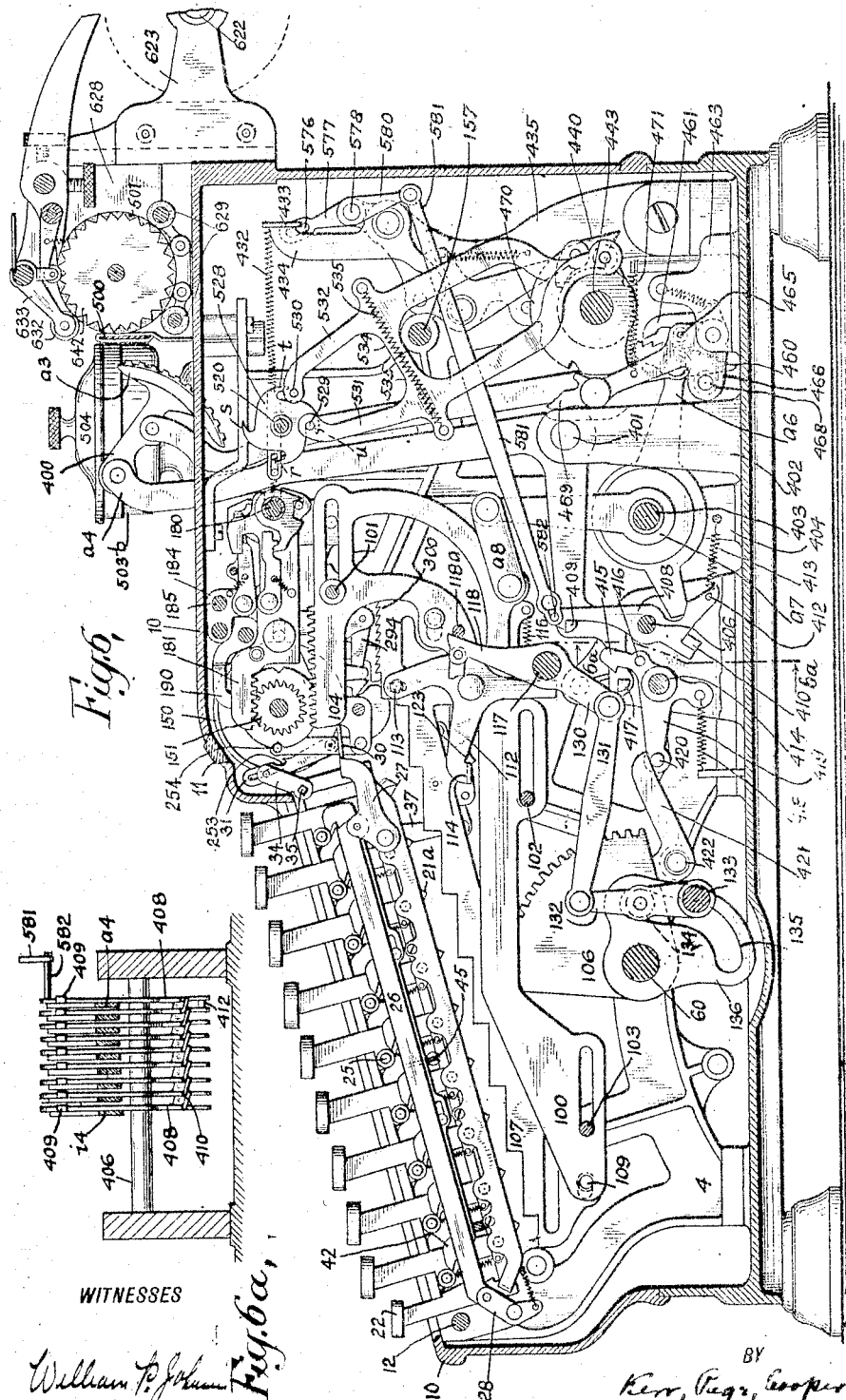

Fig. 6$^a$ is a section on line 6$^a$ of Fig. 6.

Figure 7:
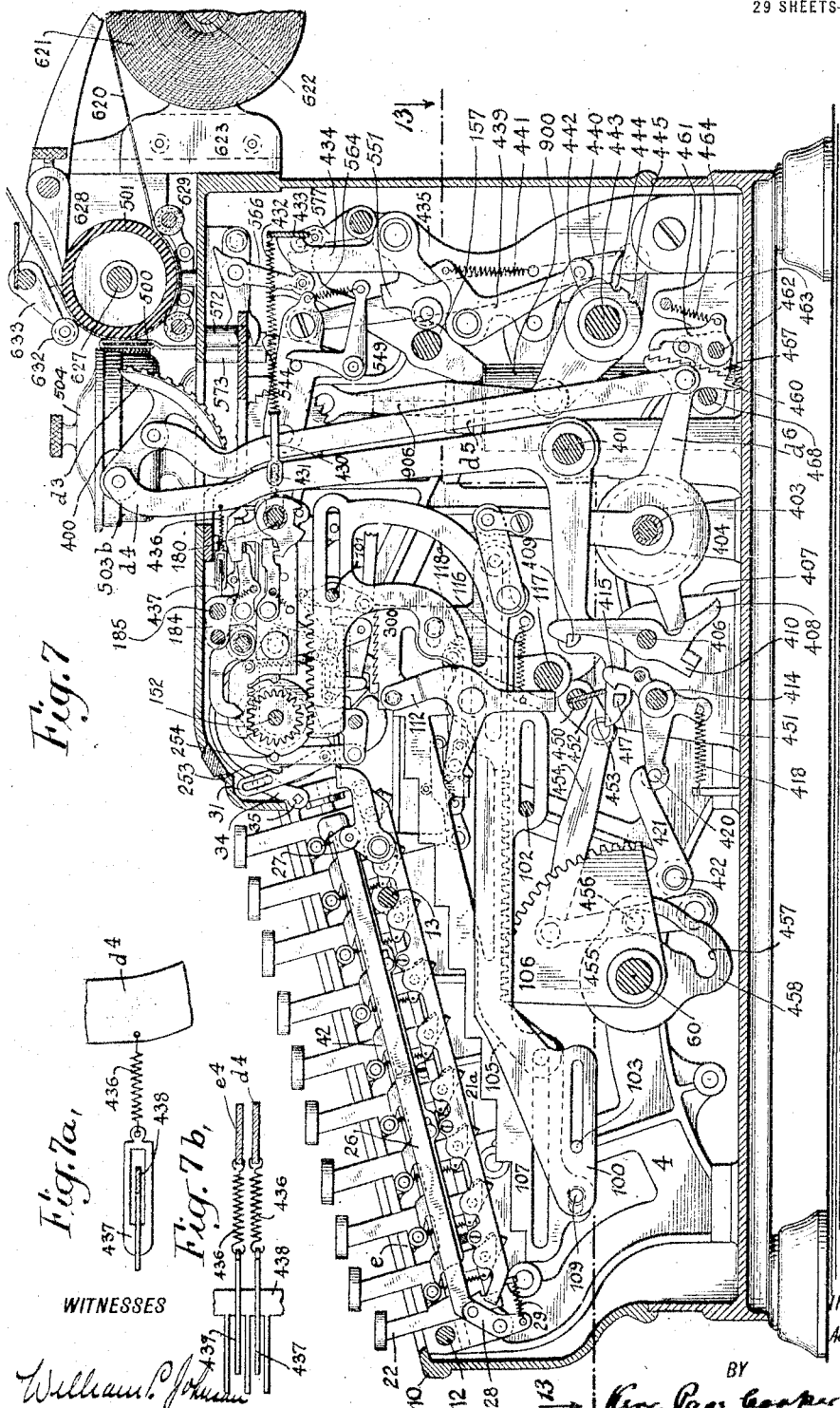

Figs. 7$^a$ and 7$^b$ are side and plan views respectively, of certain parts of the printing mechanism.

Figure 9:
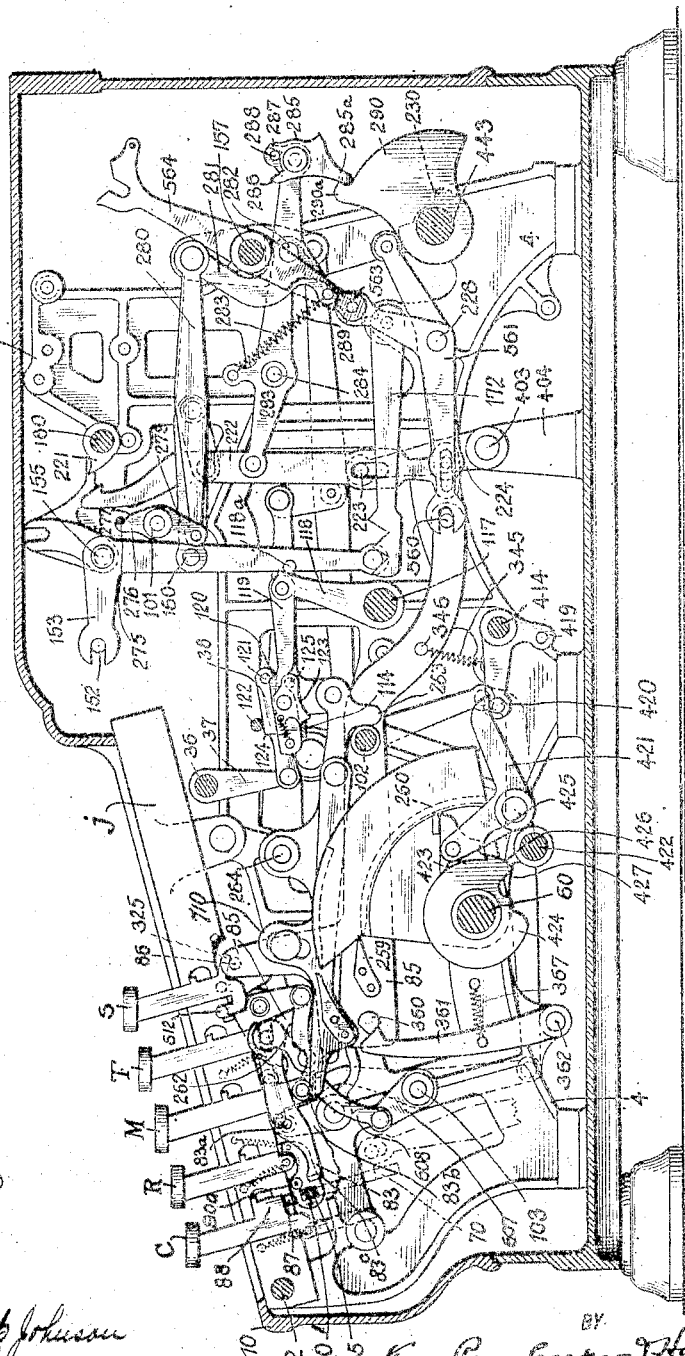

Fig. 9$^a$ is an end view, on a large scale, of a lever associated with the keyboard clearing mechanism.

Figure 11:
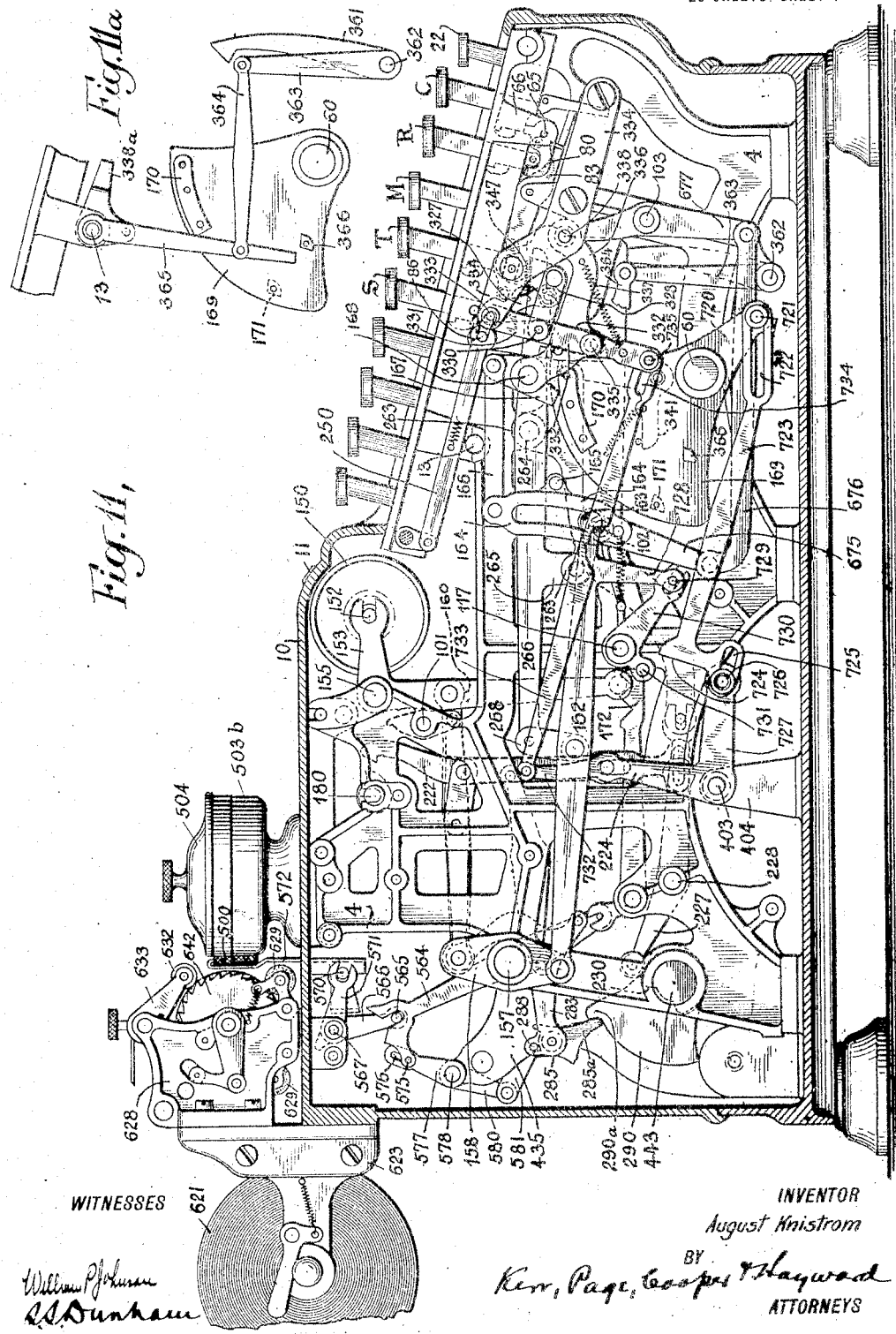

Fig. 11$^a$ is a detail view of a locking mechanism to lock the machine against operation and thereby prevent injury, when either the total or the sub-total key is only partially depressed.

Figure 12:
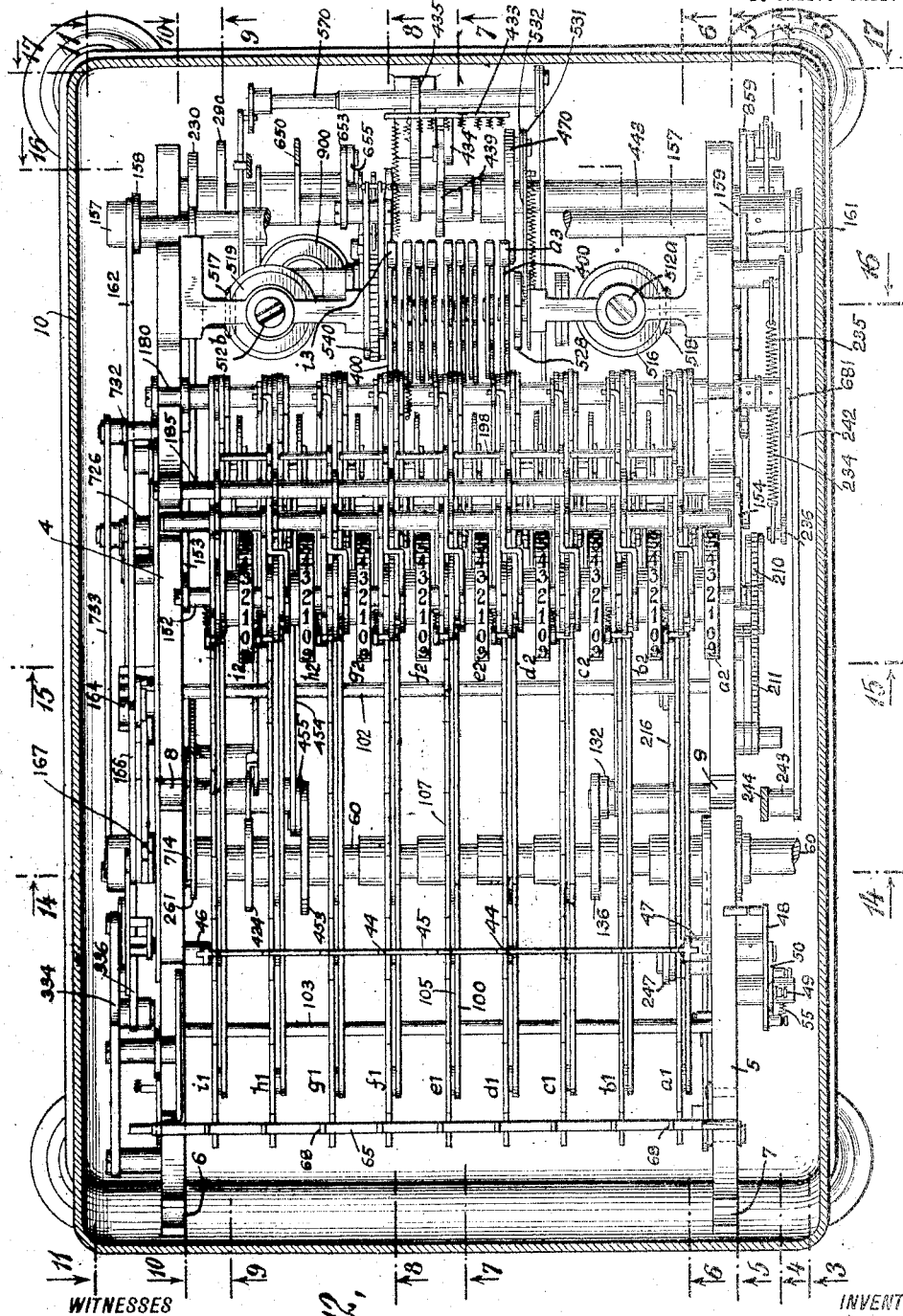

Fig. 12 is a plan view of the machine stripped of the keyboard and the upper part of the casing, and the parts carried by the latter; the casing itself being in horizontal section and the operation handle or lever omitted.

Figure 13:
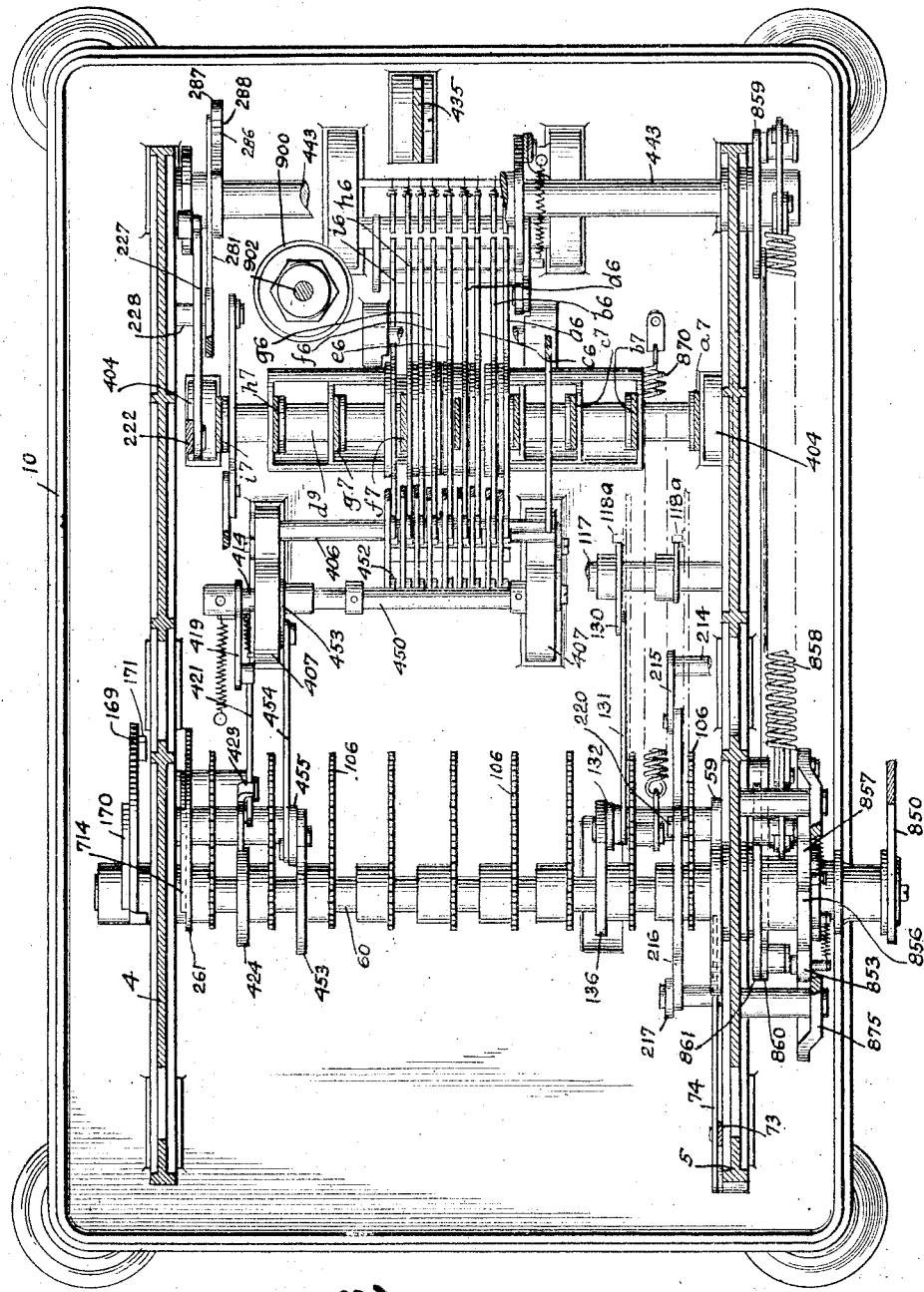

Fig. 13 is a section plan view, substantially on line 13—13 of Fig. 7.

Figs. 14, 15, 16 and 17 are cross-sections, substantially on planes indicated by the lines 14—14, 15—15, 16—16 and 17—17, respectively, in Fig. 12.

Figs. 18 to 24, inclusive, are detail views on a larger scale, of a typical section of the sectional key-board: Fig. 18 being a plan view of one complete keyboard section; Fig. 19 a side view of the same, looking from the right hand of the machine, certain parts being partly broken away and other parts being shown in section; Fig. 20 a side view from the left; Fig. 21 an end view of the parts shown in Fig. 19; and Figs. 22, 23 and 24 vertical sections substantially on planes indicated by the lines 22—22, 23—23 and 24—24, in Fig. 19.

Fig. 25 is a fragmentary cross-sectional view showing on a larger scale the mechanism which directly coöperates with the printing or type sectors to raise the same for the purpose of bringing the proper types to the printing position.

Fig. 26 is a section substantially on the line 26—26 of Fig. 25.

Figs. 27 to 30 inclusive are detail views, on a larger scale, of such parts of the paper feed mechanism as are mounted outside the case of the machine; Fig. 27 being a plan view, Fig. 28 a side view from the left, Fig.

29 a side view from the right, and Fig. 30 a rear elevation.

Figure 31:
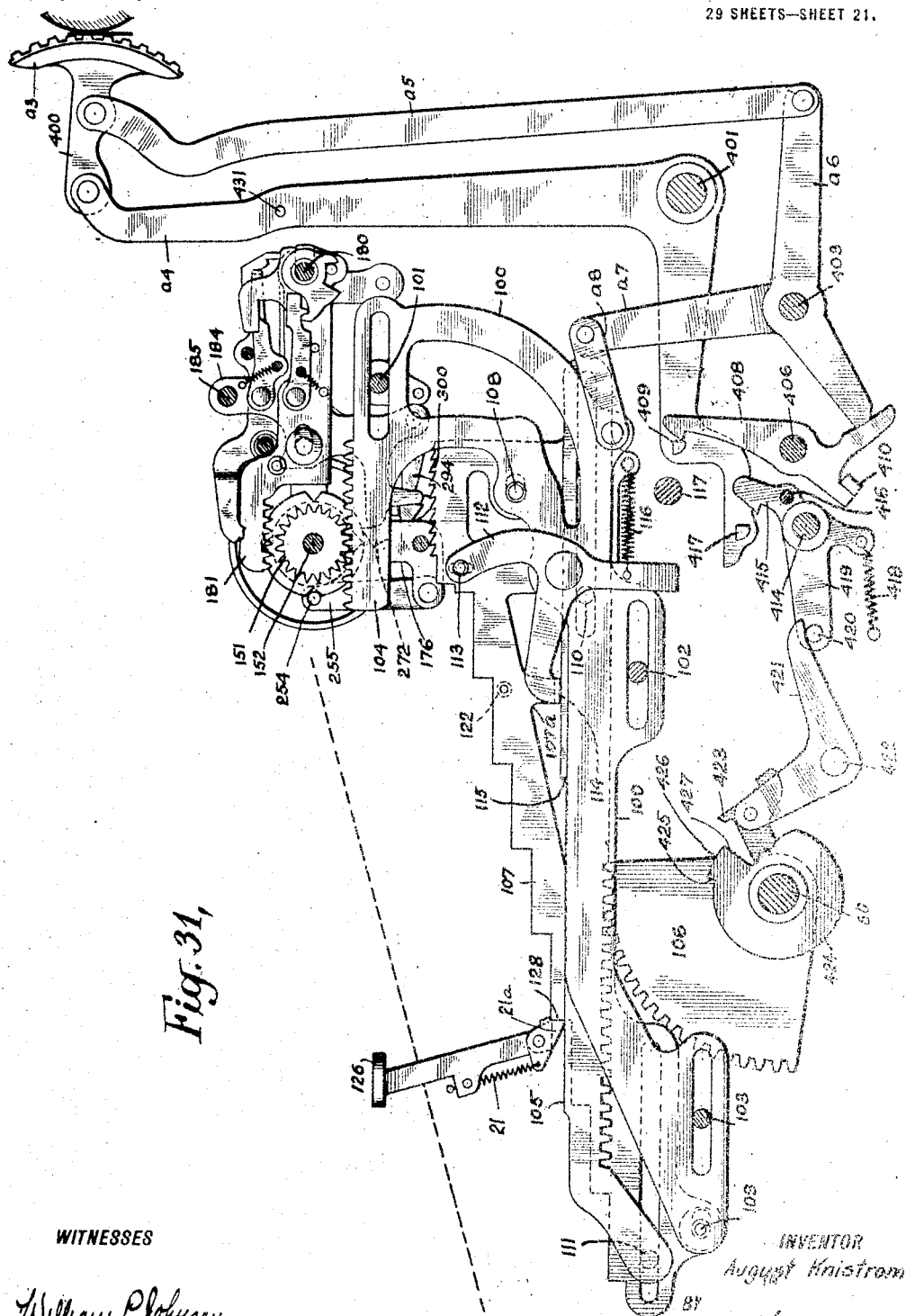

Fig. 31 is a detail side view, on a large scale and somewhat diagrammatic in character, illustrating the primary function of the digit keys, certain parts with which they coöperate, and a portion of the "transfer" or "carrying" mechanism; also one of the printing sectors in the act of printing.

Fig. 32 is a fragmentary plan view, on a large scale, of two of the interconnected accumulating or computing mechanisms, and part of a third. Fig. 33 is an end view of the same, and Fig 34 is a section on line 34—34 of Fig. 32.

Fig. 35 is a fragmentary sectional view on line 35—35 of Fig. 32, showing elements which take part in the "clearing" operation of the machine.

Figs. 36, 37 and 38 are fragmentary sectional views on planes indicated by the lines 36—36, 37—37 and 38—38, respectively, in Fig. 32; and Fig. 39 is a similar section on the same plane as Fig. 36, showing certain parts in different operative position and also showing certain parts which are omitted in Fig. 36.

Fig. 38$^a$ is a diagrammatic side view on a large scale, of certain parts of two consecutive and interconnected computing mechanisms.

Fig. 38$^b$ shows the adding cams in side elevation, removed from their actuating shaft but arranged in proper sequence from right to left, the blank disk $a^{15}$ for the lowest numerical or notational order being used as a mere spacing element in lieu of a cam.

Fig. 38$^c$ shows the subtracting cams in the same manner as the adding cams are shown in Fig. 38$^b$.

Figs. 39$^a$ and 39$^b$ are detail side views of the two supporting frames or plates used in the computing mechanisms.

Figs. 40, 41 and 42 are fragmentary side views, looking toward the left of the machine from the inside thereof, of certain parts associated with the subtraction key and the two total keys and actuated or set thereby.

Fig. 43 is a side view on a large scale of a portion of the ribbon-feed mechanism.

Fig. 44 is a vertical section of the dashpot and piston provided to prevent the machine being operated at too fast a rate.

Fig. 45 is a detail front view on a large scale, and partly in cross section, of two of the numeral wheels, and the associated computing gears, carrying disks, and clearing disks.

Figs. 46 and 47 are side views of two of the clearing disks, and Fig. 48 is a side view of one of the carrying disks.

Figure 1:
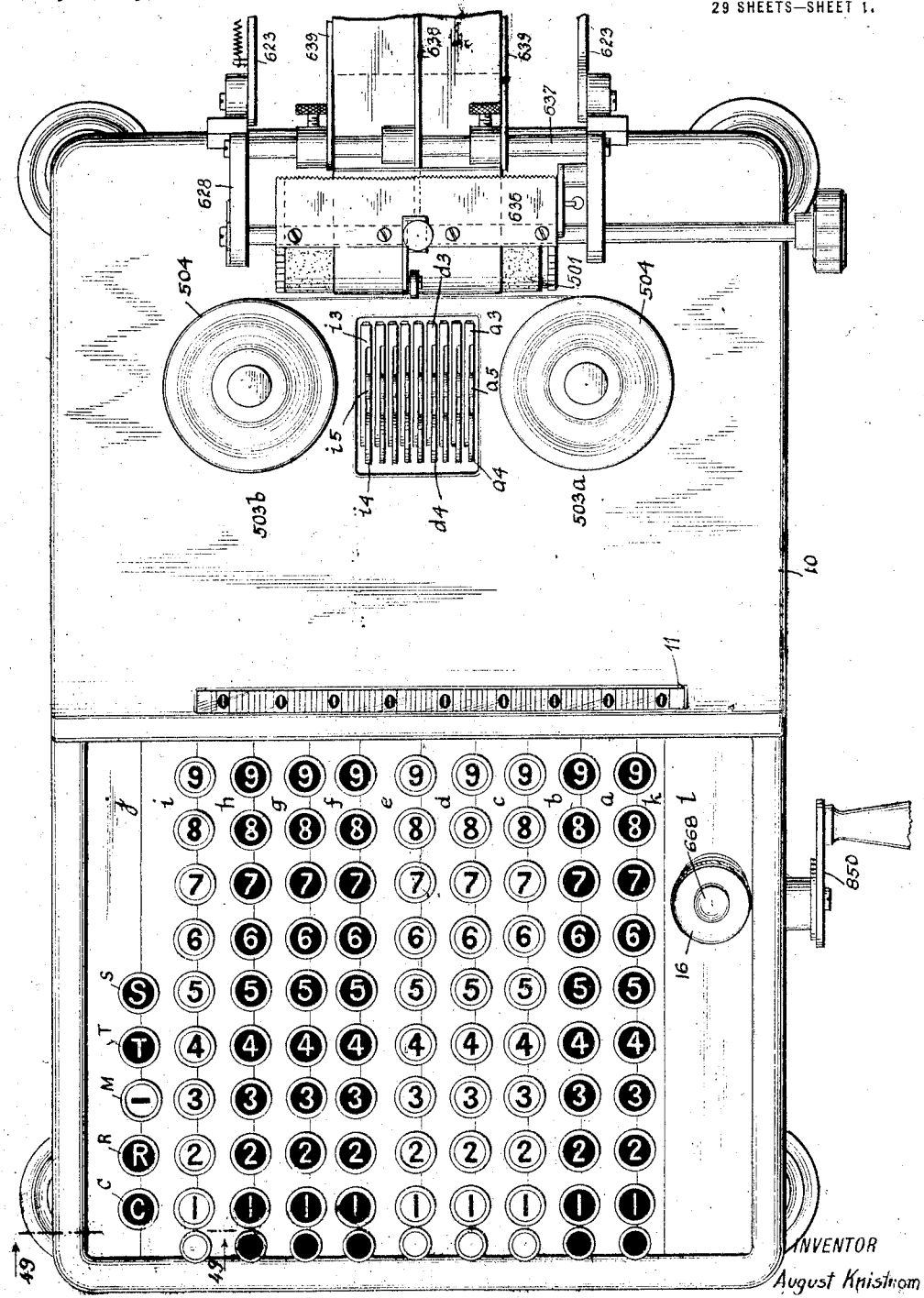
Figure 1 is a plan view of the complete machine.

Fig. 49 is a fragmentary and somewhat diagrammatic cross section, about on line 49—49 of Fig. 1, to illustrate the unlocking of the digit keys by the correction key.

Fig. 50 shows a portion of a record made by the machine, composed of eight "items" and the printed arithmetical sum thereof, the sum or total being in dotted lines to indicate that in an actual record it is printed in a different color.

Figure 4:
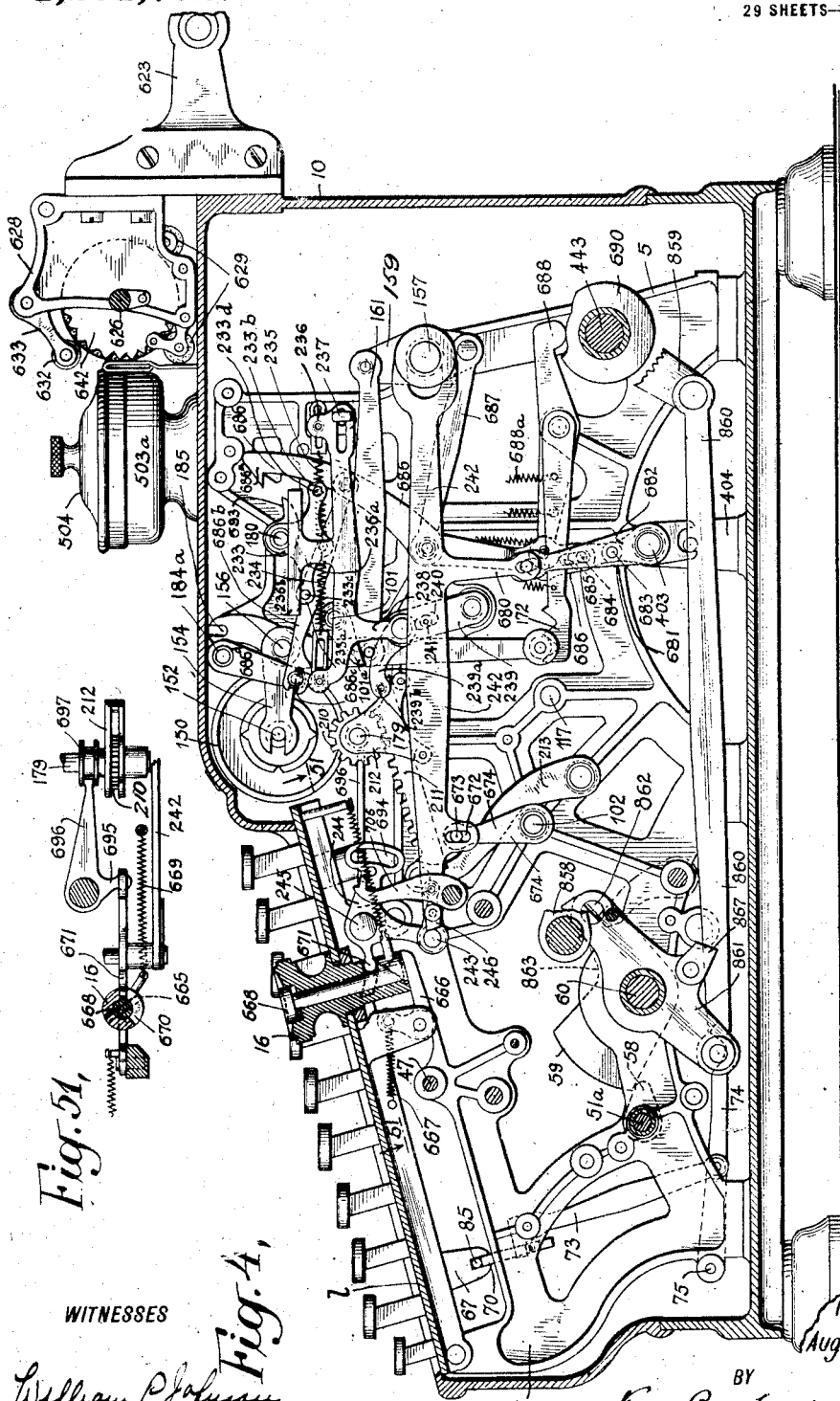

Fig. 51 is a detail view in section on line 51—51 of Fig. 4.

Fig. 52 is a detail rear elevation of a portion of the printing mechanism.

Fig. 52$^a$ is a detail elevation of the justifying mechanism.

Fig. 53 is a side view of the parts shown in Fig. 52.

Fig. 54 is a section on the same plane as Fig. 9, showing parts which may be added to the machine for the purpose of printing, alongside of the items and totals, characters indicative of the nature of the computing operation.

Fig. 55 is a rear elevation of the type sectors for printing items and total and also certain parts of the additional printing devices shown in Fig. 54.

Fig. 56 is a detail section on line 56—56 of Fig. 55, showing the character-printing sector; and Fig. 57 is a plan view of the same, together with the digit-printing sectors.

Fig. 58 shows a record made by the machine when equipped with the character-printing devices illustrated in Figs. 54 to 57 inclusive. In this record the letter "S", after the fourth imprint from the top, indicates that the number is the sum ("subtotal") of the preceding items, but that the machine is not "cleared". The minus sign, "—", indicates that the item with which it is associated is a subtrahend; or, in other words, a negative number which is to be added algebraically to the preceding accumulation. The letter "T" after the last imprint indicates that the number is the total sum (arithmetic or algebraic as the case may be) of all the items put into the machine and also indicates that the machine is clear.

As will be seen from the detailed description hereinafter, the various parts composing the machine are closely inter-related, a great many having two or more functions. Nevertheless the machine divides naturally into several mechanisms which to a certain extent can be described independently of each other, thereby making the description clearer. For convenience of reference, the following paragraphs are numbered, using Roman numerals for the purpose.

I. The working parts of the machine, with the exception of the printing hammers or sectors, the finger keys, the operating handle and certain parts of the paper-feed and ribbon mechanisms, are inclosed in a removable casing 10, the front portion of which is inclined in the usual manner. At the edge of the horizontal portion, just above the key-board, is a long, narrow window 11, closed with glass, through which the accumulation or grand total of the items put into the machine can always be read.

II. *Key-board mechanism.*—This mechanism is best shown in Figs. 18 to 24 inclusive.

III. In the present machine provision is made for nine notational orders, and the digit keys are accordingly arranged in nine longitudinal rows. The machine operates on the decimal system of notation, but upon studying the subjoined description any one skilled in the art can readily design the machine so as to compute in other systems, as for example pounds, shillings and pence, in which twelve units of the lowest order, (pence), make one of the next higher order, (shillings), and twenty of the second order make one of the highest order, (pounds). In the present machine the lowest order is referred to as the hundredths order and the next higher as the tenths, for the reason that these two orders usually indicate cents. Above the hundredths and tenths the orders may be referred to as units, tens, hundreds, thousands, etc., in the usual manner.

IV. The key-board is composed of separable sections $a, b, c, d, e, f, g, h, i, j, k, l$, Figs. 1 and 14, extending longitudinally of the machine and mounted side by side on transverse rods 12, 13, (Figs. 5 and 7), passing through holes 14, 15, (Figs. 19 and 20); said rods resting in sockets 6, 7, 8, 9, in the side frames 4, 5, so that when the casing 10 is taken off, the entire key-board can be lifted bodily of the machine. The key stems are flat and are mounted to reciprocate in correspondingly shaped notches in the right hand edges of the upper members of the key-board sections. The nine orders of digit keys are mounted in the sections $a, b, c$, ... $i$, and in section $j$ is a longitudinal row of five keys, bearing the designations S, T, —, (negative or "minus" sign), R, and C, as shown in Fig. 1. The key S is the sub-total key and is depressed when it is desired to print the total accumulation without "clearing" the machine. The key T is the grand-total key and is depressed when it is desired to print the total accumulation and, at the same operation, clear the machine. The minus or subtraction key M is depressed when the item "set up" on the digit keys is to be subtracted from the accumulation in the machine, key R is depressed when the item set up is to be repeatedly added or subtracted, and key C is depressed to release any and all depressed digit keys at any time (before the operating handle is actuated) to correct errors and the like. The keys are all held in their respective notches or grooves by the plane edges of the adjoining key-board sections on the right, the keys in section $a$ being held by the narrow section $k$. Section $l$ serves to support the subtraction button or knob 16 which (as is explained in Par. LVIII., hereafter) is turned manually as the preliminary step in the subtracting operation.

V. Each digit key is locked in depressed position by the following mechanism: Pivoted to the ends of the key carrier or key-board section, for example section $c$, Figs. 19, 20, 22, 23, 24, is a swinging bar 17, bent transversely for the sake of additional strength, and having fingers 18 held in yielding engagement with their respective digit keys by a light coil spring 19. When any key is depressed, a lug 20 on the edge thereof (see also Fig. 49) passes the coöperating finger 18, which swings the bar 17 away from the key. Said bar then immediately swings back, bringing the finger over the lug 20 and hence holding the key down. If the wrong key is depressed, it is only necessary to depress the correct one, with the same locking operation; but the outward swing of the locking bar by the second key releases the first key, which is instantly restored to raised or initial position by its restoring spring 21. If, however, a key is depressed when no key at all should be depressed in the given section, the error key 22 is depressed to release the incorrect key. This key has a shoulder 23 in engagement with an upwardly turned finger 24 on the locking bar 17, so that the depression of the key swings the bar in the unlocking direction, thus permitting any key that may have been locked down to spring back to raised position.

VI. As each key goes down, its lateral pin 25 engages and depresses a longitudinally extending universal bar 26 (middle portion broken away in Fig. 19) pivoted at its forward end to an arm 27 which is itself pivotally mounted on the lower member of the key-carrier. At its rear end the universal bar is pivoted to an arm 28 of a bent lever $28^a$ pivoted on the lower end of the key-carrier and urged counterclockwise (as viewed in Fig. 19) by a light spring 29, so that the said universal bar is held normally in raised position. Depression of the bar swings the arms 28, 27, downwardly, thereby depressing the horizontal plate 30 at the forward end of arm 27 and drawing down the arm 31 which is pivoted to the arm 27 immediately above said plate and at its upper end has a slot 32 engaged by a lateral pin 33 on a finger 34 mounted on a square rock shaft 35 which extends clear across the key-board from side to side. (See also Figs. 6 and 7.) The arm 27 is fixed to one end of its pivot 36, which at its other end has fixed to it a depending arm 37, so that said arm 37 is swung rearwardly (toward the left as seen in Fig. 19), and carries in the same direction the horizontal link 38 which is pivoted to it. The purpose of the parts 30 to 38, inclusive, is explained in Par's XV, XVIII and XL, below.

VII. Below the plane of the pins or studs 25 is a locking bar 39, slidable longitudinally on the supporting pins 40, 40, which are mounted on the vertical bars 41, 41, fixed to the upper and lower members of the key-carrier frame c, Fig. 19. This locking bar is provided with upwardly and rearwardly extending hooks 42, which normally lie below and to the right (as viewed in Fig. 19) of the key studs 25. After an item is set up on the key-board by depression of the appropriate digit keys each locking bar 39 is moved rearwardly (toward the operator as he stands in front of the key-board) by the mechanism described in Par. VIII, thereby bringing a hook 42 over the stud 25 of each depressed digit key and other hooks 42 under the studs 25 of the undepressed keys. The depressed digit keys therefore cannot be raised even though the locking bars 17 should be disengaged therefrom, as by depression of error keys 23 or by other means, nor can the undepressed digit keys be pressed down. It will be observed that the lower edges of the hooks 42 on the locking bars 39 are inclined. This makes each hook a cam, so that if any key is only partly depressed the inclined edge of the coöperating hook, engaging the stud 25 of the partially depressed key, will as the bar 39 moves rearwardly, cam the key positively down, thus insuring complete depression of the key.

Figure 3:
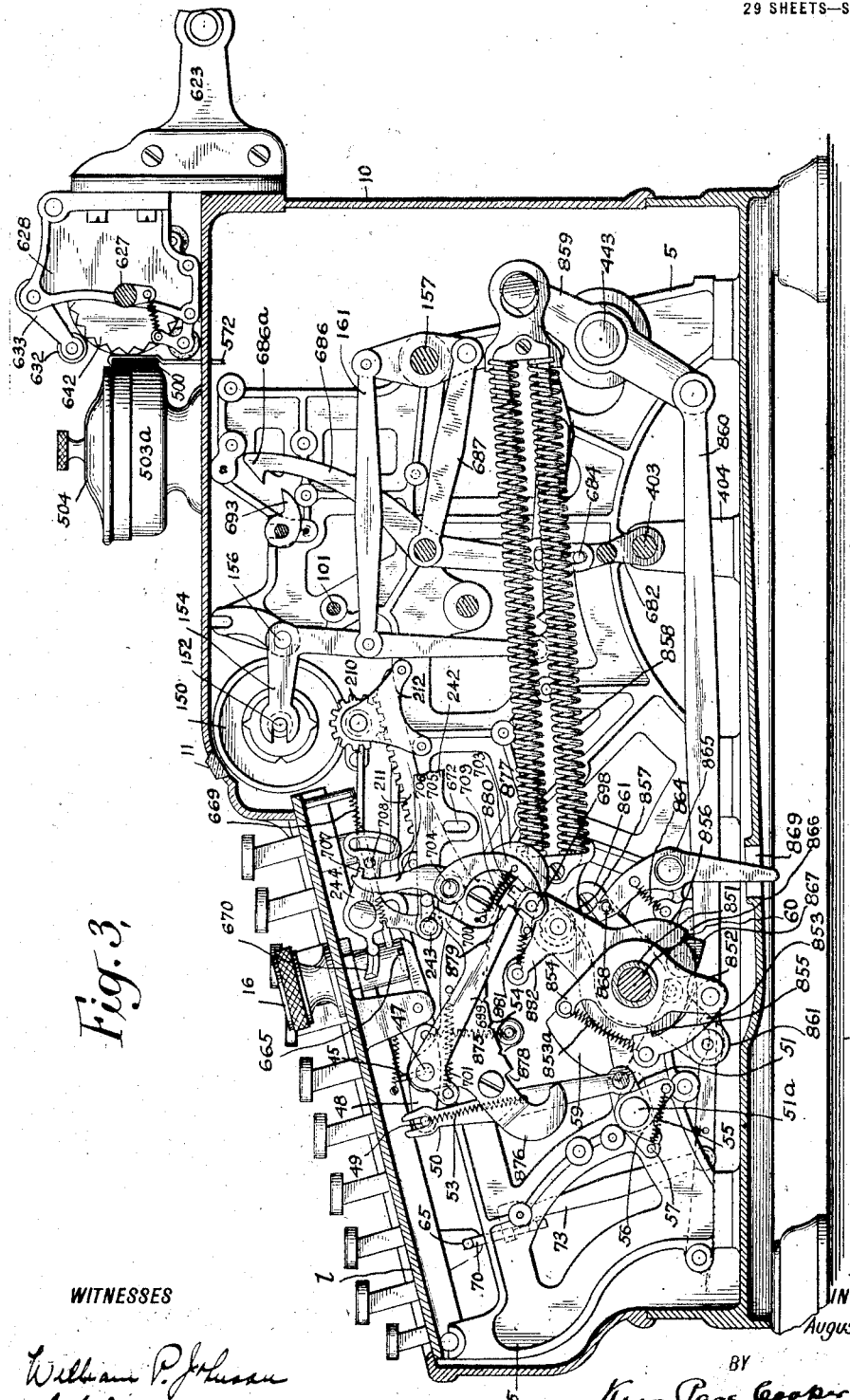
Figs. 3, 4, 5, 6, 7, 8, 9, 10 and 11 are vertical longitudinal sections on planes indicated by the lines, 3—3, 4—4, 5—5, 6—6, 7—7, 8—8, 9—9, 10—10 and 11—11, respectively, in Fig. 12; omitting various parts in some of the figures to avoid confusion and make clearer the parts that are shown.
Figure 5:
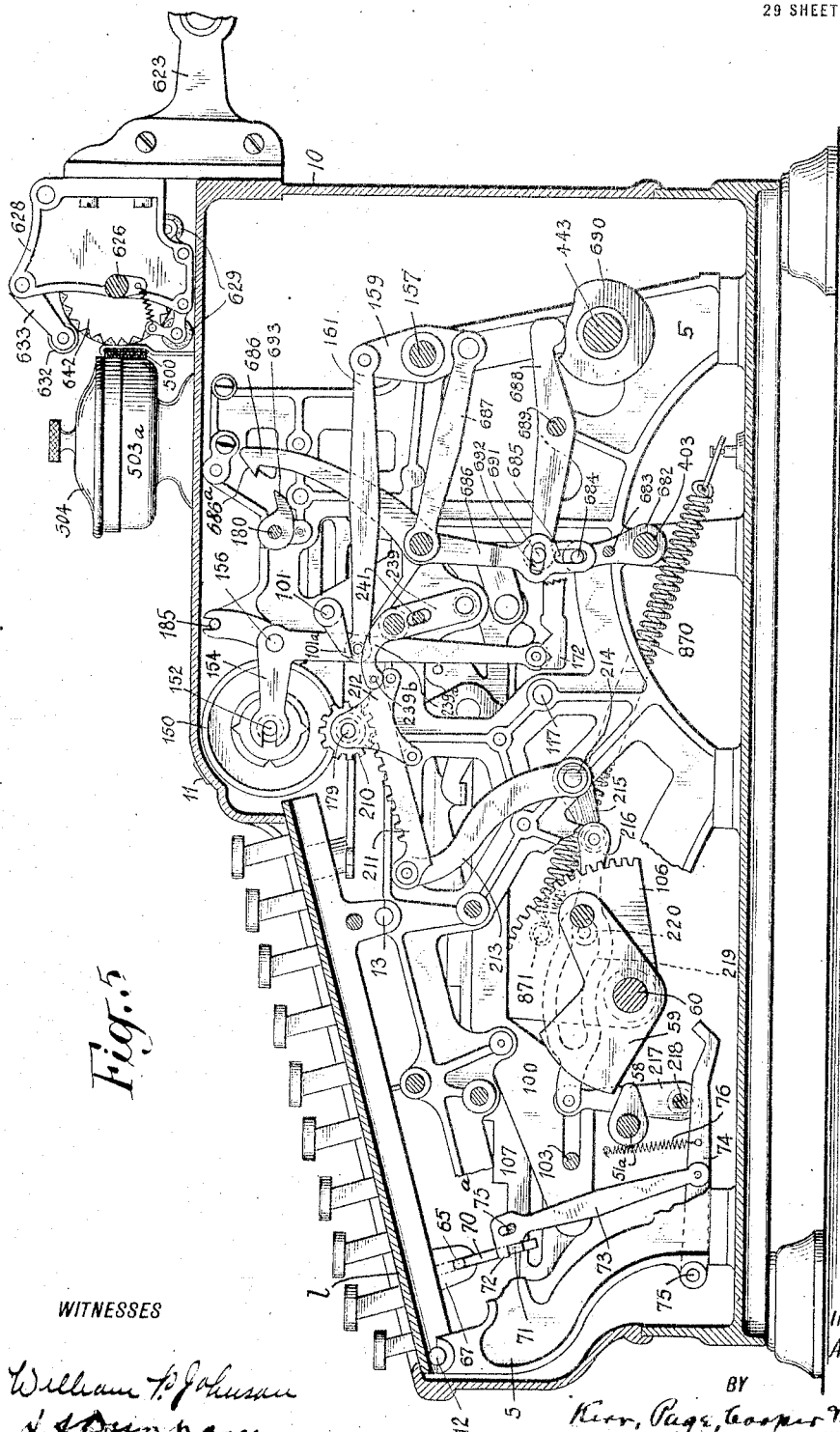

VIII. The locking bars 39, described in Par. VII, are actuated by the following mechanism: On the left hand side of each bar 39 near the middle thereof is a pair of spaced pins 43, Figs. 19 and 22, between which extends a finger 44 on a flat bar 45 which extends across the entire key-board and is removably mounted in slots in the ends of stems 46, 47, Fig. 12, rotatably supported in the upper portions of the side frames 4, 5. Manifestly, when this bar is rocked it will shift the locking bars 39 as described in the preceding paragraph. To effect this locking of the actuating bar 45 the stem 47, at the right hand side of the machine (see Fig. 3) and just outside of the side frame 5, is provided with a lever 48 which at its rear end has a stud 49 seated in a fork in the upper end of a link 50 pivoted at its lower end to a lever 51 loosely mounted on a stem or short shaft 51ª journaled in the lower part of side frame 5. The stud 49 on lever 48 is connected to link 50 by a coil spring 53, so that if lever 51 is rocked clockwise (as viewed in Fig. 3) the link will rock lever 48 counterclockwise against the tension of the lighter spring 54 which is connected to the opposite end of the last named lever. This of course rocks the locking bar 45 and locks the digit keys as described in Par. VII. The lever 51, which actuates the link 50 as just explained, is loose on the fulcrum 51ª but is connected by a spring 55 to the tail of a dog 56 which is fixed to the said fulcrum or shaft 51ª. The effect of the spring 55 is to hold the parts normally in the relative positions shown, with the toe of the dog in contact with the stud 57 to which one end of the spring is connected. Fixed to the fulcrum or shaft 51ª inside the frame 5 is a short forwardly extending finger 58 (Figs. 4 and 5) in the path of a cam 59 fixed on the main operating shaft 60. Consequently when the main shaft 60 is rocked counterclockwise (as seen in Figs. 3, 4 and 5) the advancing edge of cam 59 depresses the finger 58, thereby rocking dog 56 clockwise which, by engagement with the stud 57, rocks the lever 51 in the same direction. This operation is one of the first performed by the machine when the main shaft 60 is rocked. At an appropriate instant the cam passes the finger 58, thus allowing spring 54 to swing lever 48 (and hence bar 45 also) back to normal position, unlocking all the digit keys by the homeward movement of locking bar 39. When the main shaft 60 rocks back (clockwise as seen in Fig. 3) and with it the cam 59, the latter moves past the dog 58, extending the spring 55 if the associated parts have already been moved home by the spring 54. If not, the pull exerted by the cam on the spring 55 aids the spring 54 to return the parts against such obstacle (gummed oil, dirt, or the like), as may have obstructed their movement. If the resistance is too great to be overcome by the combined tensions of the two springs they are simply extended by the passing of the cam, and hence none of the parts can be strained.

IX. Inasmuch as the depressed digit keys are locked not only by the locking bars 39, as described in Par. VII, but also by the locking bars 17 as described in Par. V., the latter bars must also be actuated to release the depressed keys. This is effected at the proper time (as explained below) by the following mechanism: Extending clear across the key-board near the foot thereof is a universal bar 65, Figs. 5, 12, 19, 20, and 24, mounted in depending ears or lugs 66, 67, (Figs. 5 and 11), on the sections j and k of the key-board, so as to be capable of sliding movement transversely of the machine. This bar 65 is provided with upwardly extending lugs 68 which in the normal position of the said bar lie close to and at the right of depending lugs 69 on the locking bars 17, so that when the bar 65 is shifted toward the left of the machine each lug 68, coöperating with the contiguous lug 69 on the adjacent locking bar 17, will swing the latter and so release whatever digit key was locked by it in depressed position, as described in Par. V. The described leftward movement of the releasing or unlocking bar 65, is effected through the medium of a finger 70 (Figs. 5 and 49) fixed to and depending from the right hand end of the bar. This finger has a beveled lug 71 on its right hand side, in the path of a finger 72 on the top of a reciprocatory member 73 pivoted at its lower end to a lever 74 fulcrumed at 75 on the inside of the frame 5. When the cam 59, rocked counterclockwise as described in Par. VIII., engages the front end of lever 74 it depresses the same, thereby drawing down member 73 (the slotted upper end of which is guided by a pin 75ª fixed on the inside of frame 5) which causes finger 72 to engage the inclined lug 71 and thus cam the bar 65 toward the left of the machine. When cam 59 swings back to home position it allows the coil spring 76 to raise lever 74 and member 73, which in turn permits the locking bars 17, swinging under the tension of their restoring springs 19, to shift the releasing bar 65 back home by the engagement of lugs 69, on the locking bars, with lugs 68, on the releasing bar. The described actuation of releasing bar 65 by cam 59, lever 74 and associated parts, occurs at the end of the counterclockwise movement of cam 59, at the same time that the locking bars 39 release the depressed digit keys as described in Par. VIII.

X. The releasing bar 65 is not only slidable, as described in Par. IX., but is also capable of limiting rotary movement, clockwise as viewed in Figs. 5 and 9, thereby swinging the depending arm 70 and carrying the inclined lug 71 out of the path of the finger 72 on the reciprocatory member 73. This means that when the latter member is drawn down the releasing bar 65 will remain stationary, with the result that any depressed keys locked by the locking bars 17 will remain locked in depressed position. This is as it should be when the same item is to be added or subtracted two or more times, and obviates the necessity of repeatedly setting up the item. This "repeating" is brought about by the repeat key R, Figs. 9 and 10. When this key is depressed, its lower end engages and rocks an arm 80 fixed on the left end of the bar 65, thus rocking said bar in the same direction and holding it in the position to which it is rocked so long as the repeat key is depressed. Upon release of the repeat key its spring 81 raises it to normal position and spring 82 does the same for the arm 80 and bar 65. The arm 80 also serves, in the following manner, to lock the repeat key in normal position at appropriate times: Underlying a lateral stud 80ª on the said arm 80 is a lever 83, Figs. 9 and 10, fulcrumed at 83ª on a rigid support 83ᵇ, and normally occupying the position shown in the figures named, far enough below the said stud 80ª to permit the arm 80 to be depressed. The front end of lever 83 is forked to engage a stud 84 on a pivoted member or frame 85, (more fully described in Par's XL. and XLI., hereafter), said stud 84 being directly below and in contact with the foot of the grand total key T. Hence when the key T is depressed it rocks lever 83 clockwise (as seen in Fig. 9) thereby bringing the rear end of the lever up closer to stud 80ª on arm 80. Then when the frame 85 is further actuated (as explained in Par. XLI) it brings the inwardly turned end 83ᶜ of lever 83 (see Fig. 9ª, which is an end view of the lever) into coöperation with stud 80ª and cams the stud, arm 80, and bar 65 toward the left of the machine. This releases all the digit keys (see Par. IX) and hence prevents a wrong total that might be printed by having one or more keys depressed. The same result follows depression of the subtotal key S, which overlies a stud 86 (Fig. 10) on the same frame 85, so that the latter is actuated, with consequent rocking of lever 83, whenever the subtotal key is depressed.

XI. The movement of bar 65, Fig. 9, to release all depressed digit keys as explained in Par. X, can also be effected by depression of the correction key C, which is provided to permit instant clearing of the entire key-board whenever desired, as for example by reason of an error in the item set up. On top of the arm 80, which is fixed to said bar 65, is a beveled lug 87, in the path of a small plate 88 extending forwardly from the correction key C. Hence depression of the last named key will cam the bar 65 leftwardly. The correction key is restored to raised or normal position by a light coil spring 89, Fig. 10.

XII. At the bottom each digit key is provided a small dog, such as is shown at 21ª, for example, in Figs. 19, 20 and 22, having its heel connected to the key-restoring spring 21, and having a lateral toe 21ᵇ to bear on the lower end of the key and limit the clockwise swing of the dog by the spring 21 and by pressure against the forward end of the dog. The release of the digit keys, and their consequent restoration to initial position, as described in Par's VIII. and IX., occurs before the advanced sliders 100 (Par's XIV. and XVI.) are retracted. Hence as soon as the depressed keys are raised to initial position another item may be set up on the keyboard. This brings the dogs 21ª, on the newly depressed keys, down into the paths of the stepped members 107 (Par. XIV.) but without any effect upon the latter since the said dogs are free to swing counterclockwise as seen in Fig. 19. This feature materially increases the speed with which the machine may be operated, since the operator need not wait to set up the next item but may set it up as soon as he has pulled forward and released the actuating handle 850, described in Par. LXXXVI.

XIII. *Devices for actuating the accumulating mechanism.*—Mounted side by side across the machine and under the keyboard are nine sets or combinations of reciprocatory elements, (Fig. 12), designated generally by the letters $a^1, b^1, \ldots i^1$, and appropriated, respectively, to the digit keys of the correspondingly lettered keyboard sections $a, b, c, \ldots i$. These reciprocatory mechanisms or combinations are all alike and for explanation of their construction and operation reference may be made to Fig. 31.

XIV. Referring to Fig. 31, 100 designates a slider of sheet metal mounted to slide longitudinally of the machine on three transverse rods or shafts 101, 102, 103, and having on its upper portion an overhanging rack 104, with upwardly disposed teeth. Alongside of the slider, to the left thereof and in contact therewith, is a sheet metal rack member 105 having downwardly disposed teeth on its forward portion to mesh with a sheet metal gear segment 106 fixed on the main shaft 60. Alongside of and in contact with the rack member is a stepped controlling member 107, having short horizontal slots engaged by pins 108, 109, on the slider 100, so as to be supported by and to have limited longitudinal movement relative to the slider. The rack 105 is provided with lateral pins 110, 111, engaging long horizontal slots in the stepped member. This construction supports the rack on the stepped member and permits extensive longitudinal movement of the rack with respect to the other two elements. On the slider 100 is a dog or three-armed lever 112, pivoted at the juncture of the arms and having on its upper arm a pin 113 engaging a short vertical slot in the stepped member 107, so that movement of the slider relative to the stepped member will rock the lever. The horizontal arm or finger of the dog 112 is provided with a laterally bent finger 114, overhanging the upper edge of the rack 105, which is provided with a shoulder 115 to engage said finger and thereby advance the slider 100, and stepped member 107 together with rack 105 when the gear segment 106 is rocked toward the operator by actuation of the operating handle of the machine. It will be observed that the teeth on the rack 105 (Fig. 14) are above the adjacent lower edges of the slider 100 and stepped member 107. This is an important feature of the construction, as it absolutely insures constant mesh of the rack and the gear segment 106, and, since the gear segment is fixed on the shaft 60, prevents lateral displacement of the parts 100, 105, 107, holding them in a fixed vertical plane. The lever 112 is urged counterclockwise, as viewed in Fig. 31, by a coil spring 116, connected to the lower arm of the lever and to a lug depending from the rear end of the stepped member 107. When the parts described in this paragraph are in their normal or initial position, shown in Fig. 7 for example, the spring 116, in swinging the lever 112 counterclockwise, moves the stepped member forward (leftward as seen in Fig. 7) with respect to the slider 100. The swing of lever 112 is limited in one direction by the finger 114 striking the upper edge of rack 105 and in the other by the finger striking the lower edge of a lug $107^a$ depending from the stepped member 107.

XV. The finger 114 (Fig. 31) on lever or dog 112 is brought positively into the path of the shoulder 115 of rack member 105, so that when the latter is advanced by the gear segment 106 the slider 100 and stepped member 107 will also be advanced, by the following devices, shown best in Figs. 8 and 9: On shaft 117 (see also Figs. 14 and 15) is an upwardly extending arm 118 and pivoted at the top thereof is a horizontal bar 119 having at about the middle of its upper edge an inclined shoulder 120 to coöperate with a pin 121 on the link 38 (Fig. 19) pivoted to the depending arm 37 (see Par. VI). The link 38 underlies, and is held down by, a pin 122 on the side of the stepped controlling bar 107. On the rear end of link 119 is a dog 123 having an inclined toe in the path of the finger 114 on lever 112 and swung counterclockwise (as seen in Fig. 9) by a light coil spring 124, the swing of the dog being limited by its pin 125 striking the lower edge of the link 119. Suppose, now, that a digit key is depressed, for example key 126, Fig. 31. This swings arm 37, as explained in Par. VI., drawing link 38 toward the left as seen in Fig. 9, and bringing the pin 121 so far to the left of shoulder 120 that link 119 cannot swing up. Depression of the aforesaid digit key also brings the pawl $21^a$ thereof into the path of step or shoulder 128 on the stepped member 107. The operating handle is now pulled toward the operator, rocking the main shaft 60 and gear segment 106 in the same direction. This advances the rack 105, as described in Par. XIV, the shoulder 115 thereon approaching the finger 114 on the lever 112. The shaft 117 is now rocked counterclockwise, as seen in Fig. 9 (by main shaft 60 through the medium of parts hereafter described) and advances dog 123, the toe of which is in contact with the finger 114. This positively cams the finger 114 down into the path of the shoulder 115, so that as the rack 105 continues to advance the said shoulder picks up, so to speak, the slider 100 on which the lever 112 is fulcrumed. Thus the slider 100, rack 105, and stepped member 107 are advanced together, as described in Par. XIV.

Figure 8:
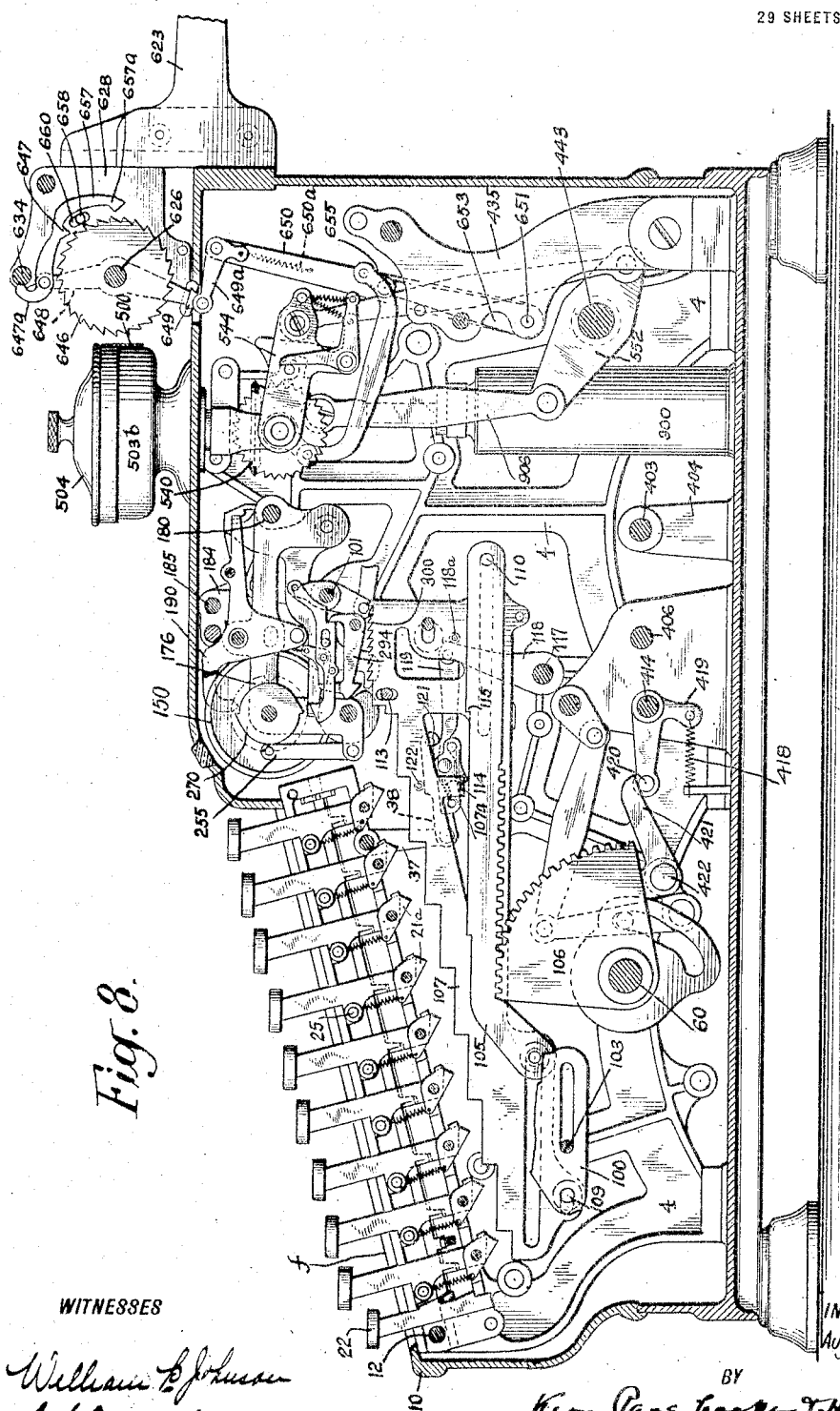

XVI. The pawl 21ª on digit keys 126, Fig. 31, being in the path of the step 128 when the stepped member 107 is advanced as described in Par's XIV and XV, the latter is arrested when said step encounters the pawl. The rack 105, however, continues to move forward, (and with it the slider 100), since it is in constant mesh with the gear segment 106, thus rocking lever 112 clockwise (as seen in Figs. 7 and 31), lifting the finger 114 out of engagement with the shoulder 115 and hence disconnecting the slider 100 and stepped member 107 from the rack 105. The latter then continues its movement independently to the end of its stroke. The slider 100 may have only a slight movement with reference to stepped member 107, this movement being sufficient to disengage the lever 112 from the rack 105. While the rack 105 is being returned to home position by the homeward swing of the gear segment 106, the shaft 117 is rocked (by means explained in Par. XVII.) clockwise as seen in Figs. 8 and 9, and the upper end of arm 118, engaging a stud 118ª on the stepped member 107, retracts the said member and the sliders 100. It is to be understood that each slider, stepped member and rack combination is provided with mechanism as described in Par's XIV and XV, to cause the advancing rack to pick up the other members.

XVII. The shaft 117, (Fig. 6) is rocked, for the purpose of causing the racks 105 to pick up the sliders 100 and stepped members 107 as described in Par. XV, by the following mechanism: The particular arm 118 which is associated with the reciprocatory devices $a^1$, Fig. 12, (and therefore shown in Fig. 6) is provided with a depending tail 130 pivoted to a link 131, which is also pivoted to the upper end of a lever 132 fulcrumed on a stud 133 fixed to the side frame 5. Midway between its ends this lever has a stud 134 projecting laterally into a cam slot 135 in a cam 136 fixed to the main shaft 60. Hence, when shaft 60 and cam 136 are rocked counterclockwise (as seen in Fig. 6) by pulling the operating handle toward the operator, the lever 132 is rocked clockwise, thereby actuating shaft 117 and all the arms 118 fixed thereto. The movement of the arms 118 produced by the cam 136 and associated mechanism is sufficient to keep dogs 123 (Fig. 9) in engagement with the respective fingers 114 (thereby keeping said fingers positively in engagement with the respective shoulders 115 on the racks 105) throughout the entire advancing movement of the sliders 100, which, it will be remembered, carry the dogs 112 having said fingers 114 (see Par. XIV.). If the slider and stepped bar should be brought to rest, short of their extreme forward position, by a depressed digit key, the shoulder 120 (Fig. 9) on the forwardly moving link 119 has by that time passed the pin 121 on the link 38. Hence when the slider is arrested, the pressure of the dog 123 on the finger 114 causes link 119 to swing up, thus permitting the dog to pass idly above and beyond the finger. On the return or homeward movement of the arm 118 the backwardly moving link 119 carries the dog idly past the finger 114, the dog rocking clockwise (as seen in Fig. 9) as the finger is passed, if by that time the link is in such position with respect to pin 121 as to be held down thereby.

XVIII. The forward movement of the sliders 100, produced as described in Par's XIV and XV, should be directly proportional to the numerical value of the depressed digit keys; for example, the distances traversed by a slider when its key for the digit 1 is depressed and when the key for 9 is depressed, should be in the ratio 1:9. By inclining the keyboard, and inclining the stepped edges of the members 107 correspondingly, it is possible to arrange the keys and the steps or abutments on a principle analagous to that of the well known vernier scale. In the machine illustrated the nine digit keys occupy substantially the space of eight steps or abutments on the stepped members. By this method, slider-movements directly proportional to the numerical values of the several digits are permitted with a keyboard of minimum dimensions and with slider mechanism of a very simple character. If, in setting up an item on the keyboard, none of the digit keys is depressed in the group or order associated with a given slider mechanism the slider should not be moved forward at all. This is effected by the plate 30 (Fig. 19) which, when no digit key is depressed, remains in the path of the rack 104 (Fig. 6) and so holds the slider stationary. In this case the lever 112 cannot be rocked by the dog 123 (as in Par. XV), since to do so would involve a forward movement of the stepped member 107 independently of the slider 100,—a movement which cannot occur because the stud 108 on the slider lies at the right end of the horizontal slot in which it works in the stepped member. Hence instead of the dog 123 depressing the finger 114, the latter, coöperating with the inclined toe of the advancing dog, causes the link 119 to swing up, the shoulder 120 (Fig. 9) passing upwardly and to the rear of the pin 121. Hence when the shoulder 115 (Fig. 8) reaches the finger 114 it either does not find the finger in its path or, if it does, it simply swings the lever or dog 112 on its fulcrum, thereby moving the stepped member 107 slightly backward until the said finger is clear of the shoulder. Thereafter, the rack 105 advances idly, free from both the slider and the stepped member. If, however, a digit key had been depressed, the plate 30 (Fig. 6) would have been depressed (as explained in Par. VI) below the rack 104, leaving the slider 100 free to move forward.

XIX. The differential movements of the sliders 100, proportional to the numerical values of the depressed digit keys as described in Par. XVIII, are utilized in the following manner: Above the racks 104 (Fig. 6 for example) is a series of computing or adding and subtracting mechanisms, one for each section of the keyboard and hence one for each slider. These mechanisms are designated by the letters $a^2$, $b^2$, ... $i^2$, in Fig. 12. Each includes a numeral wheel 150 (Fig. 45) rigidly connected to a co-axial counting or computing gear 151, the connected wheels and gears being mounted to rotate freely on a transverse shaft 152 and arranged with the gears directly above their respective racks 104 as clearly indicated in Fig. 15. The shaft 152 is non-rotatably mounted in the forked ends of the rearwardly extending horizontal arms of a pair of bell cranks 153, 154, fulcrumed at 155, 156, the first named bell crank being mounted on the inside of the frame 4, and the other on the outside of frame 5; see Figs. 3, 4, 5, 9, 10, 11, 12 and 15.

XX. The numeral wheels 150 each bear on their peripheries two sets of digits, 0, 1, 2, ... 9, and are arranged with the teeth of their associated counting or adding gears 151 in proper angular or phase relation to these digits; the gears each having twenty teeth, to correspond to the twenty digits on the wheels. The normal position of the bell-cranks 153, 154, (which, as described in Par. XIX, support the shaft 152 on which the said gears and wheels are mounted), being as shown in Figs. 5 and 11, with the gears out of mesh with the racks 104, as indicated in Fig. 6, for example, it is evident that the direction of rotation of the gears when rotated by the moving racks 104 depends upon the time at which the supporting bell-cranks are rocked to depress the shaft 152 and hence bring the gears 151 into mesh with the aforesaid racks. If the gears are not depressed until after the racks have been advanced (as described in Par's XIV and XVIII) and are ready to start home, the rotation of the gears and numeral wheels will be counterclockwise and hence the machine will add; the digits on the numeral wheels being arranged so that their numerical values increase in the clockwise direction, as indicated in Figs. 12 and 15. On the other hand, if the gears are depressed into mesh with the racks before the latter are advanced the rotation will be clockwise.

XXI. The bell-cranks 153, 154 are rocked, to depress the shaft 152 and hence carry the counting or computing gears 151 into and out of mesh with the actuating racks 104 for the purpose explained in Par. XX., by the following mechanism, the description being confined for the present to the adding functions of the machine. At the back of the machine is a transverse shaft 157, Figs. 3, 5, 9, 10, 11, 12, journaled in the side frames 4, 5, and having fixed to it at or near its ends two levers 158, 159, connected at their upper ends by links 160, 161, to the depending arms of the bell-cranks 153, 154, so that rocking the shaft 157 will rock the bell-cranks in the opposite direction, as will be readily understood. The shaft is rocked by a reciprocatory link 162 pivoted to the depending arm of lever 158 (Fig. 11) and having at its rear end a stud 163 extending laterally into a curved slot in a vertical lever 164 fulcrumed at 165 on the side frame 4. With the stud in the bottom of the slot it is plain that when the lever 164 is rocked counterclockwise (as seen in Fig. 11) the shaft 157 is rocked in the same direction, thereby swinging the bell-cranks 153, 154 in the opposite direction and hence bringing the computing gears 151 down into mesh with the actuating racks 104.

XXII. The lever 164 is oscillated, for the purpose described in Par. XXI, by the following mechanism: At the top of the lever is pivoted a link 166, which extends rearwardly (rightwardly as seen in Fig. 11) into pivotal connection with the upper end of a lever 167 fulcrumed at 168. This fulcrum is carried by a movable element (336) which in the present operation has no movement and may therefore be regarded as fixed. It is described fully in Par. XLVII. The lever 167 is composed of two flat plates (see Fig. 14) fixed together but spaced apart to straddle the curved or outer edge of a sector plate 169 fixed on the main shaft 60 just outside the frame 4. On the outer face of this sector is a curved or arc-shaped locking member 170 which, contacting with the tail of lever 167, locks the same, and the parts connected with it, in the positions shown in Fig. 11, the bell-cranks 153 and 154 being in their normal positions with the computing gears 151 above and out of mesh with the racks 104, as in Fig. 10 for example. When the main shaft 60 and the sector 169 are rocked clockwise (as seen in Fig. 11) by pulling the operating handle 850 toward the operator, the locking member 170 is first carried from under the outer half of lever 167, thereby unlocking the same. In the meantime the sliders 100 and racks 104 are being advanced as described in Par. XIV; and while they are so moving, the sector 169 continues its movement. Finally, just as the said racks and sliders come to rest the sector brings a stud 171, on its inner or right-hand face, into engagement with the tail or lower end of the inner half of the lever 167 and rocks the lever counterclockwise (as seen in Fig. 11). This advances the link 166 and actuates the lever 164 with resulting depression of the counting gears 151 into mesh with the racks 104, as described in Par. XXI. The retraction of the sliders 100 and racks 104 by the return movement of the gear segments 106, then rotates the computing gears and numeral wheels in the adding direction as described in Par. XX. Whenever the bell cranks 153, 154 are rocked for the purpose explained, namely, to bring the counting gears into mesh with the racks 104, the studs on their lower ends, normally engaged by the notched ends of the spring raised detent arms 172, Figs. 4 and 11, pivoted on the side frames 4, 5, cam down the detents and land in the second notches therein, which serve to hold the bell-cranks in the position to which they have been brought. While the gears 151 are being rotated by the racks 104 the sector 169 is of course returning to its initial position. This withdraws the lug 171 from coöperation with the lever 167 and, as the racks 104 reach their home positions and the gears 151 therefore cease to rotate, the end of the locking piece 170 meets the tail of said lever and rocks the latter clockwise (as seen in Fig. 11), thereby rocking lever 164 in the same direction, retracting link 162, and, through the medium of shaft 157, arms 158, 159, and links 160, 161, rocking the bell-cranks 153, 154 back to normal position. This raises the gears 151 out of mesh with the racks 104 and snaps the studs on the lower ends of the said bell-cranks again into the first notches in the detents 172.

XXIII. *The transfer or carrying mechanisms.*—When in any given notational order the sum of the digit to be added, and the digit in the same order at the window 11, exceeds ten, it is of course necessary to carry one to the next higher order. Thus, for example, if in the units column the number five is already "in the machine" and seven is to be added thereto, the units wheel 150 must be rotated to two, and one must be carried over to the wheel 150 and gear 151 of the tens column. The mechanism provided for effecting this carrying or "transfer" will now be explained.

XXIV. Consider Fig. 38ª, in which in order to simplify the explanation, only parts belonging to two consecutive orders (units and tens, for example) are illustrated. The disk 173 is assumed to belong to the lower of the two orders, and is fixed to the lower order-adding gear 151 which is not shown in Fig. 38ª. The said disk has two teeth 174, 175, corresponding to, though not in axial alinement with, the two zeros on the lower-order numeral wheel 150 (not shown in Fig. 38ª), and in the adding operation of the machine is rotated in the direction of the arrow by the lower-order rack 104 (not shown) meshing with the lower-order adding gear 151. The remaining parts shown in Fig. 38ª belong to the next higher order, which should be kept in mind throughout the subjoined description. The shaft 152 passes through a series of frame pieces 176, Fig. 35, (omitted from Fig. 38ª), having depending legs 177 and 178 in the former of which is mounted a rotatable cam shaft 179. At the rear the frames 176 are supported loosely on a transverse shaft 180 mounted rotatably in the side frames 4, 5. Hence the frames 176 partake of the up and down movements of the shaft 152, and, in doing so, swing on the shaft 180 as an axis. The rack member 181, Fig. 38ª, (and all of the other similar rack members) has its rear end forked, as shown, and embracing the shaft 180, while its forward portion is slotted, as at 182 (Fig. 36), to receive a pin 183 on one of a series of fixed frames 184 supported by the shaft 180 and also by a transverse rod 185 removably mounted at its ends in the side frames 4, 5. It will therefore be seen that the rack members 181 can slide horizontally a limited distance but cannot move vertically. Hence depression of the shaft 152 (as explained in Par's XXI and XXII) carries the gears 151 (Figs. 45 and 31, for example) out of mesh with the said rack members 181. With the exception of the rack member 181, and pawls 199, 204, the parts shown in Fig. 38ª are mounted on or associated with the appropriate frame 176 and consequently swing up and down, in unison with the shaft 152, about the shaft 180 as an axis.

XXV. Referring again to Fig. 38ª the tooth 175 on disk 173 (which, as stated in the preceding paragraph, rotates with the adding gear of the lower of the two orders under consideration) is at the "five position," and it is assumed that the number seven is to be added. The digit key for the number seven in the order to which disk 173 belongs is supposed to have been depressed, the sliders 100 advanced, and the shaft 152 depressed, so that the parts illustrated in Fig. 38ª are in the positions shown, with the gear 151 out of mesh with the carrying rack 181. In the meantime, the cam shaft 179 has been rotated (counterclockwise as seen in Figs. 38ª and 5) by the means hereafter described in Par. XXVIII, so that cam 186, fixed thereon, has been turned to the position shown in dotted lines and is therefore out of engagement with the finger 187 on the lower end of the lever 188. The sliders 100 and racks 104 now move home, and disk 173, Fig. 38ª, is thereby rotated in the direction of the arrow. This carries the tooth 175 past the 13 depending pointed end 189 of the three-armed lever 190 which is fulcrumed at 190a on the appropriate frame 176 (Fig. 35). The rear end 191 of lever 190 is bent to engage a curved slot 192 in the upper arm of a detent 193 which is pivoted by its lower arm to the leg 178 of the frame 176 (Fig. 37) and has a horizontal arm terminating in a laterally bent finger 194 in the plane of a cam 195 fixed on shaft 179 alongside of the adding cam 186; said cam 195 being shown (in Fig. 38a) in broken lines in the position occupied by it when the adding cam 186 is in its dotted line position. As tooth 175 passes the coöperating end 189 of lever 190 the latter is rocked clockwise (as seen in Fig. 38a) thereby depressing the rear end 191 in slot 192 and permitting the detent 193 to be swung by the spring 196 (Fig. 38) connected to the detent and to lever 190, bringing the finger 194 of said detent into the path of cam 195. This movement of the detent brings the flat or horizontal portion 197 of slot 192 over the bent end 191 of lever 190 and so holds the lever with its said end depressed and its other end raised. The lever 190 has fixed to it a pin 198 overhanging a locking pawl 199 pivoted on the frame 184 (Fig. 34) and normally held, by a coil-spring 200 connected to the stud 199a, in the path of the finger 201 on rack member 181, which rack member, it will be remembered, belongs to the higher of the two orders under consideration. The described actuation of lever 190 by the tooth 175 therefore depresses the locking pawl 199 out of the path of finger 201 and leaves the rack member 181 free to advance at the proper time; the finger 202, fixed on shaft 180, having been swung down, out of the path of the tooth 203 on the spring-depressed pawl 204 (pivoted on the rack member 181) by the actuation of shaft 180 as described in Par. XXIX hereafter. Lever 188 is fulcrumed at 205 on the lower arm of lever 190, and by its forked upper end engages a stud 206 on the side of the rack 181. The rocking of lever 190 by the tooth 175 therefore performs still another function, namely, it rocks lever 188 clockwise on stud 206 as a fulcrum (the rack 181 being held against rightward movement by shaft 180) thereby throwing the foot 187 into the path of the cam 186, which, it will be remembered, has previously been turned to the dotted line position. The shaft 152 is now raised (as described in Par. XXII.) bringing gear 151 into mesh with the rack member 181, after which the cam 186 is turned (clockwise) back to the full-line position. During this movement the cam engages the foot 187 and rocks the lever 188. Since fulcrum 205 cannot move, by reason of the lever 190 being held by the slot 192 as previously described, the lever 188 must rock on the fulcrum 205. This throws the forked upper end of lever 188 forward (toward the left, as seen in Fig. 38a) thus advancing the rack 181 one tooth, and rotating the gear 151 a like distance in the adding direction. The "carrying" or "transfer" from the lower to the higher order is then completed. Just after the cam 186, rotating clockwise from the dotted line position, actuates lever 188 to advance the rack member 181 as described, the cam 195 meets and lifts the end 194 of detent 193. In the meantime, the finger 202 has been raised by shaft 180, bringing it behind the tooth 203 on pawl 204 (Fig. 39), with the result that the rack 181 is held positively in its advanced position. Hence raising of detent 193 by cam 195, thereby withdrawing shoulder 197 from the finger 191, permits the spring 196 to swing the lever 190 counterclockwise on its pivot 190a to the normal or initial position shown in Fig. 38a. This return of lever 190 to initial position rocks lever 188 counterclockwise (as seen in Fig. 38a) on stud 206, thereby withdrawing the foot 187 of said lever 188 from contact with the cam 186. At this stage the machine comes to rest, with the rack 181 advanced and still in mesh with the gear 151, and with the stud 207 on the rear end of rack 181 adjacent to the edge 208 of the notch in the finger 202, as in Fig. 39.

XXVI. At the next actuation of the machine, whether adding, totaling or merely idle, the shaft 152 is depressed at the appropriate time thereby disengaging gear 151, Fig. 10, from the rack 181. Then shaft 180 is rocked counterclockwise (as seen in Fig. 38a) by the mechanism described in Par. XXIX. This first swings finger 202 down, from the position shown in Fig. 39, and out of the path of tooth 203 on the dog 204; then brings edge 208, of the notch in said finger against stud 207 on the rack member 181 and retracts the rack member and its finger 201, whereupon the pawl 199 snaps up into locking position as in Fig. 38a. At the same time the retraction of rack member 181 swings lever 188 clockwise (as seen in Fig. 38a) on its fulcrum 205, thereby restoring the foot 187 to initial position but not into contact with the cam 186 since the latter has already been rotated to the dotted-line position. Then if no item had been set up on the keyboard, or if the item set up does not necessitate another "carrying" operation, the cam 186 returns idly to the initial position, shown in full lines in Fig. 38a.

XXVII. It is evident that a transfer or carrying mechanism, for example that described in Par's XXIII–XXIV, must be provided between each notational order and the next higher order, so that in the present machine there are eight such inter-connected computing mechanisms, as indicated in Fig. 12 for example. It is also evident that the several transfer mechanisms cannot be operated simultaneously, but must be operated in succession from the lowest order to the highest. This successive operation of the carrying mechanisms is secured by arranging the operative edges of the adding cams $b^{15}$, $c^{15}$, ... $i^{15}$ on the shaft 179 in the form of a helix, as indicated diagrammatically in Fig. 38$^b$, in which the cams are "developed" in a plane. Inasmuch as there is no transfer or carrying to the lowest order, no adding cam and carrying rack need be provided for such order. A simple disk $a^{15}$ is provided for said order, however, merely as a spacing member on the shaft 179. Since there is no carrying or transfer from the highest order, the lever 190 and disk 173 which would otherwise be provided therefor are omitted.

XXVIII. The cam shaft 179, the purpose and function of which is described in Par's XXIV, XXV, and XXVI, is rotated at the appropriate instants, first in one direction and then in the other, by the following devices: On the right hand end of said shaft 179 and fixed thereto is a pinion 210, Figs. 3, 4, 5, 12, 15, in mesh with a rack 211 which is supported by a swinging frame 212 on said shaft. The rear end of the rack is pivoted to the upper end of an arm 213 fixed to one end of a stud 214 rotatably mounted in the side frame 5 and having fixed to it at its other end an arm 215 arranged at an angle to the first named arm; the two arms thus constituting a bell-crank lever. The arm 215 is pivoted to one end of a cam-link 216, the other end of which is pivoted to an arm 217 pivoted at 218 on the side frame 5. The link 216 is formed with a longitudinal cam slot 219, engaged by a stud 220 on the adjacent side of the gear segment 106, which, as described in Par. XIV, is fixed to and hence rocked by the main shaft 60. When the said gear segment is swung counterclockwise (as seen in Fig. 5) the stud 220 raises the link 216 until the stud escapes into the portion of the cam slot 219 that is concentric with the shaft 60. This lifting movement is quick and short, but owing to the fact that the arm 213 is several times longer than arm 215, the movement of link 216 is sufficient to advance the rack 211 its whole length, thereby rotating the cam shaft 179 counterclockwise. On the return or clockwise movement of the stud 220 it at first moves idly through the concentric portion of the cam slot 219, but toward the end of its movement it enters the eccentric portion and quickly depresses the arm 215. This rocks the long arm 213 counterclockwise and rapidly retracts the rack 211 to initial position, which movement of the rack rotates the pinion 210 and cam shaft 179 clockwise.

The purpose of employing a pivoted rack to actuate the pinion 210 is to permit the vertical movement of the pinion (and the cam shaft 179 which carries the same) in company with the shaft 152 as described in Par. XXI, without causing appreciable rotary movement of the pinion and shaft and without disconnecting the pinion from the rack. When the shaft 152 and frames 176 are depressed or raised the rack 211 simply swings slightly on its pivotal connection with the arm 213.

Figure 10:
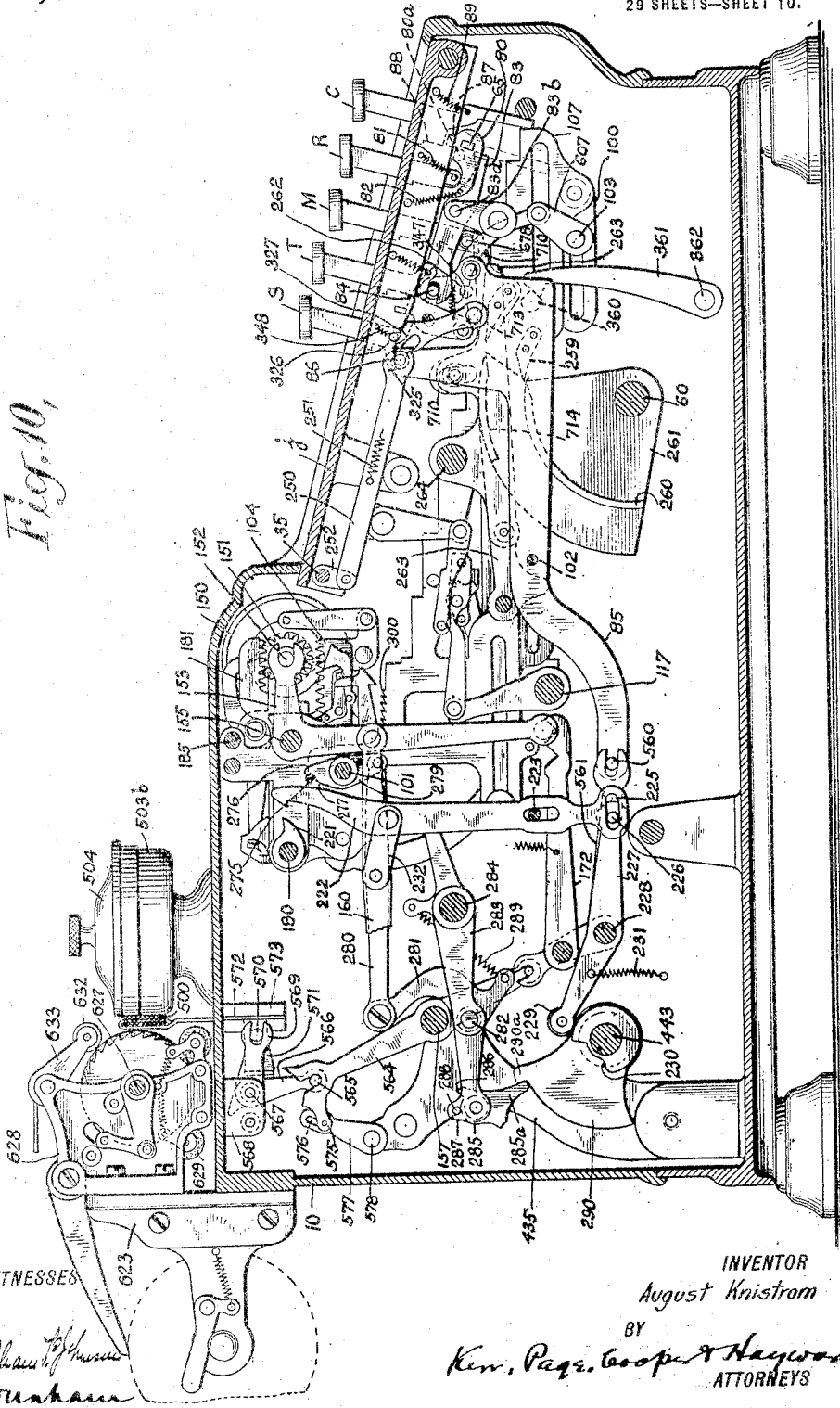

XXIX. The shaft 180, which, as described in Par's XXIV, XXV, and XXVI, is rocked at the proper times in the adding operation, is actuated by the following mechanism: On the left end of the shaft 180, Figs. 9, 10, and 11, is a finger 221 which can be engaged and drawn down by a hooked vertical link 222. The latter is pivotally and slidably mounted at its lower end on a pin 223 fast on the upper end of an arm 224 fixed on the adjacent end of the transverse shaft 403 on which the type sector setting arms $a^7$, $b^7$, ... $i^7$ are loosely mounted as described in Par. XXX. At the bottom of the hooked link 222 is a horizontal slot 225 engaged by a stud 226 on one end of a lever 227 fulcrumed loosely on the end of the short transverse shaft 228 (Fig. 13), mounted in the side frame 4. The other or rear end of the lever 227 carries an anti-friction roller 229 which is caused to bear on a cam 230 by a coil spring 231. The cam 230 is fixed on the transverse shaft 443 which is rocked by the mechanism described in Par. LXXXVI. The first movement of shaft 443 is clockwise as seen in Fig. 10, for example, and early in this movement the drop in cam 230 comes opposite the roller 229, whereupon the spring 231 rocks lever 227 counterclockwise, raising the link 222 so that its hooked upper end is above the plane of the adjacent end of finger 221. The link 222 is also connected by a link 232 to the horizontal link 160, which, as described in Par. XXI, is one of the parts which coöperates to depress the shaft 152 by rocking the bell-crank levers 153, 154. Hence the advance of link 160 to depress the shaft 152 swings the hooked member or link over the end of finger 221. Thereafter, the movement of cam 230 is reversed, bringing its rise again under the roller 229. This rocks the lever 227 clockwise as seen in Fig. 10, drawing down the link 222 and hence rocking the finger 221 and the shaft 180 on which the same is fixed. When the link 160 is retracted to reverse the movement of the bell-cranks 153, 154, for the purpose of raising the shaft 152 as described in Par. XXII, the link 222 is swung clockwise (as seen in Fig. 10) thereby withdrawing its hooked upper end from engagement with finger 221. Whereupon the shaft 180 is instantly rocked back (counterclockwise as seen in Fig. 10) to initial position by a short depending arm 233, Fig. 4, fixed on the right hand end of said shaft and connected to a pair of alined but opposed springs 234, 235, which at their extremities are connected to a horizontal reciprocatory member 236. One end of the latter is slotted to receive a supporting pin 237 fixed in the side frame 5 and the other end has a depending arm 238 pivoted to the upper end of a vertical arm 239 which is itself pivoted at its lower end on the frame 5 and has a longitudinal slot 240 engaged by a pin 241 on a long horizontal member 242. As seen in Fig. 4, the member 242 at its right hand end is slidably mounted on the shaft 157 (described in Par's XXI and XXII) and at its other end is pivoted to a stud 243 on the depending arm of a bell-crank lever 244 fulcrumed at 245 on the keyboard section $l$. When the parts are in the position shown in Fig. 4 (the machine being then used for adding) the member 242, arm 239 and arm 238 are in their advanced positions and the spring 234 is tensioned, thereby impelling arm 233 and shaft 180 clockwise as seen in Fig. 4 and counterclockwise as seen in Fig. 10. The end of member 242 which engages stud 243 on lever 244 is simply slipped over the stud, and is held in place by a spring clip 246 the tip of which enters a groove (not shown) in the stud. The parts named are therefore readily disconnected when it is desired to remove the keyboard from the machine as described in Par. IV. To provide stops to limit the movement of the shaft 180 in both directions the member 236 is formed with a central vertical neck $236^a$ at the top of which is a horizontal bar $236^b$, and the arm 233 is provided with oppositely extending fingers, $233^a$, $233^b$ having studs $233^c$, $233^d$, to coöperate with the extremities of the bar $236^b$. When the member 236 is in the position shown, and hence with the spring 234 tensioned, the stud $233^c$ bears against the left end (as seen in Fig. 4) of the bar $236^b$. When the link 242 is shifted to the right (by the means described in Par. LIX) to tension the spring 235, the bar $236^b$ is moved off of stud $233^c$ and over stud $233^d$.

XXX. *Printing mechanism.*—The printing is effected by type carried on nine sector-shaped pieces, one for each notational order and designated $a^3$, $b^3$, ... $i^3$, Figs. 16 and 52. The sectors are mounted on the ends of a series of levers 400, Figs. 6, 7, 12, pivoted at their ends to the upwardly extending arms of the bell-crank levers $a^4$, $b^4$, ... $i^4$, Fig. 14, fulcrumed on a short transverse shaft 401, Figs. 31 and 52, journaled in standards 401 rising from the base of the machine. The type sectors are raised and lowered on their pivotal connection with the bell-cranks or printing levers $a^4$, $b^4$, ... $i^4$, by means of links $a^5$, $b^5$, ... $i^5$, pivoted at their upper ends to the levers 400 and at their lower ends to the levers $a^6$, $b^6$, ... $i^6$, (Figs. 13, 25, 26, 31), fulcrumed loosely on a transverse shaft 403 which is itself loosely mounted on standards 404 rising from the base of the machine. The last named levers are rigidly connected (as described in the next paragraph) to upwardly extending arms $a^7$, $b^7$, ... $i^7$, respectively (see Fig. 25) which at their upper ends are pivoted to the horizontal links $a^8$, $b^8$, ... $i^8$.

The latter are at their rear ends pivoted to the sliders 100, as indicated in Figs. 6 and 31. Since, as explained in Par's XIV, XV and XVI, each slider 100 moves forward to an extent determined by the particular digit key which is depressed in the keyboard section with which the given slider is associated, it will now be seen that the differential movements of the sliders are communicated to the type sectors through the medium of the parts described in the present paragraph. In this manner the type corresponding to the depressed digit key is brought to printing position.

XXXI. The levers $a^6$, $b^6$, ... $i^6$, described in the preceding paragraph, are connected to the arms $a^7$, $b^7$, ... $i^7$, in the following manner: The arm $a^7$ (Fig. 25) is fixed to a sleeve $a^9$ rotatably mounted on the shaft 403 and connected by a disk $a^{10}$ to one end of a cylinder $a^{11}$. At the other end this cylinder is encircled by, and pinned to, the annular central portion of the lever $a^6$. (See also Fig. 53.) Hence the lever $a^6$ and arm $a^8$ are rigidly connected together, though they are spaced apart laterally a considerable distance. The arm $b^7$ is fixed to a sleeve $b^9$ inside of the cylinder $a^{11}$ and extends upwardly through a longitudinal slot $a^{12}$ in said cylinder. The sleeve $b^9$ is connected by a disk $b^{10}$ to a slotted cylinder $b^{11}$ inside of and coaxial with the cylinder $a^{11}$ and shaft 403. At its inner end the cylinder $b^{11}$ is connected to the annular central portion of the lever $b^6$. The arm $c^7$ is connected by sleeve $c^9$ and short slotted cylinder $c^{11}$, to the annular central portion of lever $c^6$, and the arm $d^7$ is connected by sleeve $d^9$ and disk $d^{11}$ to the central annular portion of lever $d^6$, while arm $e^7$ is connected directly to the disk $e^{11}$, to which the annular portion of lever $e^6$ is fixed. The arms $f^7$, $g^7$, $h^7$, and $i^7$, on the other side of the "printing field" are similarly connected to the levers $f^6$, $g^6$, $h^6$ and $i^6$, respectively. It will therefore be evident that each type-setting arm can be actuated independently of the others, the slots in the connecting cylinders permitting adequate swinging movement of each of the setting arms $b^7$, $c^7$, $d^7$, $f^7$, $g^7$, $h^7$, without interfering with the others, adjacent or remote. The construction described is highly advantageous, since it enables the spacing of the type-setting arms to be the same as that of the sliders and hence permits straight-line connections with the sliders, as by the links $a^8, b^8, \ldots i^8$, while the printing levers $a^4, b^4, \ldots i^4$, are compactly arranged as is desirable for the printing of the various items. The links $a^8, b^8$, etc., are held in pivotal connection with the setting arms $a^7, b^7, \ldots i^7$, by spring-clips 405.

XXXII. Since the type-sectors $a^3, b^3, \ldots i^3$, are connected to the sliders, as described in Par. XXXI, it is evident that the sectors cannot be moved (up or down) unless the sliders 100 move also; and since, as explained in Par. XVIII, the sliders cannot move from their initial or home positions unless the locking plates or stops 30 (Figs. 19 and 6) are depressed out of the paths of the racks 104 (usually by depression of digit keys) it will be seen that in printing an item (or a total) the type sector for any given notational order will remain at its lowermost position, with "0" at the printing line, unless the associated rack 104 is unlocked by depression of its coöperating lock or stop-plate 30. It will also be seen that when the machine is idle the type sectors are locked in lowermost position by the plates or stops 30 remaining in the paths of the racks 104.

XXXIII. The printing bell-cranks or hammers $a^4, b^4, \ldots i^4$, are also normally locked, the mechanism therefor being as follows: Parallel with the series of setting levers $a^6, b^6, \ldots i^6$, which, as described in Par. XXX, are actuated to adjust the type sectors for printing, is a transverse shaft 406 (Figs. 6, 7, 13 and 31) mounted in the standards 407, and fulcrumed on this shaft is a series of dogs 408 having hooked upper arms to engage studs 409 on the horizontal arms of the bell-crank printing levers. Manifestly, when the dogs are in the position indicated in Fig. 6 they positively hold the bell-cranks against forward movement. The leg of each dog, however, coöperates with the rear portion of the corresponding sector-setting lever $a^6, b^6, \ldots i^6$, with the result that when one of said levers is actuated to adjust its type sector, as described in Par. XXX, the lever by its engagement with the leg of the dog rocks the dog clockwise (as seen in Fig. 6 for example), thereby swinging the hooked arm of the dog away from the stud 409, and hence releasing the printing lever that carries said stud. In printing an item or total in which a significant zero or cipher appears, the sector-setting lever for the sector which should print "0" is not actuated (as explained in Par. XXXII), and hence does not unlock the printing bell-crank. Nevertheless the bell-crank must be unlocked; and in the case referred to the unlocking is effected as follows: Each tail 410 (Fig. 6$^a$) of the dogs 408 is offset laterally to overlap the tail of the dog belonging to the next lower order. Hence when any dog is actuated to release its associated printing lever, the next lower dog will also be actuated (and so on down the line) even though the associated sector-setting lever is not actuated. Inasmuch as in the present machine the two lowest orders are decimal fractions (indicating cents) and the tenths or second sector from the right must therefore always print "0" when no digit key, in its order or in any of the higher or "dollar" columns, is depressed, the dogs 408 associated with the setting levers $a^6$ and $b^6$, which set the decimal-fraction-printing sectors, are rigidly connected by a pin 412 (Fig. 6) which also serves as the point of attachment of the spring 413 by which the dogs are restored to initial position, the other end of the spring being suitably attached to one of the standards 404. It is therefore evident that both the printing levers $a^4, b^4$, will always be unlocked if any digit key on the entire keyboard is depressed.

XXXIV. The horizontal arms of the printing bell-cranks $a^4, b^4, \ldots i^4$, are not only locked by the dogs 408, as explained in Par. XXXIII, but also by the following mechanism: Parallel with the shafts 403 and 406 is a third transverse shaft 414, Figs. 6, 7, 31, to which is fixed a series of pawls 415, all rigidly connected together by a rod 416. Normally the pawls named are in the position shown in Fig. 6, with their hooked upper ends out of engagement with the studs 417 on the ends of the horizontal arms of the printing bell-cranks, being held in such position by the spring 418, Figs. 6 and 8, connected to the depending arm of the bell-crank 419 fixed to one end of shaft 414. On the end of the horizontal arm of said bell-crank is a stud 420, underlying the horizontal arm of a bent lever 421 fulcrumed at 422 on the side frame 4. The upper arm of this bent lever carries a pivoted dog 423, Fig. 9, bearing on a cam 424 fixed on the main shaft 60. This cam has a shoulder 425, followed by a short dwell 426 and a sharp drop 427. Hence when the main shaft 60 is rocked counterclockwise (as seen in Fig. 9) by the initial movement of the operating handle, the dog 423, engaging the shoulder 425, is rocked clockwise, thereby swinging the bent lever 421 in the same direction. This rocks the bell-crank 419 and shaft 414, thereby throwing the pawls 415 (Fig. 6) into engagement with the studs 417 and hence locking all the printing bell-cranks $a^4, b^4, \ldots i^4$. Just after this locking is effected, the dogs 408, actuated by the sector-setting levers $a^6, b^6, \ldots i^6$, unlock the particular printing bell-cranks which are to be actuated for making the imprint, as explained in Par. XXXIII. As the operating handle reaches the end of its forward stroke the drop 427 on the cam 424 comes under the toe of dog 423, allowing spring 418 (Fig. 6) to return the pawls 415 and bent lever 421 to initial position, as shown in Fig. 31. The printing bell-cranks are thus unlocked again, save those which are not to take part in the printing, these latter never having been unlocked by the associated dogs 408. When the operating handle and the cam 424 move back to initial position the dog 423 reverses its swing, riding idly over the dwell 426 and dropping behind the shoulder 428 to the original position shown in Fig. 9. The use of the dog 423 in conjunction with a suitable cam, as 424, affords a very quick rise (without undue friction) during a minimum angular motion of the cam, thus enabling the locking operation of lever 421 to be performed almost instantly after the operator begins to pull the handle forward. Also, the dog gives the effect of a long dwell after complete locking operation of lever 421, followed by a very quick release after the proper printing sectors have been set for printing and only an instant before the actual printing is effected. It will therefore be seen, from the present paragraph and the one preceding, that when the machine is idle the printing levers $a^4, b^4, \ldots i^4$ are locked by the dogs 408; that immediately before the type sectors are set for printing and therefore are also unlocked by the dogs 408, the said printing levers are all locked by the pawls 415; and that just before the actual printing takes place the printing levers are unlocked by the pawls 415, leaving locked (by dogs 408) only those printing levers that are not to take part in the printing operation.

XXXV. The type sectors having been "set" as described in Par's XXX, XXXI and XXXII, the printing levers or hammers $a^4, b^4, \ldots i^4$, are actuated to make the imprint by the following mechanism. The said printing levers are engaged by links 430 which are bent in a horizontal plane to embrace loosely the sector-setting links $a^5, b^5, \ldots i^5$, and have their rear ends slotted to receive the studs 431 on the printing levers; see Fig. 7, which shows the link associated with printing lever $d^4$. At their forward ends these links are connected by coil springs 432 to a transverse plate 433 carried by the upper end of a lever 434 fulcrumed on a tall standard 435 rising from the base of the machine. In a suitable horizontal plane just below the top of the casing 10 the printing bell-crank levers $a^4, b^4, \ldots i^4$, are connected by coil springs 436 (see the enlarged detail views Figs. 7ª and 7ᵇ) to a series of slotted links 437 lying between the rearwardly extending teeth of a fixed comb 438 and embracing the body of the comb as shown in Fig. 7ª. The lever 434 is rocked clockwise as seen in Fig. 6, (by means described in the next paragraph) when the operating handle is first pulled toward the operator and while all the printing levers $a^4, b^4, \ldots i^4$ are locked by the pawls 415 as explained in Par. XXXIV. This extends all the springs 432; then when the pawls 415 (Fig. 7) are actuated as described in Par. XXXIV to unlock the printing levers, the printing levers that have previously been also unlocked by dogs 408 are snapped forward by the printing springs 432 associated therewith. The links 437 (Figs. 7ª, 7ᵇ) also fly forward until arrested by the comb 438. Thereafter the momentum of the printing levers carries them on and causes them to strike a smart blow, at the same time extending the retracting springs 436. The striking of the blow destroys the momentum of the parts, whereupon the retracting springs 436 instantly draw the printing levers back slightly, thus giving the blow a staccato character which produces a clean sharp imprint free from any smearing.

XXXVI. The lever 434 is swung clockwise, as seen in Fig. 7, for the purpose described in the preceding paragraph, by the bent lever 439 (Fig. 7) whose upper arm engages the depending arm of the lever 434. The lever 439 is fulcrumed on the standard 435 and at the end of its depending arm carries a pivoted dog 440, which, by the action of spring 441 tending to rock the lever clockwise, is held against a cam 442 fixed on a transverse shaft 443 journaled in the side frames 4, 5. When the operating handle is pulled toward the operator the shaft 443 is rocked counterclockwise (by means described in Par. LXXXII), bringing the notch 444 into engagement with the toe of the dog 440, and quickly swinging the dog on its pivot. This gives the bent lever 439 a quick actuation, which rocks the lever 434 with corresponding speed and advances the printing-spring plate 433. Then when the bent lever 421 releases pawls 415, allowing the springs 418 to swing the pawls 415 out of engagement with the studs 417, such of the printing bell-cranks $a^4, b^4, \ldots i^4$, as are also unlocked by the dogs 408 fly forward as described in the preceding paragraph and make the impression. As the cam 442, Fig. 7, continues its counterclockwise movement the reversing notch 445 reaches the toe of dog 440, with the result that when the movement of the cam is reversed (by the backward or homeward movement of the operating handle) the dog is reversed also and hence comes to rest in the initial position shown in Fig. 7, with the printing springs 432 relaxed.

XXXVII. After the printing is effected, as explained in the preceding paragraph, the printing hammers or bell-cranks $a^4, b^4, \ldots i^4$, are returned to initial position by the following mechanism: On a transverse rock shaft 450, Fig. 7, arranged above the rear ends of the said bell-cranks and journaled in standards 451 is a comb 452, Figs. 7 and 15, having its teeth arranged to bear on the bell-cranks, as shown. The left end of the shaft is provided with an arm 453 connected by a link 454 to the upper end of an arm 455 pivoted by its lower end to the side frame 4 and having a stud 456 extending laterally into a cam slot 457 in a cam 458 fixed on the main shaft 60. During the first part of the forward movement of the shaft 60, produced by pulling the operating handle toward the operator, and while the type sectors $a^3$, $b^3$, ... $i^3$, are being "set" for printing, the concentric portion or dwell in the cam slot 457 passes the stud 456. Before the setting of the sectors is completed or at any other appropriate time before the pawls 415 are disengaged from the studs 417, as described in Par. XXXIV, the rise in the said cam slot reaches the stud 456 and swings the arm clockwise, as seen in Fig. 7. This rocks the shaft 450 counterclockwise and swings the comb 452 upwardly and away from the tails of the bell-cranks or printing levers $a^4$, $b^4$, ... $i^4$, and while the short dwell following the rise in the cam slot is passing the stud 456 the printing is effected as described in Par. XXXV. The movement of the cam 458 is then reversed by the homeward movement of the operating handle, and the stud 456, passing backwardly off the rise in the cam slot, swings the arm 455 counterclockwise. This brings the teeth of comb 452 down upon the elevated ends of the printing levers $a^4$, $b^4$, ... $i^4$ and restores the said levers to their initial positions, shown in Fig. 7.

XXXVIII. After they are set for printing, the type-sectors $a^3$, $b^3$, ... $i^3$, are held by their connection with the sliders 100, as explained in Par. XXX, but are additionally locked against downward movement by the devices now to be described. The sector-setting levers $a^6$, $b^6$, ... $i^6$, at their forward ends, are equipped with arc-shaped ratchets 460 (Figs. 6, 7, 16, 26, 52, 53) coöperating with a series of pawls 461 (see also Fig. 17) loosely mounted on a transverse shaft 462 mounted in two standards 463, the pawls being urged counterclockwise (as viewed in Fig. 7) by coil springs 464. Running across the pawls between the same and the racks 460 is a universal bar 465 fixed at its ends to a pair of arms 466, 467, (Figs. 6 and 7) rigidly mounted on the shaft 462 and also connected by a distance piece or spacing bar 468. The arm 466 has an upwardly extending finger carrying at its end a pivoted dog 469 held in contact with a cam 470 by a coil spring 471 which coöperates with the finger of arm 466. The cam 470 is fixed on the transverse shaft 443. When the latter shaft is rocked counterclockwise (as seen in Fig. 6) the first notch in the cam engages the heel of the dog and, rocking the dog, swings the arm 466 counterclockwise, and thereby carries the detent bar 465 away from the pawls 461. The latter are thus permitted to swing into engagement with their respective ratchets 460. Hence no downward movement of any ratchet, and of the sector-setting lever that carries it, can occur, though the direction of the ratchet teeth permits upward movement of the ratchets and the levers $a^6$, $b^6$, ... $i^6$, for the purpose of setting the type-sectors $a^3$, $b^3$, ... $i^3$, as explained in Par's XXX and XXXI. When the heel of the dog 469 is engaged by the second notch in the cam 470, (after the printing has been performed as explained in Par. XXXV), the arm 466 is permitted to swing back under the influence of spring 471, thus swinging the detent bar 465 backward and carrying the pawls 461 out of engagement with the ratchets 460 and restoring said pawls to initial position. When the cam 470 reverses its movement (that is, moves back to initial position) the notch at that instant engaging the heel of the dog reverses the latter, swinging the same to the initial position with respect to the arm 466, so that the first notch of the cam will pass idly under said heel.

XXXVIII$^a$. As the printing hammers $a^4$, $b^4$, ... $i^4$ fly forward to make the imprint, the type sectors are alined by the following mechanism. At the top of the standard 435, Figs. 7, 52$^a$ and 53, is a short transverse bar 400$^a$, extending across the printing field and carrying at its ends two rigid brackets 400$^b$. These brackets extend toward the sector-setting links $a^5$, $b^5$, ... $i^5$, and on upper and lower rods 400$^c$, 400$^d$, rigidly fixed in the brackets, is a series of alining racks 400$^e$, having arc-shaped toothed edges facing the said sector-setting links. The racks are spaced apart the same distance as the sector-setting links, and each is directly in front of a pawl 400$^f$ on the respective link. The pawls 400$^f$ are pivoted at their lower ends to the links and are held yieldingly in the positions shown by light coil springs 400$^g$, which normally hold the tails of the pawls against the studs 400$^h$. When the printing hammers and sector-setting links swing forward the alining pawls 400$^f$ enter the appropriate teeth on the respective alining racks, the pawls yielding as the sectors reach the ink ribbon. The link $a^5$, $b^5$ ...$i^5$, and hence the type sectors $a^3$, $b^3$, ... $i^3$, are thus held firmly against upward movement at the time the printing blow is struck, just as they are held against downward movement by the racks or ratchets 460 and pawls 461 described in Par. XXXVIII. To insure the racks 400$^e$ being absolutely immovable, the entire series is braced by a strut 400$^i$ extending from one of the brackets 400^b down to the adjacent shaft 157.

XXXIX. *Clearing mechanism.*—Since the accumulating or computing gears 151 are rotated counterclockwise (as seen in Figs. 6 and 31, for example) in the adding operation of the machine (see paragraph XX), it is evident that if the said gears are rotated in the opposite direction and are arrested when they and the associated disks 173 reach the zero position the machine will be "cleared". Since the gears 151 and the associated disks 173 are rotated in the adding direction by the homeward or retracting movement of the sliding racks 104 (see Par. XX), after the said gears have been brought into mesh with the racks 104 by proper actuation of the bell crank supports 154, 153 as explained in Par's XXI and XXII, it will be seen that by depressing the gears into mesh with the racks 104 before the advancing movement of the latter the gears will be given the clockwise rotation (as seen in Fig. 6, for example) required for the clearing operation. As explained in Par. XVIII, the racks 104 are normally held against the above described advancing movement by the plates 30, but when any digit key is depressed. the associated plate 30 is swung down out of the path of the corresponding rack 104. Inasmuch as, obviously, no digit key should be depressed when the machine is to be cleared, it is plain that the plates 30 must be depressed by other agencies. It will now be seen that to clear the machine four operations must be performed: (1) The plates 30 must be depressed to unlock the racks 104; (2) the gears 151 must be depressed before the racks 104 are advanced by the sliders 100; (3) the sliders 100 must be advanced, thereby rotating the gears 151 in the clearing direction; and (4) the gears 151 must be arrested when they reach the zero position.

XL. Operation (1), described in the preceding paragraph, is performed by the following devices: The total key T, Figs. 9, 10, 11, 40, 41, is first depressed. Since the foot of the total key bears on the stud 84 fixed to the swinging frame or lever 85 (see Par. X) fulcrumed on the shaft or rod 102, depression of said key swings the frame 85 clockwise as seen in Fig. 10. This shifts the stud 86 to the right with respect to the engaging forked end of the link 250, Fig. 10, which link is normally locked or held in the position shown by the said stud 86. When the stud is shifted as described, the spring 251 is permitted to retract the link 250, thereby swinging in the counterclockwise direction the arm 252 fixed to and depending from the left end of shaft 35. This shaft has fixed to it a series of fingers 34 (see Figs. 19 and 6, for example, and Par. VI) so that when the shaft is rocked by the described actuation of the arm 252 the fingers 34 are swung forward, thereby throwing forward the arms 31, which, as explained in Par. VI, are engaged by pins 33 extending laterally from the fingers 34. This advance of the arms 31 brings their upwardly open notches 253 (Fig. 6) into the paths of the studs or pins 254, Fig. 31, extending laterally from the upwardly extending arms 255. These arms 255 are pivoted on the frames 176 of the transfer mechanism, which frames partake of the up and down movements of the gears 151, as explained in Par. XXIV. The arms 255 are drawn toward the shaft 152 (see Figs. 34, 35) by light coil springs 256, causing the studs 254 to bear on the disks 257 which, as shown in Fig. 45, are mounted loosely on the shaft 152 and connected rigidly to the adjacent gears 151 and numeral wheels 150. The disks 257 have in their peripheries two diametrically opposite notches 258, so arranged that when any gear 151 and its associated disk 173 and wheel 150 are at "zero position" one or another of said notches will be in front of the stud 254 on the coöperating arm 255. When any disk 257 is not in the position just mentioned, the associated stud 254 bears on the edge of the disk and is therefore held out immediately above the notch 253 on the arm 31 when the latter is swung forward as described. Now when the frames 176 are depressed, by the bell crank levers 153, 154, through the medium of the the stud 254 also moves down and, engaging the notch 253, depresses the arm 27 on shaft 152, as described in Par's XIX, XXII, which, as explained in Par. VI, the arm 31 is pivoted. This swings the plate 30 down out of the path of the rack 104, leaving the latter (and, of course, the slider 100, which carries the rack) free to move forward. When, however, any gear 151 and the associated disk 173 and numeral wheel 150 are already at zero position (and, therefore, need not be rotated in the clearing operation) one of the notches 258 in the associated disk 257 is opposite the stud 254 on the coöperating arm 255. This permits the spring 256 to advance the arm 255, throwing the stud 254 into the notch 258, thereby carrying the said stud away from above the notch 253 in the advanced arm 31. Then when the arm 255 is depressed, as described above, the stud thereon passes idly by the notch 253, leaving the arm 31, and hence the plate 30 also, in the upper or locking position, so that the associated rack 104 and slider 100 cannot advance.

XLI. Operation (2) of Par. XXXIX, to wit, the downward movement of the computing gears 151 to bring them into mesh with the racks 104 before the latter are advanced in the clearing operation of the machine, is effected as follows: When depression of the total key T (Fig. 9) depresses the swinging frame 85 the pointed finger 259 fixed on the right hand side of the frame is carried below the pointed end of an arc-shaped rib 260, Fig. 10, on the left hand side of a sector 261 fixed on the main shaft 60. Then when the shaft 60 is rocked by pulling the handle 850 toward the operator the rib 260 is swung into engagement with the finger 259 and cams the same down, thereby depressing the frame 85 still farther than it was depressed by the total key T. The movement of the said frame by the total key brings a stud 262 (Fig. 9) down upon the rear end of a lever 263 (Figs. 10 and 42) which is fulcrumed at 264. Hence when the frame 85 is further depressed by the action of the cam-rib 260, the stud 262 rocks lever 263 clockwise (as seen in Fig. 10) on its pivot 264. This raises the forward end of the lever, which end, as shown in Fig. 11, is pivoted to a lug 265, Fig. 11, depending from a long horizontal lever 266 fulcrumed at 264, (on a stud in the side frame 4), and having its forward end connected by a short link 268 to the long link 162. The lug 265 being quite near the fulcrum 267 the slight upward movement of said lug by the described actuation of lever 263 gives a relatively long upward swing to the forward end of lever 266; and since this end is connected (by link 268) to about the middle of link 162, the lift of the latter by lever 266 raises stud 163 (on the end of link 162) very quickly. The slot in member 164 which is engaged by the stud 163 is inclined upwardly toward the operator; and since the member 164 is positively held against rocking movement by the arc-shaped locking piece 170 (see Par. XXII) it is clear that the quick upward movement of stud 163 must cause the link 162 to advance,—that is, move toward the operator. This rocks the shaft 157 and causes the shaft 152 to be depressed as explained in Par. XXI, thereby bringing the gears 151 into mesh with the racks 104. The downward movement of shaft 152 also swings the transfer-mechanism frames 176 down, with the results described in Par. XL.

XLII. It is explained in Par. XV that the sliders 100 and rack 104 are advanced by the gear segments 106 and rack members 105 after the sliders have been picked up by the fingers 114 on the levers 112 carried by the sliders, and that the said levers 112 are actuated to effect this result by the actuation of the arms 37. Inasmuch as these arms are connected with the arms 31 (as shown in Fig. 19, for example, and described in Par. VI) it is evident that when the arms 31 are depressed, as described in Par. XL, the associated arms 37 are actuated, thereby swinging the fingers 114 into the paths of the shoulders 115 on the rack members 105. Hence when the operating handle 850 is pulled toward the operator the sliders 100 and racks 104 that have been unlocked by depression of arms 255 and 31 are advanced after the gears 151 have been lowered into mesh with the racks. In this manner operation (3) of Par. XXXIX is performed.

XLIII. Operation (4) of Par. XXXIX is performed as follows: Alongside of the disks 257 (Fig. 45 and Par. XL) on the shaft 152 and fixed to the respective disks 257 is a series of disks 270 (Figs. 46 and 45), each having two diametrically opposite teeth 271 suitably located with respect to the teeth 174, 175, on disks 173 and to the zeros on the numeral wheels 150. The dogs 272, (Fig. 35), pivotally and slidably mounted on the studs 273 fixed to the transfer-mechanism frames 184, have, at their rear ends, lateral pins 275 resting against the tips of the fingers 276 having curved cam edges 277. These fingers are rigidly mounted on the transverse shaft 101 (see Par. XIV). Normally the fingers 276 stand in the position shown in Fig. 35, with the notches at their tops engaging the pins 275 on dogs 272. The latter are therefore normally locked against rearward movement (toward the operator) because held by the fingers 276, and against forward movement because held by the pivots 273, as shown, and are also held with their heads 274 out of the paths of the teeth 271. However, just after the operator begins to pull the handle 850 toward him the fingers 276 are rocked counterclockwise (as seen in Fig. 35) by the following mechanism: The finger 276 at the left hand side of the machine, Figs. 9 and 10, has a depending tail 279 connected by a link 280 to the upper arm of a three-armed lever 281 fulcrumed at 282 on an arm 283 fixed to the side frame 4 at 284. The horizontal arm of this lever carries a pivoted dog 285, the pivotal movement of which is limited by the ears 286, 287, Fig. 10, coöperating with a lateral pin 288 on the lever. A spring 289 (Figs. 9 and 10) connected to the depending arm of the lever 281 urges the latter counterclockwise (as seen in Fig. 10), thereby holding the dog 285 in contact with the edge of a cam 290, fixed on the transverse shaft 443 which, as described in Par. LXXXII, is rocked clockwise (as seen in Fig. 10) as the operating handle 850 is drawn toward the operator and counterclockwise as the handle returns to its home position. Normally, the dog 285 stands up on its long leg 285ª against which the lug 290ª of the cam bears. As the cam rocks counterclockwise (Fig. 9) the spring 289 rocks lever 281 clockwise, which advances the link 280 and rocks shaft 101, thereby swinging all the fingers 276 away from the pins 275 on the dogs 272 almost instantly after the operator starts to draw the actuating handle toward him. The dogs 272 are then free to advance.

When the cam swings back to home position the lug 290ª causes the dog to swing counterclockwise (as seen in Fig. 9) bringing the ear 287 against the pin 288. The dogs 272 (Fig. 35) being unlocked as above described, some or all the racks 104 are advanced (as explained in Par. XV) with the gears 151 in mesh therewith. This rotates the associated disks 270 clockwise (as seen in Fig. 35, for example) and brings one of the teeth 271 against the rear of the head 274 on dog 272. The disks continuing their rotation, the engaging teeth 271 draw the dogs 272 forward. On each dog is a pivoted pawl 292 (Fig. 35) engaging the ear 293 of a second dog 294 fulcrumed at 295 on a depending arm 296 of the adjacent frame 184 (Fig. 34). The upturned tail 297 of dog 294 engages a shoulder 298 on dog 272. When the dog 272 is advanced by a tooth on disk 270, as described, the pawl 292 advances also and hence swings dog 294 down, bringing its tooth 299 into engagement with the appropriate tooth on a ratchet 300 (Figs. 31, 6, 7, 8) at the top of the associated stepped controlling member 107 and arrests the latter. As explained in Par. XVI, arrest of a stepped controlling member stops the associated slider 100 and rack 104. Hence, when a stepped member 107 is arrested by the dog 294 being brought into play by a tooth on the associated disk 270 engaging the head of the dog 272, the slider 100 and rack 104, and the gear wheel 151 which is in mesh with the latter, are also arrested. The coöperating parts are so proportioned that the gears 151 are arrested at the zero position, with zeros on the numeral wheels 150 appearing at the window 11. Just before the operating handle 850 reaches the end of its forward movement (toward the operator) the stud 171 (Fig. 11) on the clockwise moving sector 169 engages the tail of lever 167 and rocks the same counterclockwise. At this time the stud 163 is at the top of the slot in lever 164. Hence actuation of the last named lever by lever 167 (as described in Par. XXII) does not shift the link 162 toward the operator but shifts it in the opposite direction, thereby rocking the bell-cranks 153, 154, counterclockwise (as seen in Fig. 11) and therefore raising the gears 151 out of mesh with the racks 104. The sliders 100 and racks 104, with the associated parts, are then returned home as described in Par. XVI, the ratchets 300 on the stepped members 107 passing idly under the teeth of the dogs 294. About the time the sliders 100 reach the home position the shaft 101 is rocked clockwise (as seen in Fig. 35, for example), thereby rocking the fingers 276 in the same direction. The curved cam edges 277 of these fingers being in engagement with the studs 275 on the dogs 272, the latter are drawn back and their heads depressed, causing their shoulders 298 to swing the dogs 294 up to initial position. The arm 283 (Fig. 9) is not connected at its left end to the vertical member or link 222 as would seem from the figure mentioned, but merely bears against the link to steady the same in its various movements.

XLIV. In the adding operation of the machine the gears 151, and hence the disks 270 also, are rotated counterclockwise, as seen in Fig. 35, for example, and as described in Par. XX. In this operation the teeth 271 on said disks pass idly over the heads 274 of dogs 272, thereby depressing the same. This downward movement does not depress the dogs 294, for the reason that the down-swinging dogs 272 cause the pawls 292 to rock on the ears 293 as fulcrums, extending the coil springs 301 (which serve to hold the pawls in proper position with their toes in engagement with said ears), while the shoulders 298 coöperating with the tails 297 prevent the dogs 294 from swinging down.

XLV. *Printing grand total.*—From Par's XXXIX–XLIV it is seen that when the total key T is depressed and the machine then operated the sliders 100 are advanced, each moving a distance proportional to the value of the digit (which was at the window 11) on its associated numeral wheel 150; and from Par. XXX it is seen that when the sliders 100 are advanced the type sectors $a^3$, $b^3$, ... $i^3$ are raised, the types which are thereby brought to the printing position being determined by the extent of the forward movements of the associated sliders. It will therefore be evident that operation of the machine after depression of the total key T not only "clears" the machine but also sets the type sectors to print the accumlation or grand total of the items previously added or accumulated in the machine; and since the setting of any type sector $a^3$, $b^3$, ... $i^3$ is always followed by the printing operation of the type sectors, as explained in Par. XXXV, it will also be evident that when the said sectors are set after depression of the total key T the amount (grand total) thus set up is printed. Hence to print the total and clear the machine at the same time it is only necessary to depress the grand total key T and then actuate the handle 850 in the usual manner. It is further evident that it is not necessary to give the handle an idle stroke after printing the item last set up on the keyboard and before the total key T is depressed, as is necessary in certain other adding machines; but that the total key may be depressed and the total printed immediately after the printing and adding-in of the previous item.

XLVI. During the clearing and total-printing operation all the digit keys on the machine are locked by the bars 39, as described in Par's VII and VIII. Obviously it is not necessary to lock the error keys, C, 22, (or repeat key R as explained in Par. X), during the clearing and total-printing operation.

XLVII. *Printing subtotal.*—When the subtotal key S is depressed the sum or accumulation already "in the machine" is printed, but the machine is not cleared. Hence when another item is set upon the keyboard it will be added to the original accumulation without, however, including the printed subtotal as a new item. This printing of the accumulation without clearing the machine is effected as follows: When the subtotal key S (Figs. 9, 10, 11) is depressed, its inclined toe 325 depresses the stud 86 on the swinging frame 85, thereby rocking the latter and causing the said stud to move rearwardly. The pin 326, Fig. 10, on the subtotal key swings the forked arm 327 forward to meet the stud 86, so that the latter enters or is engaged by the fork of the arm 327. Then when the frame 85 is given its complete movement by the coöperation of the cam rib 260 and finger 259 as explained in Par. XLI, the arm 327 is also given additional rearward movement. The arm 327 is pivoted at its lower end to a link 328 (Fig. 40) which is itself pivoted at one end to a swinging frame 329 and at the other end to the joint 330 of a toggle 331, 332. Rearward movement of the link, caused by the described rearward movement of the forked arm 327 therefore buckles the toggle, as shown in Fig. 40. The upper end of the toggle is pivoted at 333, Fig. 11, to a fixed supporting member 334, and its lower link is pivoted at 335 to the yoke 336 on which lever 167 is fulcrumed as stated in Par. XXII. Hence when the toggle is buckled as described, against the tension of the spring 337 which tends to keep the toggle straight, the yoke 336, pivoted at 338 on the support 334, is swung up. This raises the lever 167, carrying its tail out of engagement with the locking rib 170 and out of the path of the lug 171 and raising the upper end of the lever against a stop-finger 338ª (Fig. 11ª) fixed on the adjacent end of the shaft or rod 13. The operation will now be readily understood. When the sub-total key is depressed with preliminary movement of the forked arm 327, the first result of pulling the handle 850 toward the operator is to actuate the swinging frame 85, with instant depression of the gears 151 into mesh with the racks 104 as described in Par. XLI. As this is occurring, the stud 86 reaches the bottom of the fork on the end of the arm 327, and just after the gears are brought into mesh with the racks the continued movement of the frame 85 causes the toggle 331, 332 to buckle, lifting the tail of lever 167 out of the path of lug 171. In the clearing operation the stud or lug 171 engages the lever 167 and, as described in Par. XLIII, causes the gears 151 to rise out of mesh with the racks 104 immediately after the said gears and associated disks have been rotated (in the "clearing" direction) to the zero position, so that when the racks move home against the gears 151, numeral wheels 150, etc., will be left at the zero position. In the present case, the lifting of lever 167 out of the path of stud 171 and into locking engagement with finger 338ª prevents lifting of the gears 151, and, instead, compels them to remain in mesh with the racks 104. The racks 104 therefore advance until arrested by the action of the disks 270 and dogs 294 (as described in Par. XLIII) thereby setting the type sectors $a^3$, $b^3$,...$i^3$, as if for printing the accumulation, in the manner described in Par. XLV, but when the handle nears the end of its forward movement (toward the operator) the stud 171 on the sector 169 (moving clockwise as seen in Fig. 11) passes idly under the lever 167 and does the same when the sector starts in the opposite direction to return to initial position. The printing having taken place as described in Par. XXXV, the advanced sliders 100 and racks 104 are returned to home position by the means described in Par. XVI, the racks 104 rotating the gears 151, disks 173, 257 and 270, and the numeral wheels 150 back to the positions occupied by them before the gears were depressed into mesh with the racks 104.

XLVIII. The sliders 100 and racks 104 having been restored to home position the shaft 152, carrying the gears 151, numeral wheel 150, etc., must be raised to disengage the gears from the racks. This is effected as follows: On the sector 169 is pivoted a finger or pawl 340 (Figs. 11 and 40) having an extension 341 held by a spring 342 against a stop 343 to prevent pivotal movement of the finger in the counterclockwise direction (as seen in Fig. 40). When sector 169 is swung from the position shown in Fig. 11 to that shown in Fig. 40, the cam lug 344 on lever 266 rocks the finger 340 idly on its pivot (see Fig. 42 also); but on the return movement of the sector 169 the finger is held rigid by the stop 343 and hence when it engages the cam-lug 344 it can pass only by raising the latter. This raises the rear end of lever 266 and swings link 162 down, carrying stud 163 down again in the curved slot in the member 164. The latter being held by the lever 167 and coöperating stop 338ª, the downward movement of stud 163 must move link 162 to the right (as seen in Fig. 40) thereby rocking shaft 157 counterclockwise and swinging the bell-cranks 153, 154 in the opposite direction, which raises the shaft 152 and lifts gears 151 out of mesh with racks 104, as explained in Par. XXII. As the sector 169 arrives at its home position the end of finger 340 escapes from the cam-lug 344, leaving the lever 266 in raised or normal position. At the same time the cam-rib 260 escapes from finger 259 and permits spring 345 (Fig. 9), attached to stud 346 on frame 85, to swing the latter back to initial position. Spring 337, Fig. 11, is also permitted to straighten toggle 331—332, bringing lever 167 back into contact with the locking rib 170. The return movement of frame or lever 85 carries stud 86 out of the notch on the upper end of the arm 327 (Fig. 10), thereby permitting said arm to be restored to normal position (by its springs 347) against the stud 326 on the subtotal key S, already raised to initial position by its restoring spring 348.

XLIX. During the printing of a subtotal all the digit keys are locked by the bars 39, as described in Par's VII and VIII. Obviously it is not necessary to lock the error keys 22, C, (or repeat key R), during the printing of a subtotal.

XLIX$^a$. *Total locking mechanism.*—To lock the machine against operation when either total key (grand or sub) is only partly depressed, thereby compelling the operator to depress the key completely when he desires to print a total, the following mechanism, shown in Figs. 9, 10, 11 and 11$^a$, is provided: On the frame 85, which, as explained in Par's X and XLVII, is given a preliminary swing clockwise, as seen in Fig. 10, by depression of either total key, S or T, is a pointed stud 360 coöperating with the pointed head of a vertical arm 361 fixed at its lower end to a pivot 362 mounted in the side frame 4 at the bottom thereof, the arm 361 being inside the frame 4. Fixed to the same pivot but outside the frame 4 is a vertical arm 363, Fig. 11$^a$, pivotally connected at its top by a link 364 to a depending arm 365, pivotally mounted on the end of the rod or shaft 13. On the sector 169, which, as explained in Par. XIV, is fixed to the main shaft 60 and therefore swings therewith, is a stud 366 having a flat top; the position of the stud when the sector is in home or normal position, being below and behind the lower end of the arm 365. When the frame 85 is rocked by partial depression of either total key the camming effect of the stud 360 on top of the arm 361 swings the latter forward (rightwardly as seen in Fig. 11$^a$), thereby advancing the link 364 and bringing the lower end of arm 365 wholly or partly into the path of the stud 366. Hence the sector 169 cannot be rocked and the machine is therefore locked. But if the total key is wholly depressed the frame 85 is rocked far enough to carry the stud 360 down past the head of the arm or lever 361, thus permitting the arm 365 to be swung back to its normal position, out of the path of the stud 366, by the spring 367 (Fig. 9) retracting the arm 360. It will therefore be seen that no damage can be done by attempting to operate the machine when a total key is improperly manipulated, since the main shaft 60 is locked when the key is only partially depressed.

L. *Printing after the machine is cleared.*— When beginning work with a calculating machine the operator first ascertains whether or not the machine is clear. As most machines require an idle stroke of the handle before a total can be printed, the first stroke which the operator gives the ordinary machine may afford no indication as to the condition of the machine, and another stroke must be given, in order to make certain. If the person is not accustomed to using adding machines he may be deceived by the first blank stroke, and, thinking the machine is clear, may proceed to set up and add items, only to get an incorrect total when he finishes. With the present machine no idle stroke is necessary, the total being printed immediately after the last item is added in; so that if on pulling the handle after depressing the grand total key nothing were printed, the operator could be certain that the machine had already been cleared. However, to give a positive and unmistakable sign that the machine is clear, provision is made for printing zeros in the hundredths and tenths columns whenever, the machine being already cleared, either total key is depressed and the handle pulled. For this purpose the following mechanism is provided:

LI. The lever 564 (Fig. 10) which, as explained in Par. LXXXIV, is rocked clockwise each time the machine is cleared or a subtotal printed, has a finger 575 provided with a stud extending laterally into a slot 576 in the upper end of an arm 577 fixed on the end of a short shaft 578 mounted in a long tubular bearing 579 (Fig. 17) supported by the standard 435. Fixed on the other end of the shaft is a depending arm 580, to which is pivoted a long link 581 (Figs. 17, 11, 6 and 6$^a$) extending downwardly and having its lower end slotted to engage a pin 582 extending laterally from the first of the series of locking dogs 408. As explained in Par. XXXIII, the series of dogs normally lock the printing hammers or bell-cranks $a^4$, $b^4$ ... $i^4$, except when an item has been set up on the keyboard, or a total of items previously set up is being printed. The first two dogs 408, that is, the dogs which lock the hundredths and tenths hammers $a^4$, $b^4$, are, as explained in Par. XXXIII, tied together by the pin 412, Fig. 6$^a$. Hence when the lever 564 (Fig. 10) is rocked clockwise as explained in Par. LXXXIV, the stud 575 rocks shafts 578 and arm 580 in the same direction, or counter-clockwise as seen in Fig. 6. This advances the link 581, which in turn rocks the first two dogs or pawls 408 clockwise and so retracts them from engagement with the studs 409 on the printing hammers $a^4$, $b^4$, thus unlocking the latter. The lost motion afforded by the slot 576 in the arm 577 (Fig. 10) causes this unlocking to occur just before the lever 434 is released (as explained in Par. XXXV) to effect the printing. It will therefore be seen that even though the machine is clear, and no item is set up on the key-board, zeros will be printed in the hundredths and tenths columns if the handle 850 is pulled while either total key is depressed. Perceiving the zeros, the operator knows that the machine is clear, since the total (subtotal or grand total) of all that is "in the machine" is rezo.

LII. Inasmuch as the rocking of lever 564 (Fig. 10) to cause zeros to be printed in the hundredths and tenths columns as described in Par. LI, also raises the ink ribbon (as explained in Par's LXXX and LXXXI) to change the color of the imprint, the two zeros will be printed in a different color, for example red, from that in which the items are printed, since the items are printed without first depressing one of the total keys and hence without raising the ink ribbon.

LIII. *Printing characters to indicate the nature of the computing operations performed by the machine.*—For this purpose, provision is made whereby an appropriate character will be printed at the side of the imprint, whenever a total, or a "subtrahend" (a number which is to be subtracted), or the result of subtraction, is printed. This not only facilitates the work of the operator at the time by placing before him a positive indication of what he is doing, but enhances the value of the record for subsequent use or reference, as it shows at a glance just what each imprint means; the reader of the record knowing that every imprint followed by a minus sign, "—", for example, is a subtrahend, and that every imprint followed by "S" or "T", for example, is a total, subtotal or grand total as the case may be, and representing the arithmetical sum of the preceding items if they are all positive numbers and the algebraic sum if one or more of them are negative,—that is, followed by the minus sign.

LIV. For the purpose explained in Par. LIII, preceding, the following mechanism is provided, shown only in Figs. 54 to 57 inclusive to avoid unnecessarily complicating the other figures. On the top of the casing 10 alongside of the type sector $a^3$ is a standard 590 at the top of which is pivoted a signal-printing sector 591 having at its free end a pair of concentric arc-shaped ribs 592, 593, carrying radially slidable type-bars 594, 595, 596, urged toward the pivot of the sector and normally held in retracted position by coil springs 597. The character or type on the upper type-bar is "S", on the middle bar "—", and on the lower bar "T"; and since the sector in which the bars are mounted is pivotally supported it may be swung up or "set" to bring the appropriate type-bar to the printing line.

LV. The sliding type-bars 594, 595, 596, described in Par. LIV, preceding, are actuated to print their characters on the record sheet or strip by the following mechanism: Fixed on the top of the printing hammer or bell-crank $a^4$ (Fig. 57), which, as explained in Par. LI, is actuated at every printing operation, is a long finger 619 extending toward the rear ends of the type-bars. When the type-bar sector is in its normal or lowermost position, the finger 619, swung forward with the hammer $a^4$, passes idly above the type-bars, but when the sector 591 is set, as described in Pars. LIV and LVI, the finger strikes the rear end of one or another of the type-bars and drives the bar forward, thus making the imprint.

LVI. To adjust or set the signal sector 591 (Figs. 54, 55 and 57) described in Par. LIV, it is swung on the standard 590 by a depending arm 598 fixed to the pivot 599, to which the said sector is also fixed. At its lower end the arm has a lateral stud 600 engaging the notched upper end of a lever 601 fulcrumed at 602 on a suitable bracket 603 and having its lower end pivoted to a long inclined link 604 extending above and past the main shaft 60 into pivotal connection with an arm 605 (Fig. 54). The latter is fixed to and depends from the transverse shaft 103 extending from the right side of the machine to the left and journaled in the side frames 4, 5. On its left end, inside the frame 4, shaft 103 has fixed to it an upwardly extending arm 607 connected by a curved link 608 to the lower arm 609 of a bell-crank lever 610. The horizontal arm 611 of this lever lies under the lateral pins 612, 613, 614, on the keys S, T, and M, respectively, the stud 613 being flattened on one side at its end, as shown. When the subtotal key S is depressed the pin 612 strikes the inclined edge 615 of the arm 611 and by the consequent camming action swings the bell-crank 610 counterclockwise (as seen in Fig. 54), which motion is transmitted, by the train of parts described above, to the sector 591, raising the latter far enough to bring the type-bar 594 to the printing line. This causes the letter S to be printed (by the mechanism described in Par. LV) after the subtotal, as shown at 616 in Fig. 58, indicating that the number printed is the sum of the preceding items but that the machine is not cleared. When the subtraction key M is depressed, the pin 614, bearing on the straight portion of the arm 611, swings the bell-crank 610 far enough to bring the type-bar 595 to the printing line, thereby causing the sign "—" to be printed at the side of the item, as at 617 in Fig. 58. This indicates that the number printed is a subtrahend, or, in other words, is negative. When the grand total key T is depressed the stud 613, bearing on the curved edge of the arm 611, cams the bell-crank 610 counter-clockwise far enough to bring the type-bar 596 to the printing line, so as to print the letter T, as shown at 618, Fig. 58. This indicates that the number so designated in Fig. 58 is the result of subtraction, (or, in other words, the algebraic sum of the preceding positive and negative items), and that the machine is also cleared.

LVII. *Subtraction operation.*—As explained in Par. XX, the accumulating or computing gears 151 (Fig. 6, for example) and wheels 150 are rotated counterclockwise, as seen in Fig. 6, in the adding operation by depression of the gears into mesh with the racks 104 after the racks have been advanced by the means described in Par's XIV and XV and have been arrested by the digit keys as described in Par. XVI, so that the gears will be rotated by the racks in their homeward or retracting movement. In the adding operation of the computing mechanisms, described in Par's XXIII to XXVII inclusive, the carrying or transfer is from the lower to the next higher order. Inasmuch as subtraction is the inverse of addition it is apparent that in operating the machine to subtract instead of add an item, the gears 151 must be rotated clockwise (as seen in Fig. 6, for example) and hence must be depressed into mesh with the racks 104 before the sliders 100 are advanced. It is also clear that in subtraction the carrying or "borrowing" is from the higher to the next lower order of notation. Keeping these principles in mind will make it easier to understand the subtracting operation of the machine.

LVIII. The item to be subtracted, that is, the "subtrahend", having been set up on the keyboard in precisely the same manner as for addition, the next operation is to turn manually the subtraction button or knob 16 clockwise, as seen in Fig. 1. Referring to Figs. 3, 4 and 51 (the latter figure being on sheet 4, with Fig. 4), it will be seen that the button 16 is tubular and has in its bottom a transverse slot 665, normally out of register with the vertically movable finger 666 pivoted to a lug depending from the keyboard frame section $l$. This finger is held against the bottom of the button 16 by a coil spring 667, so that when the button is turned as far as it will go in the aforesaid clockwise direction and the slot 665 is thereby brought into register with the finger the latter will be snapped up into the slot and lock the button in its turned position. To return the button to initial position it is only necessary to press down the finger key 668 which is slidably mounted in the button 16. This swings the locking finger 666 out of the slot and permits the spring 669 to turn the button back.

LIX. The portion of the button 16 which is below the top of the keyboard frame section $l$ has in its side a helical cam-slot 670, Figs. 3 and 51 (also shown in dotted lines in Fig. 4), into which extends a finger 671 on the bell-crank lever 244, described in the last part of Par. XXIX. Hence when the button 16 is turned as described in Par. LVIII, the cam-groove 670 swings the lever 244 counterclockwise as seen in Fig. 4 and advances the link 242. This actuates the arm 239 and tensions the spring 235, as will be clear from the latter part of Par. XXIX. The shaft 180 is therefore rocked counterclockwise as seen in Fig. 4, swinging the fingers 202 (Fig. 36) down and out of engagement with the teeth 203 on the carrying rack dogs 204. The arm 239 has a curved extension 239$^a$, normally in the position shown in Fig. 4, but when the arm is rocked by the member 236 the stud 239$^b$ on the said extension is carried under the inclined finger 101$^a$ on the extreme right end of shaft 101. From Par. XLIII it will be remembered that normally the shaft 101 is rocked through the medium of cam 290, lever 281, and link 280, and spring 289, Fig. 9, to rock the fingers 276 and thereby unlock the dogs 272 (Fig. 35) and permit the latters' springs 301 to bring the dogs' heads 274 into the paths of the teeth 271 on the disks 270; so that said heads will be engaged by the appropriate teeth 271, the dogs advanced, and the sliders 100 and computing gears 151 arrested when the gears, rotating clockwise (as seen in Fig. 7, for example) in the clearing operation, reach the zero position. Such arrest of the clockwise rotating gears in the subtracting operation would of course not be permissible. However, the stud 239$^b$ (Fig. 4), brought under the finger 101$^a$ as described above, prevents the shaft 101 from rocking under the tension of spring 289. The fingers 276 are thus maintained in their normal positions and continue to hold the dogs 272 in the position shown in Fig. 35, with their heads 274 below the paths of the aforesaid teeth 271. Hence the teeth 271, revolving in the substracting operation, pass idly above the dogs' heads without engaging and advancing the same. The link or bar 242, Fig. 4, is also connected, by a slot 672, to a lateral stud 673 on the upper end of an arm 674 fixed to the right end of shaft 102. The described advance of the link 242 by the bell crank lever 244 therefore rocks the arm 674 and shaft 102 clockwise as seen in Fig. 4, thereby rocking arm 675 (Fig. 11) counterclockwise as seen in Fig. 11, the arm 675 being fixed to the left end of the shaft outside the frame 4. This movement of the last mentioned arm moves the link 676 toward the operator (toward the right of Fig. 11) and hence swings counterclockwise the lever 677 fulcrumed loosely on the shaft 103 to the lower end of which lever the link is pivoted. The upper end of the lever 677 is shown in Fig. 41 to be normally under the stud 678 on the lower end of the subtraction key M. Rocking the said lever 677 as described therefore swings its upper end out of the path of the stud 678 (thereby unlocking the key M and permitting the same to be depressed) and into the path of a stud 679 on the swinging frame 85. The latter now cannot be swung counterclockwise (as seen in Fig. 41) about its axis or fulcrum 102; and since, as explained in Par's XL and XLVII, neither total key S or T can be depressed without rocking the frame 85 in the direction just mentioned it will be seen that turning the button 16 (Figs. 1, 3 and 4) not only unlocks the subtraction key M but also locks both total keys.

LX. The bar or link 242 (Fig. 4), which, as described in Par. LIX, is moved away from the operator by turning the button 16, has a depending finger 680 provided at its lower end with a stud extending laterally into a slot in the upper end of a vertical arm 681 fixed to the end of shaft 403. Just outside the frame 5 the shaft 403 has fixed to it an upright arm 682 (Fig. 5), rigidly connected to arm 681 by an alining pin 683 and provided at its upper end with a stud 684 extending laterally into a vertical slot 685 in the lower end of a hooked member 686. The stud 684 thus permits the member or lever 686 to swing on the stud as a pivot, and the slot 684 permits the said member to be reciprocated vertically. Pivotal movement of the member mentioned is produced by a link 687 connecting the member to the lower portion of the lever 159 fixed on the shaft 157, which is rocked by the means described in Par. XXI. Vertical reciprocation of the hooked member 686 is produced by a lever 688 fulcrumed at 689 on the side frame 5. A spring 688ª (Fig. 4) causes one end of the lever to bear on a cam 690 fixed on the shaft 443, which is rocked by the means described in Par. LXXXII. On the other end of the lever 668 is a stud 691 extending laterally into a horizontal slot 692 in the hook member 686, just above the vertical slot 685, so that as the lever 688 is rocked by the cam 690 the hooked member will be lowered by the cam and raised by the spring 688ª. The member 686 is also capable of pivotal movement on its connection with the link 687. Hence when the shaft 403 and arm 682 are rocked clockwise (as seen in Fig. 5) by turning the subtraction knob 16, through the medium of the aforesaid link 242 (Fig. 4), the member 686 is swung counterclockwise, thereby bringing the hook 686ª, at the top of the member 686, over toward the finger 693 fixed on the right end of shaft 180. Now when the shaft 157 is rocked (clockwise as seen in Fig. 5), the link 687 swings hook 686 to a position above the finger. Rocking the shaft 403 by arm 681 not only positions the hooked member 686 as described, but also swings arm 224 clockwise as seen in Fig. 9, thereby swinging the hooked member 222 out of position to engage the finger 221, with which it coöperates in the adding operation of the computing mechanisms, as explained in Par. XXIX. At the top of the arm 224 is an extension 732 (Fig. 11) connected by a slotted link 733 to the lower end of the toggle link 332. Hence when the arm 224 is rocked (clockwise, as seen in Fig. 9, but counterclockwise as seen in Fig. 11) it buckles the toggle 331—332, raising the lever 167 out of the path of the stud 171 and against the stop finger 338ª, thereby locking the lever as described in Par. XLVII.

LXI. The member 686 also has pivoted to it a link 686ᵇ (Fig. 4) extending rearwardly and provided with a forked end engaging a stud 686ᶜ on the lower end of an arm 686ᵈ fixed to and depending from the right end of a shaft 184ª mounted rotatively in the frames 184 (see also Figs. 35 and 36). When the hooked member 686 is swung by turning the subtraction button 16, as described in the preceding paragraph, the link 686ᵇ is moved toward the left (as seen in Fig. 4) thereby bringing the bottom of the notch at its end against the stud 686ᶜ. Hence when the member 686 is swung farther, by the arm 159, the arm 686ᵈ and shaft 184ª are rocked clockwise. The shaft named has fixed on it a series of fingers 184ᵇ (Fig. 34) normally resting idly on the studs 199ª fixed to the locking pawls 199, so that when said shaft is rocked as described, the pawls 199 are swung down out of engagement with the fingers 201, thereby unlocking the carrying racks 181. If the carrying racks 181 have been left in advanced position after an addition operation, as described in Par. XXV, the pawls 199 are already depressed, as in Fig. 39, in which case the fingers 184ᵇ simply swing down upon the studs 199ª and hold the pawls in depressed position.

LXII. The horizontal arm of the bell-crank lever 244 (which is rocked counterclockwise as seen in Fig. 4, by the button 16, as explained in Par. LIX) has an inclined cam-slot 694 engaged by a finger 695 (Fig. 51) extending laterally from a horizontally swinging arm 696 fulcrumed on a stud depending from the keyboard frame section *l*. When the lever 244 is rocked as indicated above, the cam-slot 694 swings the finger 695 and arm 696 clockwise as seen in Fig. 51. The end of the arm 696 extends into a grooved collar 697 fixed to the pinion 210, which, as explained in Par. XXVIII, is fixed on the cam shaft 179 and is rotated (to rotate the cam shaft) by the reciprocatory rack 211. The collar 697 being fixed to the pinion it will be seen that when the arm 696 is rocked as described the shaft 179 is moved axially toward the right of the machine and the rack 211 is slid out on the wrist pin by which it is connected to the upper end of the actuating arm 213. The shaft 179 not only carries and rotates the adding cams (Figs. 38ª and 38ᵇ) as explained in Par's XXV, XXVI, and XXVII, but also carries and rotates the subtracting cams (described in Par. LXXI hereinafter). Normally the adding cams are in operative position, but when the shaft 179 is shifted axially by turning the subtraction knob 16 the adding cams are moved out of and the subtracting cams are moved into operative position.

LXIII. If the subtraction button 16 is only partly turned and the attempt is made to operate the machine, serious injury to various parts might result. To prevent such an occurrence, provision is made whereby partial movement of the button will cause the machine's actuating mechanism to be locked. For this purpose the stud 698 on the arm 857 (shown in Fig. 3 and fully described in Par. LXXXII) is provided with a squared end which, when the arm 857 is in home position, lies to the front of the end of a stop 699 pivoted to a lug on the arc-shaped locking plate 875. On the stop is an upwardly inclined finger 700. With the parts in normal position, shown in Fig. 3, a spring 701 holds the finger 700 against the underside of the stud 243 on the bell-crank lever 244 and the end of the stop 699 above and out of the path of the stud 698. When the button 16 is turned and lever 244 rocked, the stud 243 swings the finger 700 and depresses the stop 699. If the button is only partly turned the stop is swung into the path of the stud 698 and the arm 857 is therefore locked, but if the button is turned to the full extent, thereby properly actuating or positioning the parts connected with it, the advancing stud 243 passes beyond the finger 700 and hence allows the stop to swing up out of the path of the stud 698 and come to rest against the stud 243. It is also important, to prevent injury to the machine, that the subtraction button be locked in normal position when the machine is performing other operations and be locked (beyond the control of the operator instead of merely by the manually controlled locking finger 666, described in Par. LVIII) in operative position when the machine is subtracting. For this purpose an arm 703 is provided, fixed to a pivot 704 and depending into the path of the stud 698. Fixed to the same pivot, which is mounted in a small bracket 705 on the plate 875 is a vertical dog 706 having at its upper end a tooth 707. With the arm 857 in home position the arm 703 is held to the right as seen in Fig. 3, thereby holding the dog in the position shown, to the left and out of the path of a pin 708 on lever 244. If the lever 244 is in normal position, as shown, the tooth 707 comes above the pin and locks the lever and the button 16 when the operating handle is pulled forward, and if the button and lever have been actuated as described in Par. LIX the pin is above its initial or normal position and the locking tooth comes under it thereby locking the lever and button against homeward movement. When the arm 857 returns to normal or home position the stud 698 swings the dog back, which withdraws the tooth 707 from the path of the pin 708 and unlocks the lever 244 and subtraction button 16.

LXIV. The subtraction button 16 having been turned, with the results described in Par's LIX, LX, LXI, LXII, the next step in the subtracting operation is to depress the subtraction key M which, it will be remembered (see Par. LIX), is unlocked by turning the button 16. When the key M is depressed its stud 678 engages and depresses the contiguous end of a member 710 (Figs. 42, 9 and 10), pivoted at its forward end to lever 263 which, as described in Par. XLI, is fulcrumed at 264 and pivoted at its forward end (away from the operator) to the long lever 266. The member 710 has a vertical slot 711 engaging a headed pin 712 on the lever 263, so that depression of the member 710 by the stud 678 on key M simply brings the top of the slot down upon or very close to the pin but does not rock lever 263. It does, however, bring a pointed finger 713, on member 710, below the adjacent pointed end of a short arc-shaped cam-rib 714 (Fig. 41) on the sector 261, so that when the sector is rocked clockwise (as seen in Fig. 10) the rib will ride up on top of the finger and depress the same farther. The member 710 being already locked to the lever 263 by the top of slot 711 bearing on the pin 712, it will be seen that the aforesaid farther depression of the finger 713 (and hence member 710) rocks the lever 263 clockwise as seen in Fig. 10, thereby rocking the long lever 266 (Fig. 11) in the same direction. As explained in Par. XLVII, such actuation of lever 266 results in quick depression of the computing gears 151 into mesh with the racks 104 before the latter are advanced.

LXV. The subtraction button 16 having been turned and the subtraction key M having been depressed with the results described in Par's LIX–LXIV inclusive, and the subtrahend having been set up on the keyboard, the operating handle 850 is drawn toward the operator. This rocks the sector 261 (Fig. 10) and, by actuation of the long lever 266 as described in Par. XLI, depresses the computing gears 151 into mesh with the racks 104 by raising the link 162 and thereby rocking shaft 157 and bell-cranks 153, 154, in the manner described in Par. XLI; this depression of the gears occurring before the racks are advanced. The described rocking of the shaft 157 also rocks shaft 184ᵃ and, by the resulting depression of the fingers 184ᵇ, Fig. 34, unlocks the carrying racks 181, as explained in Par. LXI. Such of the racks 104 as have been unlocked by depressed digit keys as explained in Par. XVIII are now advanced by the means described in Par's XIV and XV and are eventually halted by the arrest of the associated controlling members 107 as explained in Par. XVII. The advancing racks 104 rotate the computing gears 151 clockwise (as seen in Fig. 38ᵃ, for example) that is, opposite to the direction of the arrow in said figure. The rocking of shaft 157 to depress the gears 151 into mesh with the racks 104 before the latter are advanced also moves the hooked member 686 (Figs. 4 and 5) toward finger 693 until the hook 686ᵃ overlies the finger, after which the cam 690 rocks lever 688 counterclockwise thereby depressing the hooked member. This rocks the finger 693 and shaft 180 clockwise, which brings against the studs 207 (Figs. 34 and 38ᵃ) of such carrying racks 181 as are in retracted position the edges 208ᵃ of the associated fingers 202 and advances such retracted racks (all of them) one tooth. It will therefore be seen that when the racks 104 begin to advance, with the computing gears 151 depressed into mesh with racks 104 and out of mesh with racks 181, the racks 181 are all one tooth in advance (that is, toward the operator) of their normal or rearmost position;—some or all of the racks 181 having been either left in such advanced position by a previous computing operation or moved to such advanced position by the respective fingers 202.

LXVI. The subtracting dog 715 (Fig. 34) is pivoted to a bracket 716 fixed on the lower edge of the carrying rack 181 near the shaft 180 and extends toward the subtracting cam 715ᵃ. Normally the free end of the dog is out of the path of the cam, as shown in Fig. 34. The dog has an angular slot 717, engaged by a lateral stud or pin 718 on the lever 188. Since the carrying rack 181 has no vertical movement either up or down, and since the lever 188 is pivoted on the trip-lever 190 which is in turn carried by the frame 176 and is therefore swung down with the gears 151, it will be seen that when the said gears are depressed into mesh with racks 104 the dog 715 is swung down into the path of the subtraction cam and that the pin 718 is at the same time shifted over to the incline in the cam slot 717. Then when the carrying rack 181 is advanced (by fingers 202 as described in Par. LXV) the lever 188 is rocked counterclockwise on its fulcrum 205 as seen in Fig. 34, thereby moving the stud 718 into the inclined portion of the cam-slot and hence swinging the dog 715 up and out of the path of the subtracting cam.

LXVII. Referring now to Fig. 38ᵃ and making the same assumptions with respect to the same as were made in Par. XXIV, it is further assumed that the minuend or number already "in the machine" is 15. This means that the computing gear 151 and numeral wheel 150 are at the "one position" and that the disk 173 is in the "five position." It is also assumed that the subtrahend or number to be subtracted is 7. As the disk 173 revolves clockwise the tooth 174 passes the pointed end 189 of lever 190 and in doing so rocks the lever clockwise. This swings lever 188 clockwise on the pin 206 as a fulcrum and hence moves the stud 718 out of the inclined portion of cam-slot 717 and into the horizontal portion, thereby swinging the dog 715 down and into the path of the subtracting cam 715ᵃ. The clockwise movement of lever 190 also depresses the finger 191 and allows the detent 193 to drop as described in Par. XXV, bringing its lateral finger 194 into the path of cam 195.

LXVIII. The disks 173, Fig. 38ᵃ, having come to rest, the operating handle nears the end of its advancing movement and causes the gears 151 to be raised out of mesh with the racks 104 in the following manner: On the radial arm 720 (Fig. 11) of the sector 169 is a stud 721 engaging a long slot 722 in the rear end of a link 723 having at its forward end a shoulder 724, and a slot 725 engaged by a pin 726 on the end of a horizontal arm 727 rigidly connected to the vertical arm 224. As explained in Par. LX, turning the subtraction button 16 causes the arm 224 to swing counterclockwise (as seen in Fig. 11), thereby raising the shouldered end of the link 723. On the link 162, which, as explained in Par. XLI, is raised to depress the computing gears 151 into mesh with the racks 104, is a depending finger 728 having at its lower end a lateral pin 729, engaged by the forked bell-crank lever 730, fulcrumed loosely on shaft 117. Manifestly, when the link 162 is raised the lever 730 is rocked counterclockwise as seen in Fig. 11, thereby swinging the stud 731 on its shorter arm down into the path traversed by the shoulder 724 after the link 723 has been raised as described. During the greater part of the swing of sector 169 clockwise (as seen in Fig. 11) the lost motion afforded by the long slot 722 keeps the link 723 in its initial position; but as the sector nears the end of its clockwise swing the stud 721 reaches the end of the slot and advances the link, bringing the shoulder 724 against the stud 731 and rocking the bell-crank lever 730 clockwise. This depresses the link 162. Since the lever 164 is locked by the lever 167 coöperating with the stop 338ᵃ, the slot in lever 164 is held in its normally inclined position, and hence the downward movement of stud 163 as the link 162 is depressed moves the latter to the left (as seen in Fig. 11), rocking shaft 157 and raising the gears 151 out of mesh with the racks 104 through the agency of the bell-cranks 153, 154, before the racks start home. At the same time the cam 690 (Fig. 4) permits the hooked member 686 to rise, which in turn allows the spring 235 to swing the fingers 202 counter-clockwise (as seen in Fig. 38ᵃ) thereby withdrawing the edge 208ᵃ from the stud 207 and hence leaving the rack 181 free to be retracted toward the shaft 180.

LXIX. The computing gears 151 having been raised out of mesh with the racks 104 as explained in the preceding paragraph, the main shaft 60 rocks back to its initial position, thereby rotating the cam shaft 179 and subtracting cam 715ᵃ clockwise (as seen in Figs. 4 and 34, for example) by the means described in Par. XXVIII. The dog 715 being in the path of the subtracting cam, the carrying rack 181 being advanced one tooth, and the gear 151 being in mesh with the carrying rack, the clockwise-moving cam pushes the dog 715 backward a distance equal to one tooth on the rack, thereby rotating the gear 151 and number dial 150 one step in the clockwise direction. After the subtracting cam retracts the carrying rack, the cam 195 engages the finger 194 (which is offset laterally so that it can be engaged by the said cam even though the latter is shifted axially with the cam shaft 179 as described in Par. LXII), and rocks the detent 193 clockwise as seen in Fig. 39. This unlocks the rear end of the trip lever 190 by releasing its finger 191 (see Par. XXV, near the end thereof) and permits the spring 196, Fig. 38, to restore the trip lever to initial position with its pointed end 189 in the path of the teeth 174, 175, on disk 173. This movement of the lever 190 swings lever 188 counterclockwise (Fig. 39) on the pin 206 as a fulcrum, thereby restoring its foot 187 to initial position; said lever 188 having previously been rocked clockwise as seen in Fig. 39, by the rocking of lever 190 as the tooth 174 passes under its pointed cam-end 189.

LXX. As the main shaft 60 and operating handle 850 move back home the parts actuated by the forward movement of the shaft are of course moved in the opposite direction and are thus restored to initial position; except such carrying racks as were not retracted by the respective dogs 715. These are left in advanced position and in mesh with the respective gears 151, as in Par. XXV, describing the adding operation. Then if the next operation of the machine is another subtraction the advanced racks are already in position for retraction by the subtraction cams, but if the next operation is any other than subtraction the advanced racks are returned to and locked in initial position in the manner described in Par. XXVI; it being understood that the return of the subtraction button 16 to initial position as described in Par. LVIII relaxes spring 235 (Fig. 4) and re-tensions spring 234. After the subtracting operation is completed, the subtraction button 16 remains in position for another subtraction but the subtraction key M is raised to initial position by the spring 710ᵃ, Fig. 42. At the same time, spring 710ᵇ raises lever 710 to its normal position with respect to the lever 263.

LXXI. For the purpose of subtraction the computing mechanisms are equipped alike except that the lowest order has no subtracting cam (since there is no "borrowing" from such order) and that the subtracting cams, $b^{16}$, $c^{16}$, ... $i^{16}$, Fig. 38ᶜ, for the other orders, are constructed and arranged to have their operative edges in the form of a helix, in a manner analogous to the construction and arrangement of the adding cams shown in Fig. 38ᵇ and described in Par. XXVII.

LXXII. *Ink-ribbon mechanism.*—The ink-ribbon 500, which runs horizontally between the type sectors and the paper-feed roller and platen 501, (Fig. 6, for example), is wound on a pair of spools, one of which is shown at 502 in Fig. 16, inclosed in cups 503ᵃ, 503ᵇ, provided with removable covers 504. Each spool is formed with a central bore to receive a spindle 505 rising from a member 506 and is non-rotatably secured to said member by a pin 507 rising therefrom. Each of the members 506 (only one of which is shown) has a flange 508 with which coöperates a removable bushing 509 to hold the said member in position; the bushing also having a flange, shown at 510, which serves to secure the spool-cup in place on the casing 10. Rotary displacement of the cups is prevented by suitable pins, one of which is shown at 511, extending from the casing 10 into the base of the cup. The base of each member 506 is formed with a cylindrical socket at the top of which is a diametrical rib 512, to receive and engage with the correspondingly grooved upper ends of the vertical spool-driving studs 512ᵃ, 512$^b$. The latter are rotatably mounted in brackets 515, extending inwardly from the tops of the side frames 4, 5, as shown in Fig. 16. At their lower ends the driving studs are equipped with bevel gears 516, 517, meshing with bevel pinions 518, 519, rigidly mounted on the outer ends of short horizontal shafts 520, 521, journaled in the said brackets 515. On the inner portions of the shafts are two friction clutch disks 522, 523, slidably but non-rotatably mounted on said shafts, and coöperating with clutch disks 524, 525, mounted on the same shafts but rotatable with respect to the same. The slidable disks 522, 523, are held in contact with the opposed disks by coil springs 526, 527, encircling the shafts.

LXXIII. Rigidly connected to and coaxial with the clutch disk 524 is a ratchet wheel 528, Fig. 6, having four long cam-shaped teeth $r$, $s$, $t$, $u$, to coöperate with studs or pins 529, 530, on the upper ends of two arms or links 531, 532, which are pivoted at their lower ends to the cam 470 fast on the shaft 443 as described in Par. XXXVIII. The arms are provided with opposed stop-fingers 533, 534, which limit the approach of the arms toward each other under the influence of the coil spring 535 without interfering with the spreading of the arms against the tension of the said spring. When shaft 443 is rocked counterclockwise (as seen in Fig. 6) by the means described in Par. LXXXII, the arms 531, 532 are raised, and are spread by the camming effect of the cam-ratchet wheel 528, the stud 529 moving toward tooth $r$, and stud 530 engaging tooth $t$ and turning the ratchet and the clutch disk 524 (Fig. 16) counterclockwise. This partial rotation of the ratchet causes the tooth $r$ to meet and pass the advancing stud 529 and brings tooth $s$ under said stud. Then when the movement of cam 470 is reversed (by the homeward or backward movement of the main operating shaft 60) the arms 531, 532, are retracted, stud 529 engaging tooth $s$ and pulling it downward, thereby giving additional rotation of the shaft 520 in the same direction as the movement imparted by arm 532; the latter, during its retraction, passing idly over teeth $u$ and $r$. In this manner a half of a complete revolution is imparted to the clutch disk 524, tending, through the medium of the clutch disk 522, to rotate the shaft 520 and bevel pinion 518 at the same rate. The bevel gear 516 and pinion 518 having the gear ratio of 2:1, the gear 516 and hence the spool-driving stud 512$^a$, and the ribbon spool 502 actuated by the latter, tend to rotate at the rate of a quarter turn at each complete to-and-fro rocking movement of the main shaft 60. The direction of rotation of the said spool is clockwise as seen from above.

LXXIV. Rigidly connected to and coaxial with the clutch disk 525, Figs. 16 and 17, is a star ratchet-wheel 540, Figs. 8, 17 and 43, engaged by a double-pointed pawl 541 mounted on a stud 542 which is rotatably and slidably carried in a slot 543 in a lever 544 loosely mounted on and extending forwardly from the shaft 521, said pawl being maintained in the position shown in Fig. 43 by the upper finger 545 of a bent dog 546 pivoted on a lug 547 depending from the lever 544 and urged toward the pawl by a coil spring 548. On the opposite side of the lever 544 and fulcrumed on the lug 547 is another dog, 549, urged against stud 542 by a coil spring 550 and hence serving to hold said stud in the forward end of the slot 543, as shown in Fig. 43. The free or rear end of lever 544 is connected by a link 551 to one end of a lever 552 fast on the shaft 443 which, as explained in Par. LXXXII, is rocked counterclockwise (as seen in Fig. 43) when the operating handle is pulled toward the operator and then clockwise when the handle swings back to its home or initial position. Hence, when the handle moves toward the operator the link 551 raises the lever 544 and through the medium of the pawl 541 imparts a partial rotation to the star wheel 540 in the direction opposite to that imparted to the bevel gear 518 as in Par. LXXIII, preceding. The proportions of the lever 552, lever 544 and star wheel 540 are such that the rotation imparted to the latter is considerably less than a half turn, preferably a tenth of a turn; and as the gear ratio of bevel gear 517 and bevel pinion 519 is only 2:1, the gear 517 is rotated at a much slower rate than the other gear mentioned. Thus the two spool-driving studs 512$^a$ and 512$^b$ have different rates of rotation. Assuming that the empty spool in cup 503$^b$ is rotated counterclockwise (as seen in Fig. 1) by the upward stroke of pawl 541 and that the radius of the coil in cup 503$^b$ is then at its minimum and the radius of the other coil is at its maximum, and since the two coils are urged in opposite directions by the ratchets 528 and 540, it will be seen that one clutch or the other must slip. Clutch 523—525 is the heavier, and hence clutch 522—524 takes the slip, with the result that the ribbon winds upon the spool in cup 503$^b$. This operation continues, clutch 522—524 slipping more and more, until the ribbon is all wound into cup 503$^b$. At this stage it is clear that since the spool in cup 503$^b$ can draw no more ribbon off the other spool it cannot rotate. Pawl 541 must rise, however; and since the friction of the disks 523—525 is greater than the effective tension of spring 550 (Fig. 43) the pawl can rise only by tumbling down past the line joining the centers of the shaft 521 and stud 542, the adjacent tooth of the star wheel 540 being engaged by the notch between the two points of the pawl and serving as a point or fulcrum for the pawl to turn on. The pawl then points downward, instead of upward as in Fig. 43. At the next pull or forward movement of the operating handle the arms 531, 532 (Fig. 6) turn the clutch disk 524 and the spool in cup 503ª in the same direction as before. But the downwardly pointing pawl 541, moving upwardly at the same time, does not rotate the clutch disk 525 and the spool in cup 503ᵇ. On the contrary, the upward stroke of the now downwardly pointing pawl is idle so far as rotating the star wheel 540, clutch disk 525, and the spool in cup 503ᵇ, is concerned, but the force exerted by it on the star wheel as it moves up is nevertheless sufficient to prevent the spool in cup 503ᵇ (urged constantly in one direction as previously explained) from pulling the ribbon off the spool in cup 503ᵇ. Hence, while the tumbled pawl is moving up the clutch disk 522 is held by the ribbon and disk 524 slips. When, however, the downwardly pointing pawl is drawn down, it positively urges the spool in cup 503ᵇ in the unwinding direction and so causes it to give ribbon to the faster turning spool in cup 503ª. At this time the diameter of the ribbon coil in 503ᵇ is greatest, so that the small angle through which the downwardly moving pawl 541 turns the spool does not mean an equally small take-up by the spool in cup 503ª the diameter of whose ribbon coil is at the minimum.

LXXV. As the spool in cup 503ª continues to take up the ribbon the spool in 503ᵇ eventually becomes empty; but the latter continues to be rotated in the same direction by the downward movement of the downwardly pointing pawl 541 and hence begins to wind up the ribbon, drawing it off the other spool. When the spool in cup 503ᵇ becomes full again and the other empty, the tension of the ribbon causes the pawl 541 to tumble back to its upwardly pointing position so that it then rotates the wheel 540 on its up stroke. That is, the star wheel 540 on the up stroke of the pawl is turned counter-clockwise (as seen in Fig. 43) which is now the unwinding direction since the ribbon has just been wound on the spool in cup 503ᵇ by the clockwise rotation of wheel 540. The spool in cup 503ª now takes the ribbon until the other spool is empty; whereupon the spool in cup 503ᵇ, still rotated counter-clockwise (as seen in Fig. 43) by the upward stroke of the upwardly pointing pawl 541, begins to wind up the ribbon. When the last mentioned spool is full the tension of the ribbon causes the pawl to tumble down and hence permit the other spool to wind up the ribbon. Clutch 523—525 never slips unless parts are so locked that if the clutch did not slip the resulting tension would tear the ribbon.

LXXVI. *Paper feed.*—The strip of paper 620 on which the items and totals are printed is drawn from a roll 621, Figs. 7, 28 and 29, rotatable on a spindle 622 supported in a pair of brackets 623 mounted on the case 10 at the back of the machine, the spindle being locked in the brackets by a pivoted latch 624 engaging a groove in the spindle and normally held in engagement therewith by a coil spring 625. To remove this roll 621 and substitute another it is only necessary to lift the latch, whereupon the spindle 622 can be slipped axially out of its bearings. The platen 501 is in the form of a rubber-covered roller and serves as the paper-feed roller, being for that purpose provided with journals 626, 627, mounted in side members 628 fixed on the brackets 623. From the roll 621 the paper passes under the feed roller and is held against the bottom thereof by a pair of friction rollers 629 journaled in swinging brackets 630, which are drawn toward the feed roller by coil springs 631. At the top the paper is held in contact with the feed roller by a small roller 632 mounted in an arm 633 which is secured in suitable position on the cross-rod 634 by a set screw 635. This cross rod also supports a horizontal knife 636 by which the paper strip may be severed by pulling it against the serrated edge of the knife. At the back of the members 628 is a cross bar 637, on which is fixed a curved arm 638, extending toward the roll 621, to prevent the free end of the paper from curling back into the feed mechanism. The bar 637 may also support two side arms 639, secured by set screws 640, extending along the edges of the paper, between the roll 621 and the feed roller, and down to the ends of the spool 641 on which the roll 621 is wound, for the purpose of guiding the paper accurately to the feed roller, and preventing displacement of the roll on the spindle 622. Fastened to one end of the feed roller 501 is a spacing ratchet wheel 642, engaged by the roller-end of a pawl 643 held in contact with the ratchet wheel by a coil spring 644, the object of the ratchet and pawl being to insure uniform spacing of the imprints by making the paper travel by uniform steps. On the feed roller journal 627 is a finger button 645 by which the feed roller may be turned manually when desired.

LXXXI. Each time the handle 850 is pulled toward the operator the paper-feed roller 501, Figs. 27–30, is turned to advance the paper, by means of the following mechanism: On one end of the roller is a ratchet wheel 646, adapted to be engaged by a pawl 647, Fig. 8, pivoted on the upper end of a lever 648 loosely mounted on the feed roller journal 626. The lower end of the lever has an undercut notch engaging the correspondingly shaped top of a connecting member or button 649 pivotally mounted on the end of the horizontal arm 649$^a$ of a bell-crank lever 650, fixed at its lower end to a short rock shaft 651, Fig. 17, mounted in a strong bearing 652 fixed on the standard 435. The arm 649$^a$ is pivotally connected to the lever, but is held yieldingly in the position shown by the light coil spring 650$^a$. Fastened to the same shaft 651 is a vertical arm 653 connected rigidly at its top to the lever 650 by a pin 654 and pivotally by a link 655 (Figs. 8 and 43) to an arm 656 alongside of and rigidly connected to the lever 544. When the lever 544 is raised by the rocking of shaft 443 (as explained in Par's LXXIV and LXXXVI) by the movement of the operating handle 850 toward the operator the link 655 swings the lever 650 to the right, as seen in Fig. 8, thereby rocking the lever 650 clockwise. This rocks lever 648 counter-clockwise, and retracts the pawl 647 over two teeth and almost to the third tooth on the ratchet 646 and retracts the pawl's finger 657 over the stud 658. When the lever 544 swings down, on the homeward stroke of the operating handle 850, the retracted pawl is advanced and hence advances the ratchet, thereby turning the paper feed roller and platen 501. As shown in Fig. 8, the pawl 647 is normally held out of engagement with the ratchet by its tail 647$^a$ bearing on the rod 634; but when the ratchet is retracted part way the said tail moves away from the bracket and so permits the pawl to drop down into engagement with the ratchet. As the pawl continues its retracting movement the inclined edge 657$^a$ of the finger 657 meets the stud 658 and the finger is swung up, thereby raising the pawl out of engagement. When, however, the pawl is advanced the functions of the stud and finger are reversed; the inclined edge of the finger moves down off the stud, permitting the pawl to drop into engagement with the ratchet and advance the same, after which the tail 647$^a$ of the pawl meets the rod 634 and raises the pawl to the normal position, shown in Fig. 8.

LXXXII. From the foregoing Par's LXXX and LXXXI, it will be seen that the extent of advance of the ratchet (and hence the paper feed roller 501) depends upon the length of time the pawl is engaged with the ratchet in the course of the pawl's advance; and that this in turn depends upon the position of the stud 658. If the stud is in the position shown (in Fig. 8) the inclined edge 657$^a$ of the finger will, when the pawl is advanced, meet the stud early and so will not let the pawl down into engagement with the ratchet until late in the pawl's advance. Hence the pawl's advance will be nearly completed before it drops into engagement with the ratchet. On the other hand, if the stud is raised (in a path substantially concentric with the axis of the ratchet) even the complete retraction of the finger will not bring its edge 657$^a$ very far up on the stud. Hence when the pawl and finger are advanced the said edge will move down quickly off the stud, and let the pawl drop, at an early stage in the advance. It is therefore apparent that the length of the steps by which the ratchet 646 is advanced and the paper fed forward depends upon the position of the stud 658. For the purpose of shifting the stud it is extended through a slot 660 in the adjacent side frame 628 and is mounted on the upper end of a bent arm 661 (Fig. 28), mounted to swing with some friction on the bearing by which the feed roller journal 626 is supported. At the bend of the arm 661 is a small handle 662 by which the arm can be swung on its support to raise and lower the stud 658. In the machine from which the present drawings were made the design and proportions of the parts are such that when the stud is in its lower position, against the bottom of the slot 660, the "feed" is "single-space", and "double-space" when the stud is in its upper position, against the top of the slot.

LXXXIII. *Ribbon shift.*—A "two-color" ink ribbon is used in the machine, so that the several items set up on the keyboard will be printed in one color and the total (either subtotal or grandtotal) will be prined in another. For this purpose the ribbon is raised, whenever the total key T or the subtotal key S is depressed, by the following mechanism:

LXXXIV. The lower end of frame 85, Figs. 9 and 10, is provided with a lateral stud 560 engaging the forked lower end of a bent lever 561 fulcrumed loosely on the stud 228 on the side frame 4 and having a forked upper end engaging a stud 563 on the lower end of an inclined lever 564, loosely mounted on shaft 157. The upper end of the lever 564 is forked to receive a lateral pin 565 on a depending arm 566 pinned on the end of a short transverse shaft 567 journaled in lugs 568 depending from the top of the case 10. As explained in Par's XLI and XLII, depression of either the total key T or the subtotal key S, followed by actuation of the main shaft 60, causes the frame 85 to be rocked clockwise (as seen in Fig. 10, for example). This rocks lever 561 counter-clockwise, which in turn rocks lever 564 in the same direction, thereby giving shaft 567 a rock counterclockwise. The last named shaft has fixed on it a pair of forwardly extending arms 569 engaging studs 570 on the sides of a yoke 571 (Fig. 17.) The sides of this yoke are rigidly connected to a pair of vertical members 572, slidable in guides 573 depending from the top of the case 10, the yoke and sliding members constituting a vertically movable frame.

LXXXV. At their tops the members 572, Fig. 10, are provided with loops through which the ribbon passes. Hence when the shaft 567, rocked as described in the preceding paragraph, swings the arms 571 upwardly, the members 572 are raised by said arms, thereby bringing the lower and differently colored (or total-color) half of the ribbon opposite the printing line. When the frame 85, Fig. 10, is rocked counterclockwise to initial position, as explained in Par. XLVII, the combined guides and lifters 572 are drawn down to normal position, bringing the upper or item-color half of the ribbon opposite the printing line.

Figure 2:
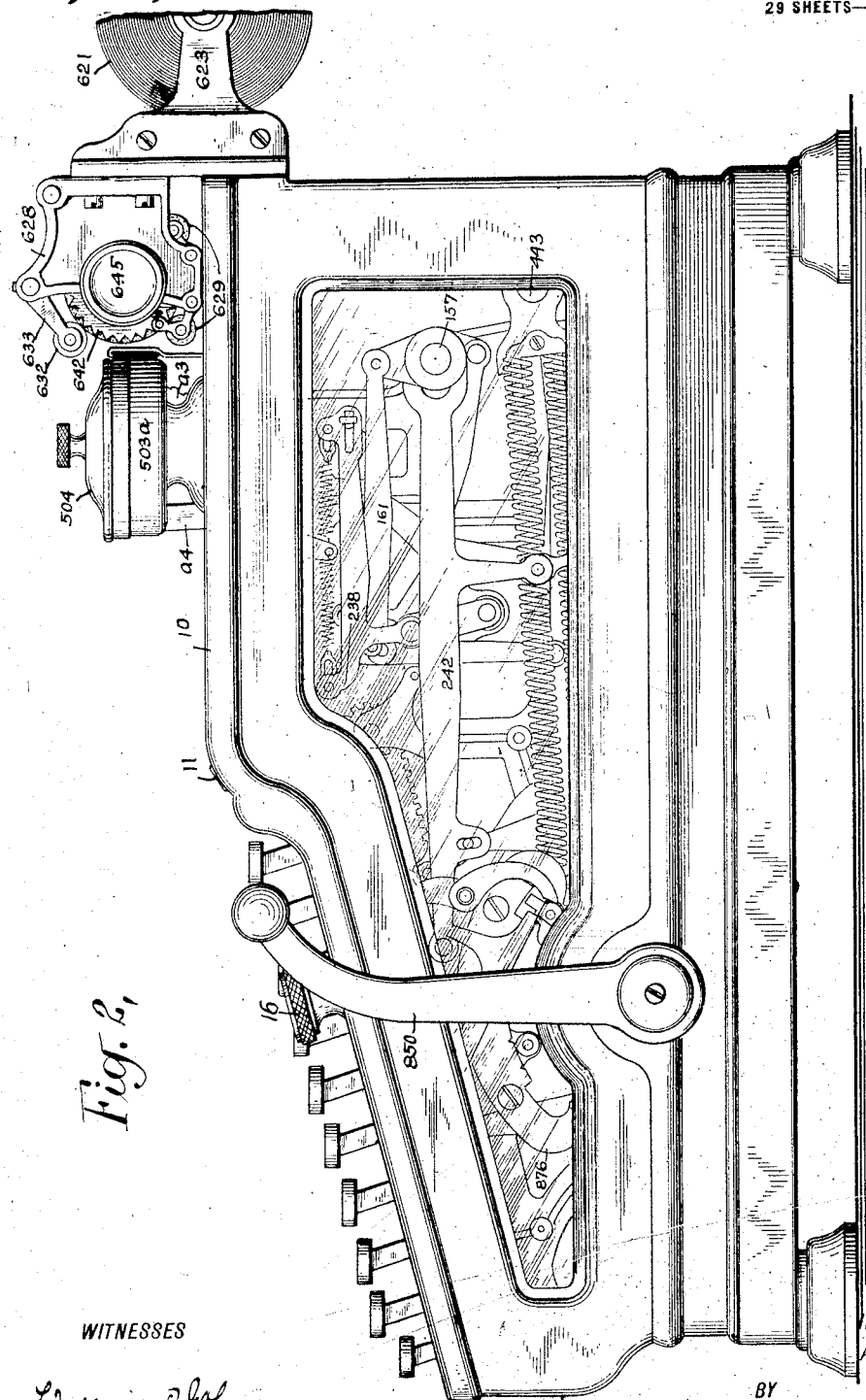
Fig. 2 is an elevation of the right hand side of the complete machine.

LXXXVI. *Actuating mechanism.*—The mechanisms comprising the machine, with the exception of such parts as are manipulated by the fingers, for example the digit and other keys, are actuated by or from the main shaft 60, which in turn is rocked by the handle 850, which in normal position extends upwardly, as shown in Fig. 2. The handle has a sleeve 851, Fig. 3, which is rotatable on the shaft 60 and has rigidly fixed to it a depending arm 852, on the lower end of which is pivoted a driving pawl 853 urged toward the shaft 60 by a coil spring 853ª connected to a finger 854 rising from said arm. The head of the pawl 853 is thus held in a notch 855 in a disk 856 loose on the shaft 60 and provided with an upwardly and forwardly extending arm 857. The lower edge of the notch 855 and the contacting edge of the head of pawl 853 are radial to the axis of shaft 60, so that when the handle 850 is pulled toward the operator the pawl will not be cammed out of the notch but will remain in engagement therewith and hence rock the disk 856 and arm 857 counterclockwise,—as seen in Fig. 3. At its upper end the arm 857 is connected by link 858, composed of two strong coil springs, to the upper arm of lever 859, fixed on the transverse shaft 443. It will therefore be seen that when the handle 850 is drawn toward the operator the arm 857, swinging counterclockwise on the shaft 60, advances the link 858 and so rocks the lever 859 and shaft 443; the spring-link 858 being too stiff to yield under the load imposed when all the parts of the machine are in proper place and in operative condition. On the lower arm of lever 859 is pivoted the end of a long horizontal link 860, the other end of which is pivoted to the lower arm of a lever 861 (better shown in Fig. 4) loose on shaft 60. The latter lever is therefore rocked counterclockwise (as seen in Fig. 4) when the lever 859 is actuated as described above. The upper arm of the lever 861 is rigidly connected by a stud 862, Fig. 4, to a finger 863 on the cam 59, which, as explained in Par. VIII, is fixed on shaft 60. Hence actuation of the lever 861 as described rocks the cam 59, which in turn rocks the main shaft 60 in the same direction. Suppose, however, that one or more parts are jammed or otherwise held against proper movement. In such case the pull of the operating handle simply extends the spring-link 858 without rocking the lever 859, with the result that none of the parts is forcibly actuated in a manner which would cause damage. Pivoted on the frame 5, adjacent to the disk 856 and drawn toward the same by a spring 864, is a locking pawl 865, adapted to coöperate with a shoulder 866 on said disk. Fixed to the lever 861 at a point adjacent to the shoulder is a finger 867. When the pull of the operating handle simply swings disk 856 and arm 857 as explained above, without actuating the lever 861, the shoulder 866 rises and, at about the time the operating handle reaches the end of its initial movement, is engaged by the end of the locking pawl 865. This locks the disk 856 and arm 857 in their advanced position and thus prevents their moving back. The tail of the pawl 865, however, extends downwardly through an opening 869 in the base of the machine so that it can be grasped and moved by the hand when, the locking of the parts having warned the operator that some part is jammed, displaced or otherwise disarranged, it is desired to unlock the machine. The lower arm of lever 859 being longer than the upper arm, the lever 861 in the normal operation of the parts moves a little faster than the disk 856, so that before the shoulder 866 reaches the end of the pawl 865 the finger 867, carried by said lever 861, has reached the stud 868 on the pawl and is positively holding the latter so that it cannot be drawn by its spring 864 into engagement with the shoulder. Hence when the machine is in proper working condition no locking of the parts by the pawl 865 can occur.

LXXXVII. The upper edge of the notch 855, the lower edge of which, as explained in the preceding paragraph, is engaged by the dog 853 for the purpose of actuating the machine when the operating handle 850 is pulled toward the operator, is inclined slightly, instead of being radial to the axis of shaft 60 as is the lower edge of the notch. Hence if the operator attempts to throw the handle back home too fast, or before it has reached the limit of its forward movement, the head of the dog 853 is simply cammed out of the notch 855, allowing the handle to swing back idly; it being remembered that, as explained in the preceding paragraph, the arm 852 and handle 850 are fixed together but are rotatable on the shaft 60.

LXXXVIII. After the handle 850 has been advanced, the parts are returned to initial position not by the operator pushing the handle backward, (which might simply result in temporarily disconnecting the handle as explained in the paragraph immediately preceding) but by a suitable coil spring 870, Fig. 5, attached at one end of the base of the machine and at the other to a stud 871 on one of the toothed sectors 106, which, as described in Par. XIV, are fixed on the shaft 60.

LXXXIX. It is manifestly important, to prevent injury, that a cycle of the machine's operation having been begun it be completed, with the parts performing their proper functions in proper order or sequence. With this end in view, locking devices are provided as follows, to prevent movement of the operating arm 857 in any but the proper direction after its movement has been begun. Above the swinging arm 857 is an arc-shaped locking member 875, Fig. 3, provided at its ends with inwardly turned ends 876, 877, which serve as stops to limit the swing of the arm 857. Inside of these fingers the inner edge of the locking member is cut away to provide two shoulders 878, 879, and on the end of arm 857 is a locking dog 880 having a sharp-edge head which is held in radial position with respect to the axis of shaft 60 by a light spring 881 attached to a finger 882 on said arm. When the parts are in initial position, shown in Fig. 3, the head of the dog 880 projects beyond the inner edge of the arc-shaped locking members 875; but when the arm 857 swings counterclockwise, as described in Par. LXXXI, the dog comes against the shoulder 879 and is swung clockwise on its pivot, the advancing edge of the head of the dog coming under and into engagement with the inner edge of the said arc-shaped member. So long as the arm 857 continues to move in the counterclockwise direction the dog 880 glides easily and smoothly along the inner edge of the member 875. But if the operator lets go the handle 850, thereby permitting the restoring spring 870 (Fig. 5) to exert its force, the resulting clockwise movement of the arm 857 causes the sharp edge of the dog to bite the edge of the locking member 875, thereby bringing the arm 857, and the parts actuated therefrom, quickly but gently to rest and holding them securely against the tension of the retracting spring 870. The handle 850 must therefore be grasped again and drawn forward to the end of its path. Just before the arm 857 reaches the stop 876 the dog 880 passes the shoulder 878, whereupon the spring 881 swings the dog to its radial position with respect to the axis about which the arm 857 rocks. The handle is now released permitting the spring 870 to take up the further actuation of the parts. Arm 857 then starts to move clockwise, bringing dog 880 against shoulder 878 and causing the dog to swing counterclockwise. The other or forward edge of the dog is now in engagement with the inner edge of the member 875 and moves easily along said edge unless the operator attempts to reverse the movement of the arm 857 by a pull on the handle. In which event the dog grips the locking member in the manner already described. It will therefore be seen that the arm 857 and all the parts that are positively connected with it are prevented from moving in any but the proper direction and having begun their movement in the proper direction must complete the same before they can move in any other. If desired, the inner edge of the said arc-shaped locking member 875 may be provided with small shoulders or teeth, as shown in exaggerated size in Fig. 3, to insure the proper locking operation of the dog 880 at the more dangerous points in its path, as for example points where reversal of movement would be specially liable to cause damage.

XC. To prevent too violent pulling of the operating handle 850, which might result in damage to the machine, an effective dash-pot retarding mechanism is provided, shown in Figs. 7, 8, 12, 13, 16, 17, 43 and 44, particularly the last two figures named. The dash-pot 900 is of cylindrical form, securely fixed in vertical position on the base of the machine adjacent to the shaft 443. In the dash-pot, which is filled with oil or other suitable fluid, is a piston head 901, carried by a piston rod 902 extending up through the cylinder head 903 and pivotally connected to a wrist pin 904 which is itself pivoted at its ends to a pair of links 905. The latter are connected at their lower ends, one to an arm of lever 552 and the other to an arm 906 also fixed on shaft 443 and parallel to arm 552. Hence the rocking of shaft 443, as explained in Par. LXXXVI, reciprocates the piston 902—901 in the dash-pot cylinder 900, the first movement of the shaft (counterclockwise as seen in Figs. 8 and 44, when the operator pulls the handle 850 toward him) depressing the piston and the second movement of the shaft, (produced by the spring 870, Fig. 5, as explained in Par. LXXXVIII), raising the piston. The piston head 901 has ports 907, 908, two in number in the present instance, and is provided with a vertically movable valve 909; while fixed to the rod 902 immediately above the head 901 is a downwardly flaring or umbrella-shaped deflector 910. When the piston is depressed as described above the result is equivalent to an uprush of oil through the port 907, the valve 909 closing the port 908 by the pressure of the oil against the under side of the valve. The oil spouting up through the port 907 strikes the member 910 and is deflected downward, so breaking up the current that it exists merely as an agitation or eddy about the deflector and piston rod and is not felt at more than a slight distance above the uppermost position of the deflector. In consequence, the energy of the upward rush of the oil through port 907, during the downward movement of the piston, is dissipated and no oil is splashed up against the interior of the cylinder head 903. During the upward movement of the piston head, a suction effect is actually produced owing to the decreased displacement of the piston rod within the dash-pot. Thus any oil which may have been forced out of the cylinder is sucked back into the same. So pronounced is this suction that the empty dash-pot can be filled by simply pouring oil in the cup-shaped head 903 while the piston is being reciprocated. The chief advantage, however, is that no packing of any sort is required around the bore through which the piston slides and yet the device is satisfactorily oil-proof. The upward movement of the piston head is produced by the retracting spring 870, at a speed which the operator can never cause to exceed a certain maximum since any attempt to do so simply causes the operating handle to disconnect itself from the mechanism, as explained in Par. LXXXVII. Hence the piston 901 moves up through the oil at a rate which permits the oil to glide quietly past the edge of the deflector 910 and down through the holes 907, 908, (the valve 909 of course being open), without any of it being thrown up against the dash-pot head 903.

It is to be understood that the invention is not limited to the construction herein specifically illustrated and described, but can be embodied in other forms without departure from its proper spirit and scope as defined by the appended claims.

What I claim is:

1. In a calculating machine having a plurality of interconnected computing mechanisms, means for determining the computing operations thereof, comprising a plurality of reciprocatory mechanisms each capable of reciprocating as a whole independently of the others and each including a longitudinally reciprocatory actuating member, a sliding member arranged alongside of the first named member for actuation thereby and adapted to coöperate with one of the computing mechanisms, and manually controlled means to arrest only the said sliding member at any one of a plurality of points in its path of advance.

2. In a calculating machine, the combination of a plurality of independently reciprocatory mechanisms, each including a sliding member, a controlling member connected with the sliding member to arrest the same, and an actuating member connected with the other two to advance the same; manual means to arrest the advancing controlling member at any one of a plurality of points; means to retract the controlling and sliding members after arrest of the same; and a plurality of interconnected computing mechanisms operatively associated with the respective sliding members and having their computing operations determined by the extent of advance of the respective sliding members.

3. In a calculating machine, the combination of a reciprocatory actuating member, a sliding member, disengageable connecting means between the actuating member and the sliding member, a manually controlled member connected with said means to cause disengagement of the same and with the sliding member to retract the same, means for retracting the manually controlled member, and computing mechanism operatively associated with the sliding member.

4. In a calculating machine, the combination of a sliding member, a reciprocatory actuating member, a device pivotally mounted on a sliding member and engageable with the actuating member, whereby to advance the sliding member, a manually controlled member connected with the pivoted device to cause disengagement of the same from the sliding member and thereby arrest the sliding member at successive points in its path of advance, means to retract the sliding member after its arrest, and computing mechanism operatively associated with the sliding member.

5. In a calculating machine, the combination of a reciprocatory actuating member; a sliding member parallel therewith; a pivoted device on the sliding member to releasably engage the actuating member; a movable controlling member alongside of the actuating member, connected with the pivoted device to cause disengagement of the same from the actuating member and subsequently retract the sliding member; means to retract the controlling member; manual means to arrest the advancing controlling member, whereby the pivoted device will be disengaged from the advancing actuating member and the advancing sliding member be brought to rest; and computing mechanism operatively associated with the sliding member.

6. In a calculating machine, the combination of a sliding member; computing mechanism operatively associated with the sliding member; a reciprocatory actuating member parallel with the sliding member; a dog pivoted on one of said members; means for causing engagement of the dog and the other of said members, whereby to advance the sliding member; a controlling member pivoted to the dog and movable with the sliding member and adapted when arrested to cause disengagement of the dog from the member previously engaged by it; manual means to arrest the controlling member at successive points in its path of advance; and means to retract the controlling and sliding members.

7. In a calculating machine, the combination with computing devices, of a sliding member operatively associated with the computing devices and determining the operation thereof according to the extent of its advance; a controlling member parallel with the sliding member; a dog pivotally mounted on one of said members and having an arm pivoted to the other member whereby the two are movable together and also to a slight extent independently of each other; a reciprocatory actuating member parallel with the other members; means carried by the dog to releasably engage the actuating member; and manual means to arrest the controlling member when the advancing sliding member has reached any one of a plurality of positions corresponding to the numerical values of the several digits; and means to retract the controlling and sliding members.

8. In a calculating machine, the combination of a plurality of reciprocatory mechanisms arranged side by side and each comprising an actuating member having a shoulder, a sliding member, and a dog pivoted to the sliding member and having a finger for engagement with said shoulder; means to move the finger into the path of the said shoulder, a controlling member pivoted to the dog whereby to move with the sliding member and adapted when arrested to cause the said finger to move out of engagement with the said shoulder; means for advancing and retracting the actuating members; manual means to arrest the controlling members; and a plurality of interconnected computing mechanisms operatively associated with the sliding members.

9. In a calculating machine, the combination of a plurality of reciprocatory mechanisms each comprising an actuating member having a shoulder, a sliding member alongside of the actuating member, a controlling member alongside of the other members, and a dog pivoted to both the sliding member and the controlling member and having a finger movable into and out of the path of the said shoulder; means for moving the finger into the path of said shoulder, whereby the advancing actuating member will pick up and advance the other members named; means for reciprocating the actuating members, connections between the controlling members and the first-named means to retract the controlling members and with them the associated sliding members; manually operated means to arrest the advancing controlling members and thereby cause the aforesaid finger and shoulder to be disengaged; and a plurality of interconnected computing mechanisms operatively associated with the respective reciprocatory mechanisms.

10. In a calculating machine, the combination of a plurality of reciprocatory mechanisms, each comprising an actuating member having a shoulder, a sliding member, a dog pivotally mounted on the sliding member and having a finger to engage the said shoulder, and a controlling member pivoted to the dog; means to advance and retract the actuating members; manual means to arrest the controlling members at appropriate points in their paths of advance; means to retract the controlling members and the associated sliding members; and interconnected computing mechanisms operatively associated with the sliding members.

11. In a calculating machine, the combination of a plurality of reciprocatory mechanisms each comprising an elongated actuating member having a shoulder on its upper edge, a sliding member alongside the actuating member, a dog pivotally mounted on the sliding member and having a finger overlying the upper edge of the actuating member, and a controlling member arranged alongside of the other members named and pivoted to said dog; means to depress the fingers into the paths of the shoulders on the actuating members; means to advance and retract the actuating members; manual means to arrest the controlling members at appropriate points in their paths of advance, whereby to cause disengagement of the associated fingers and shoulders; means enabling the aforesaid depressing means to retract the controlling members and with the latter the associated sliding members; and interconnected computing mechanisms operatively associated with the sliding members.

12. In a calculating machine, the combination of a reciprocatory mechanism comprising an elongated actuating member having a shoulder on its upper edge, a sliding member alongside of the actuating member, a dog pivotally mounted on the sliding member and having a finger overlying the upper edge of the actuating member, and a controlling member arranged alongside of the other members named and pivoted to said dog; an element coöperating with said finger to depress the same into the path of said shoulder; means to actuate said element; means to advance and retract the actuating member; manual means to arrest the controlling member at appropriate points in its path of advance; and computing mechanism operatively associated with the sliding member.

13. In a calculating machine, the combination of a sliding member; an actuating member; a dog pivoted on the former and having a finger movable into and out of engagement with the actuating member; an element to move the finger into engagement with the actuating member; a lever connected with said element to actuate the same; a cam operatively connected with the lever to rock the same; and mechanism to actuate the cam and to advance and retract the actuating member.

14. In a calculating machine, the combination of an actuating member having a shoulder; means to reciprocate the actuating member; a sliding member having a pivoted dog provided with a finger movable into and out of the path of the shoulder; an element movable toward the finger to shift the same into the path of the shoulder; means for moving said element; manually actuated means to cause the said element to engage and shift the finger when moved toward the shoulder; and a member under the control of said manually actuated means to disengage the finger and shoulder at appropriate points in the path of advance of the sliding member.

15. In a calculating machine, the combination of an actuating member; means to reciprocate the same; a sliding member having a pivoted dog provided with a finger movable into and out of engagement with the actuating member to advance the sliding member and permit independent advance of the actuating member; an element movable toward the finger to shift the same into engagement with the actuating member; a device normally in the path of said element to prevent its actuation of the finger; manually actuated means to shift said device out of the path of said element and cause the same to actuate the finger; a controlling member pivoted to the dog and movable with the sliding member in the latter's advance and adapted, when arrested, to cause disengagement of the finger and actuating member; a series of manually operated digit-keys each connected with said manually actuated means to actuate the same and each adapted to arrest the controlling member at an appropriate point in its path of advance; means to retract the controlling member and the sliding member; and computing mechanism operatively connected with the sliding member.

16. In a calculating machine, the combination of an actuating member; means to advance and retract the same; a sliding member; a dog pivoted on the sliding member and having a finger; an element movable toward the finger; means to advance said element; manually actuated means to cause said element, when advanced, to shift the said finger into engagement with the actuating element; manually controlled means connected with the actuating member to disengage the finger and actuating member; means to retract the controlling and sliding members; and computing mechanism operatively associated with the sliding member.

17. In a calculating machine, the combination of a reciprocatory actuating member; a sliding member alongside of the actuating member; a controlling member alongside of the other members; a dog pivotally connected to the controlling member and the sliding member and having a finger adapted to engage the actuating member, whereby when the latter is advanced it will advance the other members; means to retract the controlling member and the sliding member; an element movable toward the aforesaid finger to shift the same into engagement with the actuating member; a controlling element normally permitting the first named element to move past the finger without shifting the same but capable of being actuated to cause said first named element to shift the finger; manually actuated means to actuate the controlling element; means to arrest the controlling member at appropriate points in its path of advance; and computing mechanism operatively associated with the sliding member.

18. In a calculating machine, the combination of a reciprocatory actuating member; a sliding member alongside of the actuating member; a dog pivoted on the sliding member and having a finger; an element movable longitudinally toward the finger to shift the same into engagement with the actuating member, said element being also movable transversely of its longitudinal path; a guide stud adjacent to the element and normally permitting such transverse movement of the said element whereby the latter may move idly past the finger; and manually actuated means for moving the guide stud into a position to prevent such transverse movement of said element, whereby said element when moved toward the finger will shift the same into engagement with the actuating member.

19. In a calculating machine, the combination of a plurality of independently reciprocatory mechanisms, each including a sliding member, a rack member associated with the sliding member to advance the same, and manually controlled means to arrest the sliding member at successive points in its path of advance; an operating shaft; gear elements on the operating shaft and in mesh with the respective rack members; and interconnected computing mechanisms operatively associated with the sliding members and having their computing operations determined by the extent of advance of the respective sliding members.

20. In a calculating machine, the combination of a reciprocatory rack member; a gear segment meshing with the rack member to reciprocate the same; a sliding member; disengageable connecting means between the rack member and the sliding member to advance the latter and when disengaged permitting the rack member to advance independently, leaving the sliding member behind; a manually controlled member connected with said means to cause disengagement of the same; means to retract the manually controlled member and sliding member; and computing mechanism operatively associated with the sliding member.

21. In a calculating machine, the combination of a rack member; a sliding member, and a controlling member, arranged on opposite sides of the rack member and having their edges covering the sides of the teeth of the rack member; and a gear element meshing with the rack member and held in mesh therewith by the edges of the sliding and controlling members.

22. In a calculating machine, the combination of a plurality of flat, sheet metal rack members adapted to reciprocate in substantially horizontal paths and having teeth on their lower edges; a plurality of sliding and controlling members arranged on opposite sides of and connected with the rack members for actuation thereby and having their lower edges covering the sides of the teeth of the respective rack members; a series of oscillatory gear elements meshing with the rack members and held in mesh therewith by the edges of the adjacent sliding and controlling members; manually actuated means coöperating with the controlling members to arrest the sliding members at appropriate points in their paths of advance; and interconnected computing mechanisms operatively associated with the sliding members and having their computing operations determined by the extent of advance of the respective sliding members.

23. In a calculating machine, the combination of a plurality of flat, sheet metal reciprocatory rack members movable in parallel paths and having teeth along one edge; sliding members connected with the rack members for actuation thereby; manual means to arrest the sliding members at appropriate points in their paths of advance independently of the associated rack members; an operating shaft extending transversely of the paths of the rack members; and gear elements rigidly mounted on said shaft and meshing with the teeth on the rack members to reciprocate the rack members when the shaft is actuated.

24. In a calculating machine, the combination of a reciprocatory sliding member of flat sheet metal movable in a horizontal path; computing mechanism operatively associated with the sliding member and having its computing operation determined by the extent of advance of the sliding member; a controlling member of flat sheet metal movable and connected with the sliding member to arrest the same and having on its upper edge a downwardly inclined series of shoulders spaced successively closer together from the upper to the lower end of the series; and a series of equi-spaced digit keys arranged above the controlling member and inclined in parallelism with the series of shoulders, each key being depressible into the path of a particular shoulder to arrest the controlling member and the sliding member when the latter has advanced to an extent corresponding to the numerical value of the depressed digit key.

25. In a calculating machine, the combination of a plurality of reciprocatory sliding members arranged side by side across the machine to move horizontally in parallel paths; a plurality of controlling members alongside of the sliding members, movable with and connected with the sliding members to arrest the same in their paths of advance and each having on its upper edge an inclined series of shoulders spaced successively closer together from one end of the series to the other; a plurality of series of equi-spaced digit keys, one series for each controlling member, each key being manually movable into the path of a particular shoulder on the associated controlling member, whereby to arrest the controlling member and the associated sliding member at a point corresponding to the numerical value of the coöperating digit key; and interconnected computing mechanisms operatively associated with the sliding members and having their computing operations determined by the extent of advance of the respective sliding members.

26. In a calculating machine, in combination, a plurality of interconnected computing mechanisms; means for determining the computing operations thereof, comprising a plurality of reciprocatory mechanisms, each capable of reciprocating as a whole independently of the others and each including a longitudinally reciprocatory actuating member, a sliding member arranged alongside the actuating member for advance thereby and adapted to coöperate with the respective computing mechanism, and manually controlled means to arrest only the sliding member at any one of a plurality of points in its path of advance; and devices positively engaging the actuating members and the sliding members to advance and retract the same.

27. In a calculating machine having computing mechanism, the combination of a sliding member having at one end an upper portion overhanging the lower portion of the member to coöperate with the said computing mechanism; a series of digit keys above the lower portion of the sliding member and depressible individually to arrest the latter at different points in its path; a longitudinally movable actuating member alongside of the sliding member to advance the same; a dog pivoted on the sliding member, and adapted to be swung into engagement with the sliding member; a horizontally movable element adapted to engage the dog and swing the same into engagement with the actuating member, and itself capable of swinging to escape engaging the dog; a guide stud above the said element and normally permitting the same to swing; a shiftable member adapted to shift the stud to a position to prevent swinging of said element; a pivoted arm connected with the last member to shift the same; a movable stop connected with the pivoted arm to actuate the same and normally lying in the path of the aforesaid overhanging portion of the sliding member to prevent advance of the latter; and a universal bar alongside of the series of digit keys, connected with the stop and associated with the digit keys for actuation by each of them; whereby depression of any of the said keys will shift the stop out of the path of the sliding member, will cause the latter to be connected with the actuating member for advance thereby, and will subsequently arrest the sliding member.

28. In a calculating machine having computing mechanism, the combination of a reciprocatory actuating member; a sliding member alongside of the actuating member; a controlling member alongside of the other members; a dog pivotally connected to the controlling member and the sliding member and having a finger adapted to engage the actuating member, whereby when the latter is advanced it will advance the other members; an element movable toward the aforesaid finger to shift the same into engagement with the actuating member; a controlling element normally permitting the first named element to move past the finger without shifting the same but capable of being actuated to cause the first-named element to shift the finger; a stop normally in the path of the sliding member to prevent advance of the same and connected with the said controlling element to actuate the latter; and manually actuated means to shift said stop out of the path of the sliding member, to actuate the aforesaid controlling element, and to arrest the said controlling member at appropriate points in its path of advance, said means comprising a row of digit keys arranged above the said members and depressible manually into the path of the controlling member, and a universal bar, connected with the stop to shift the same and actuate the controlling element and associated with the digit keys for actuation by each of them.

29. In a calculating machine having computing mechanism, the combination of a horizontally-sliding member to coöperate with the computing mechanism; an actuating member alongside of the sliding member and movable horizontally; a series of digit keys above the said members and depressible individually to arrest the sliding member at corresponding points in its path of advance; a dog pivoted on the sliding member and adapted to engage the actuating member whereby the latter will advance the former; a horizontally movable element to engage and swing the dog into engagement with the actuating member and adapted to swing out of engagement with the dog; a guide stud arranged above the said element and normally permitting the same to swing; a shiftable link carrying the stud and adapted to shift the same into a position to prevent swinging of said element; a shiftable stop normally in the path of the sliding member to prevent advance thereof; and a universal bar connected with the stop and the link to shift both, and associated with the series of digit keys for actuation by each of them.

30. In a calculating machine having computing mechanism, in combination, a horizontally sliding member having at one end an upper portion substantially parallel with the lower portion to coöperate with the aforesaid computing mechanism; a row of manually depressible digit keys above the lower portion of the sliding member to arrest the latter at any one of a plurality of points in its path of advance; a pivoted stop arranged between the row of keys and the said upper portion of the sliding member and normally in the path of such portion to prevent advance of the sliding member; and a universal element connected with the stop to swing the same out of the path of said upper portion of the sliding member, and arranged for actuation by any one of the aforesaid digit keys.

31. In a calculating machine, the combination of a plurality of sliding members arranged side by side and adapted to slide longitudinally independently of each other, and each having at its forward end an upwardly and rearwardly extending rack portion; a key-board arranged above the lower portions and in rear of the rack portions of the sliding members, and comprising a plurality of manually operable digit keys to arrest the sliding members; a plurality of stops at the front of the key-board and normally in the paths of the aforesaid rack portions to prevent movement of the sliding members; and means actuated by the digit keys to shift the stops out of the paths of the rack portions to permit movement of the sliding members.

32. In a calculating machine having a plurality of interconnected computing mechanisms, in combination, a plurality of horizontally sliding members arranged side by side and having elevated portions at one end overhanging and substantially parallel with the lower portions to coöperate with the aforesaid computing mechanisms; a keyboard above the lower portions of the sliding members and comprising a plurality of rows of manually actuated digit keys parallel with the sliding members to arrest the latter; a plurality of pivotally mounted stops, one for each sliding member, in the paths of the overhanging portions to prevent movement of the sliding members; and means actuated by the digit keys to swing said stops out of the paths of the overhanging portions of the sliding members to permit the latter to move.

33. In a calculating machine having computing mechanism, the combination of a horizontally sliding member to coöperate with the aforesaid computing mechanism, and having an upper portion overhanging the lower portion; a row or column of digit keys above and parallel with the lower portion of the sliding member and manually depressible to arrest the latter at any one of a plurality of points in its path of advance; a support for the keys; a stop pivoted to the support adjacent to the overhanging portion of the sliding member and normally in the path of such overhanging portion to prevent advance of the sliding member; and a universal bar associated with the stop to swing the same out of the path of the said overhanging portion and associated with the digit keys for actuation by each of them.

34. In a calculating machine having computing mechanism, the combination of a sliding member to coöperate with the said computing mechanism; a row or column of digit keys above and parallel with the sliding member and manually depressible to arrest the sliding member at any one of a plurality of points in its path of advance; a support for the digit keys; a stop pivoted to the support at one end of the same and normally in the path of the sliding member to prevent advance of the same; and a universal bar pivoted at one end to the support and at the other to the stop to swing the same out of the path of the sliding member, and associated with the digit keys for actuation by each of them.

35. In a calculating machine having computing mechanism, the combination of a sliding member to coöperate with the said computing mechanism; a row of digit keys arranged above the sliding member, depressible manually to arrest the member at any one of a plurality of points in its path of advance, and each having a laterally projecting stud; a support for the keys; a stop pivoted to one end of the support and normally in the path of the sliding member to prevent advance of the same; and a universal bar pivoted at one end to the stop and at the other to the opposite end of the key support, and underlying the said lateral studs whereby depression of any of said keys will actuate the universal bar and swing the stop out of the path of the sliding member.

In testimony whereof I affix my signature in the presence of two subscribing witnesses.

AUGUST KNISTROM.

Witnesses:
F. L. LEE,
V. J. WOOSTER.

---

It is hereby certified that in Letters Patent No. 1,281,792, granted October 15 1918, upon the application of August Knistrom, of Binghamton, New York, for an improvement in "Calculating-Machines," errors appear in the printed specification requiring correction as follows: Page 12, line 62, for the reference-numeral "401" read *402*; page 23, line 58, for the reference-numeral "668" read *688*; page 14, line 104; page 17, line 116; page 23, line 57; page 24, line 36, for paragraph-numeral "LXXXII" read *LXXXVI*; page 21, line 25; page 29, line 53, for the paragraph-numeral "LXXX" read *LXXVI*; page 31, line 43, for the paragraph-numeral "LXXXI" read *LXXXVI*; page 16, strike out the sentence commencing with the word "Now," line 97, to and including the words and period, line 104, "is pivoted." and insert the sentence as follows: *Now when the frames 176 are depressed, by the bell crank levers 153, 154, through the medium of the shaft 152, as described in Par's XIX, XXII, the stud 254 also moves down and, engaging the notch 253, depresses the arm 27 on which, as explained in Par. VI, the arm 31 is pivoted.;* and that the said Letters Patent should be read with these corrections therein that the same may conform to the record of the case in the Patent Office.

Signed and sealed this 26th day of November, A. D., 1918.

[SEAL.]

R. F. WHITEHEAD,
*Acting Commissioner of Patents.*

Cl. 235—60.